United States Patent
Xin et al.

(10) Patent No.: US 11,464,054 B2
(45) Date of Patent: Oct. 4, 2022

(54) RTA CONTENTION COLLISION AVOIDANCE

(71) Applicant: SONY GROUP CORPORATION, Tokyo (JP)

(72) Inventors: Liangxiao Xin, San Jose, CA (US); Mohamed Abouelseoud, Burlingame, CA (US); Kazuyuki Sakoda, Campbell, CA (US)

(73) Assignee: SONY GROUP CORPORATION, Tokyo (JP)

( * ) Notice: Subject to any disclaimer, the term of this patent is extended or adjusted under 35 U.S.C. 154(b) by 19 days.

(21) Appl. No.: 16/714,179

(22) Filed: Dec. 13, 2019

(65) Prior Publication Data
US 2021/0029750 A1    Jan. 28, 2021

Related U.S. Application Data

(60) Provisional application No. 62/878,190, filed on Jul. 24, 2019.

(51) Int. Cl.
*H04W 74/08*    (2009.01)
*H04W 84/12*    (2009.01)

(52) U.S. Cl.
CPC ... *H04W 74/0875* (2013.01); *H04W 74/0808* (2013.01); *H04W 84/12* (2013.01)

(58) Field of Classification Search
CPC ......... H04W 74/0875; H04W 74/0808; H04W 84/12; H04W 74/0816; H04W 74/002;
(Continued)

(56) References Cited

U.S. PATENT DOCUMENTS

| 7,764,665 B2 * | 7/2010 | Rogers | H04L 47/283 370/352 |
| 8,477,616 B1 * | 7/2013 | Rogers | H04L 47/568 370/235 |
| 2003/0012167 A1 * | 1/2003 | Benveniste | H04W 74/0816 370/338 |

(Continued)

FOREIGN PATENT DOCUMENTS

WO    WO-2005039105 A1    4/2005

OTHER PUBLICATIONS

Hirzallah et al., "Provisioning QoS in Wi-Fi Systems With Asymmetric Full-Duplex Communications," IEEE Transactions on Cognitive Communications and Networking, vol. 4, No. 4, pp. 942-953, Dec. 2018 (Year: 2018).*

(Continued)

*Primary Examiner* — Un C Cho
*Assistant Examiner* — Lalita W Pace
(74) *Attorney, Agent, or Firm* — O'Banion & Ritchey LLP; John P. O'Banion

(57) ABSTRACT

A wireless communication circuit for operating over a wireless local area network (WLAN) supporting carrier sense multiple access/collision avoidance (CSMA/CA) in which real time application (RTA) traffic and non-RTA traffic coexist. Channel time is scheduled for transmitting real-time application (RTA) traffic based on expected RTA packet arrival time, with the schedule being shared with neighboring stations. Schedule time is adjusted based on schedules of neighboring stations to prevent channel contention collisions of multiple RTA traffics contending for the channel. Various mechanisms are described for supporting RTA transmissions while reducing channel access latency and contention collision.

27 Claims, 32 Drawing Sheets

(58) Field of Classification Search
CPC ............... H04W 74/006; H04W 84/02; H04W 72/1242; H04L 47/2408; H04L 47/2416
See application file for complete search history.

(56) References Cited

U.S. PATENT DOCUMENTS

| | | | | |
|---|---|---|---|---|
| 2005/0058149 | A1* | 3/2005 | Howe | H04L 47/17 370/428 |
| 2005/0243838 | A1* | 11/2005 | Lim | H04L 47/2416 370/395.53 |
| 2008/0232285 | A1* | 9/2008 | Aad | H04W 74/02 370/310 |
| 2009/0103501 | A1* | 4/2009 | Farrag | H04W 74/02 370/337 |
| 2010/0115366 | A1* | 5/2010 | Wang | H04L 1/1887 714/748 |
| 2013/0286879 | A1* | 10/2013 | ElArabawy | H04W 28/0289 370/252 |
| 2014/0362840 | A1* | 12/2014 | Wong | H04W 72/12 370/338 |
| 2016/0081114 | A1 | 3/2016 | Jung | |
| 2017/0094654 | A1* | 3/2017 | Yang | H04W 28/0252 |
| 2017/0290033 | A1* | 10/2017 | Blasco Serrano | H04W 72/1205 |
| 2018/0295653 | A1* | 10/2018 | Ashraf | H04W 72/14 |
| 2020/0137702 | A1* | 4/2020 | Patil | H04B 7/10 |

OTHER PUBLICATIONS

Kiryanov et al., "Analysis of Algorithms for Decentralized Dynamic Channel Resource Reservation for Data Streaming in Wi-Fi Networks," Journal of Communications Technology and Electronics, Pleiades Publishing, Inc. 2017, vol. 62, No. 6, pp. 694-703. (Year: 2017).*

He et al., "Content and buffer status aware packet scheduling and resource management framework for video streaming over LTE system," EURASIP Journal on Image and Video Processing, 2017, pp. 1-15. (Year: 2017).*

Pal et al.,"MAC Layer Protocols for Real-time Traffic in Ad-hoc Wireless Networks," IEEE Computer Society, Proceedings of the International Conference on Parallel Processing (ICPP'02), 2022, pp. 1-8 (Year: 2022).*

Wei, Yi-Hung et al., "RT-WiFi: Real-Time High Speed Communication Protocol for Wireless Cyber-Physical Control Applications", Proceedings of the 2013 IEEE 34th Real-Time Systems Symposium, Dec. 3-6, 2013, pp. 140-149.

Kang, Mikyung et al., "Real-Time Support on IEEE 802.11 Wireless Ad-Hoc Networks: Reality vs. Theory", IEICE Trans. Commun., vol. E92-B, No. 3, Mar. 2009, pp. 737-744.

Moraes R et al: "A forcing collision resolution approach able to prioritize traffic in CSMA-based networks",Computer Communications, Elsevier Science Publishers BV, Amsterdam, NL,vol. 33, No. 1.

* cited by examiner

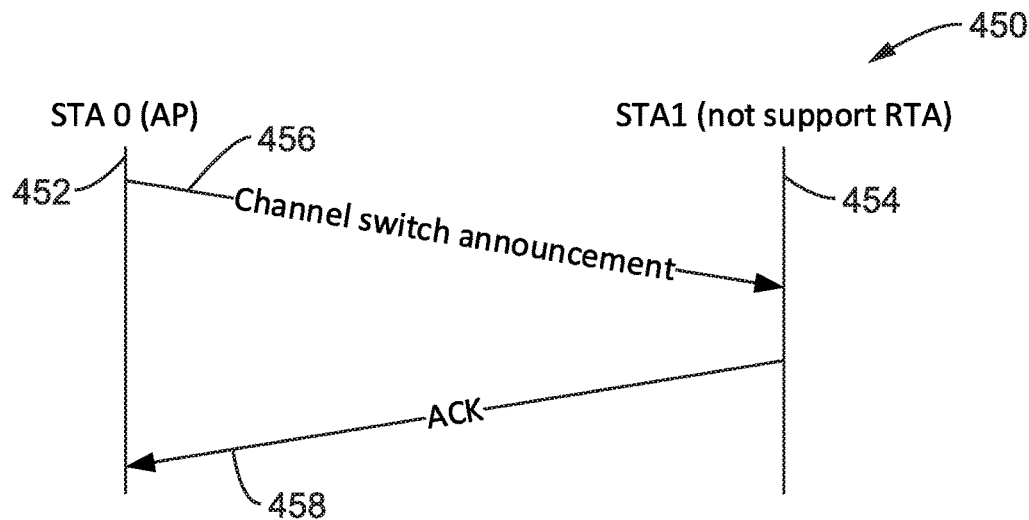
FIG. 25
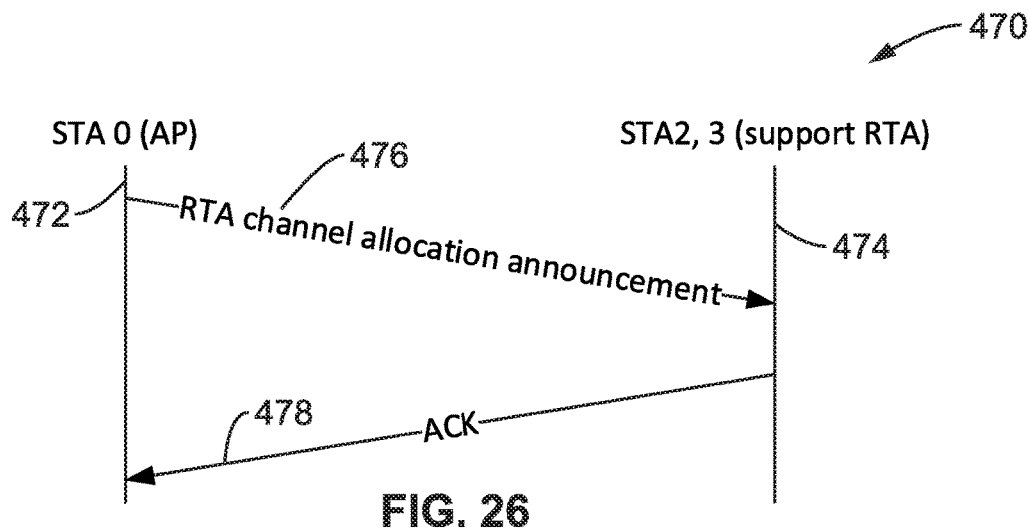
FIG. 26
| RTA channel allocation frame | Frame Control | Duration | RA | TA | Action | RTA Supported Channels | Non-RTA Supported Channels | FCS |
FIG. 27

RTA CONTENTION COLLISION AVOIDANCE

CROSS-REFERENCE TO RELATED APPLICATIONS

This application claims priority to, and the benefit of, U.S. provisional patent application Ser. No. 62/878,190 filed on Jul. 24, 2019, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication stations, and more particularly to wireless local area network (WLAN) stations communicating a combination of real time and non-real time traffic.

2. Background Discussion

Present wireless systems that utilize Carrier Sense Multiple Access/Collision Avoidance (CSMA/CA) focus on high overall network throughput, however they lack low latency capability for properly supporting Real Time Applications (RTAs).

A RTA requires low latency communication and uses best effort communication. The data generated from the RTA is called RTA traffic and is packetized as RTA packets at the transmitter station (STA), while the data generated from a non-time sensitive application is called non-RTA traffic and is packetized as non-RTA packets at the transmitter STA. The RTA packets require low latency due to a high timeliness requirement (real-time) for packet delivery, as the RTA packet is valid only if it can be delivered within a certain period of time.

Due to the random channel access scenario, a STA needs to sense and contend for channel access before transmitting each packet. Although obtaining a short channel contention time accelerates channel access, it increases the probability of packet collision. The delay inherent in packet collisions is still significant due to the channel contention time required for each retransmission. To avoid packet collisions and improve packet delivery success rates, a STA retransmits the packet following a longer channel contention period after a packet collision, which further delays the packet.

In view of the above, it is seen that there are significant latencies involved in communicating time sensitive RTA packets within a wireless network that utilizes CSMA/CA system, or similarly mechanisms.

Accordingly, a need exists for enhanced handling of real time application (RTA) packets and for significantly reducing packet latency. The present disclosure fulfills that need and provides additional benefits over previous technologies.

BRIEF SUMMARY

A wireless communication circuit, method and protocol for communicating over a wireless local area network (WLAN) while still being able to support Carrier Sense Multiple Access/Collision Avoidance (CSMA/CA), and similar mechanisms, and in which real time application (RTA) traffic and non-RTA traffic coexist. Channel time is scheduled for transmitting real-time application (RTA) traffic based on expected RTA packet arrival time, with the scheduling information being shared with neighboring stations. Schedule time is adjusted based on schedules of neighboring stations to prevent channel contention collisions of multiple RTA traffics contending for the channel.

RTA packets in the present disclosure have priority over non-RTA packets, while the RTA packets themselves have a priority ranking, with higher priority packets being transmitted earlier than RTA packets with lower priority. This goes against the random channel access scheme in CSMA/CA, whose object is to provide fair access between all packet transmissions. Conventional CSMA/CA is a distributed channel access mechanism such that there is no coordination between STAs, whereby the probability that multiple STAs simultaneously contend for the channel is high, thus leading to contention collision, which requires retransmission.

In view of the above, the apparatus, method and protocols of the present disclosure can provide reduced latency and fewer collisions during RTA packet transmissions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 25 is a communication interchange diagram of a channel switch for stations that only support non-RTA transmission according to at least one embodiment of the present disclosure.

FIG. 26 is a communication interchange diagram of channel allocation for RTA and non-RTA packet transmission according to at least one embodiment of the present disclosure.

FIG. 27 is a data field diagram of an RTA channel allocation announcement frame according to at least one embodiment of the present disclosure.

DETAILED DESCRIPTION

1. Conventional WLAN Systems 1.1. Random Channel Access Scheme

Wireless Local Area Networks (WLANs), such as up to IEEE 802.11ax, have conventionally used a Carrier-Sense Multiple Access/Collision Avoidance (CSMA/CA) mechanism to allow stations (STAs) to have random access to the channel for packet transmission and retransmission.

Figure 1:
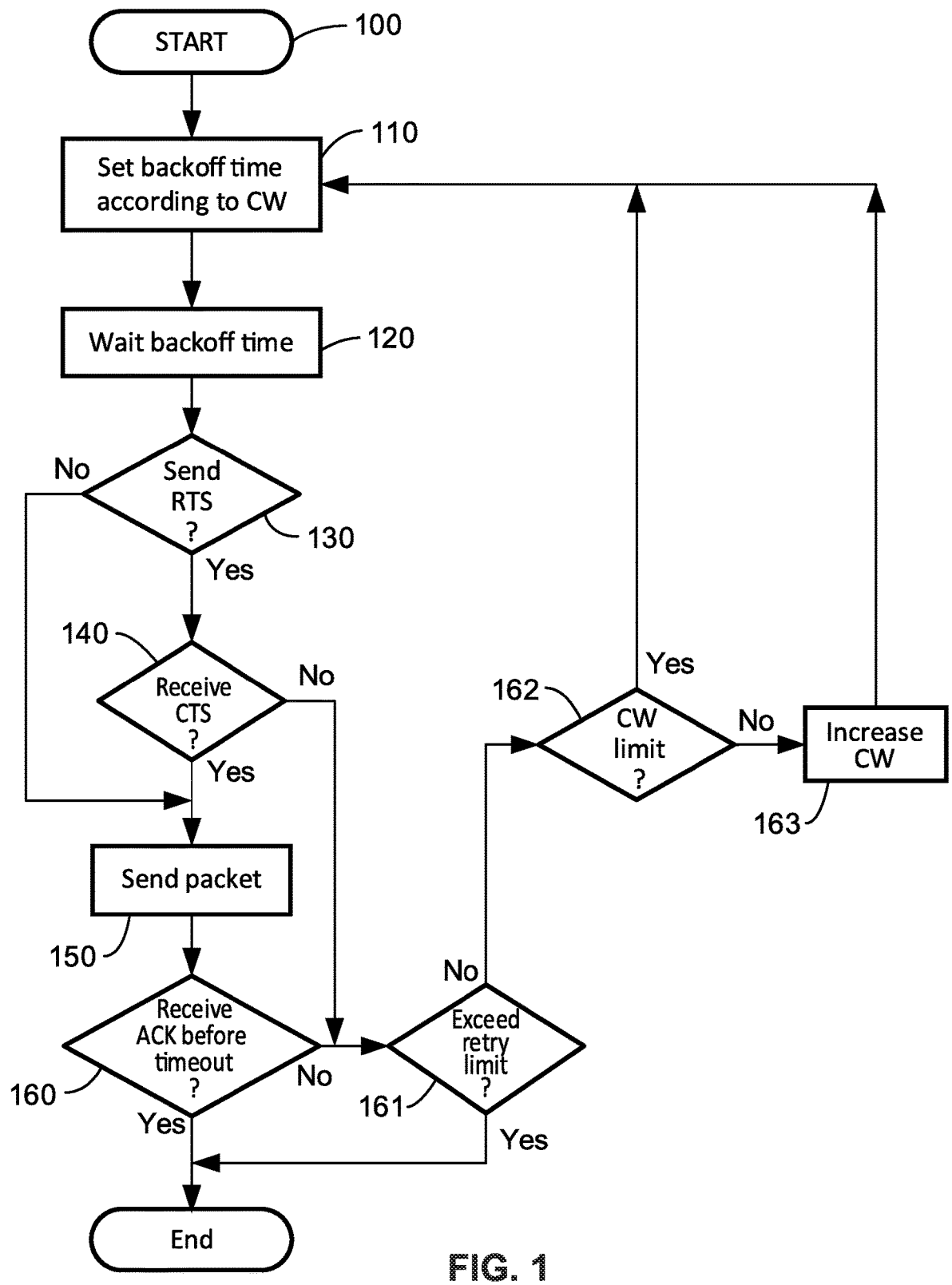
FIG. 1 is a flow diagram of contention-based channel access in CSMA/CA.

FIG. 1 illustrates contention-based channel access in CSMA/CA. In a CSMA/CA system, the STA senses the channel for transmission when there is data to transmit. Before each transmission and retransmission, the STA has to sense the channel and set a backoff time to contend for channel access. The backoff time is decided by a uniform random variable between zero and the size of a contention window (CW).

After the STA waits for the backoff time and senses that the channel is idle (unoccupied), the STA decides whether to send a Ready To Send (RTS) frame to ensure channel occupancy or not. If the STA sends an RTS frame, the channel occupancy is ensured when it receives a Clear To Send (CTS) frame, whereby the STA sends the packet. If the STA does not send an RTS frame, then it sends the packet directly. A retransmission is required if the CTS frame is not received after sending an RTS frame, or if the STA does not receive an ACKnowledgement (ACK) before timeout. Otherwise, the transmission succeeds. When the retransmission is required, the STA checks the number of retransmissions of the packet. If the number of retransmissions exceeds the retry limit, then the packet is dropped and no retransmissions are scheduled. Otherwise, the retransmission is scheduled. If the retransmission is scheduled, then another backoff time is needed to contend for channel access for the retransmission. If the size of the contention window does not reach the upper limit, then the STA increases it. The STA sets another backoff time depending on the new size of the contention window. The STA waits the backoff time for retransmission and so forth.

Figures 2, 3, 4:
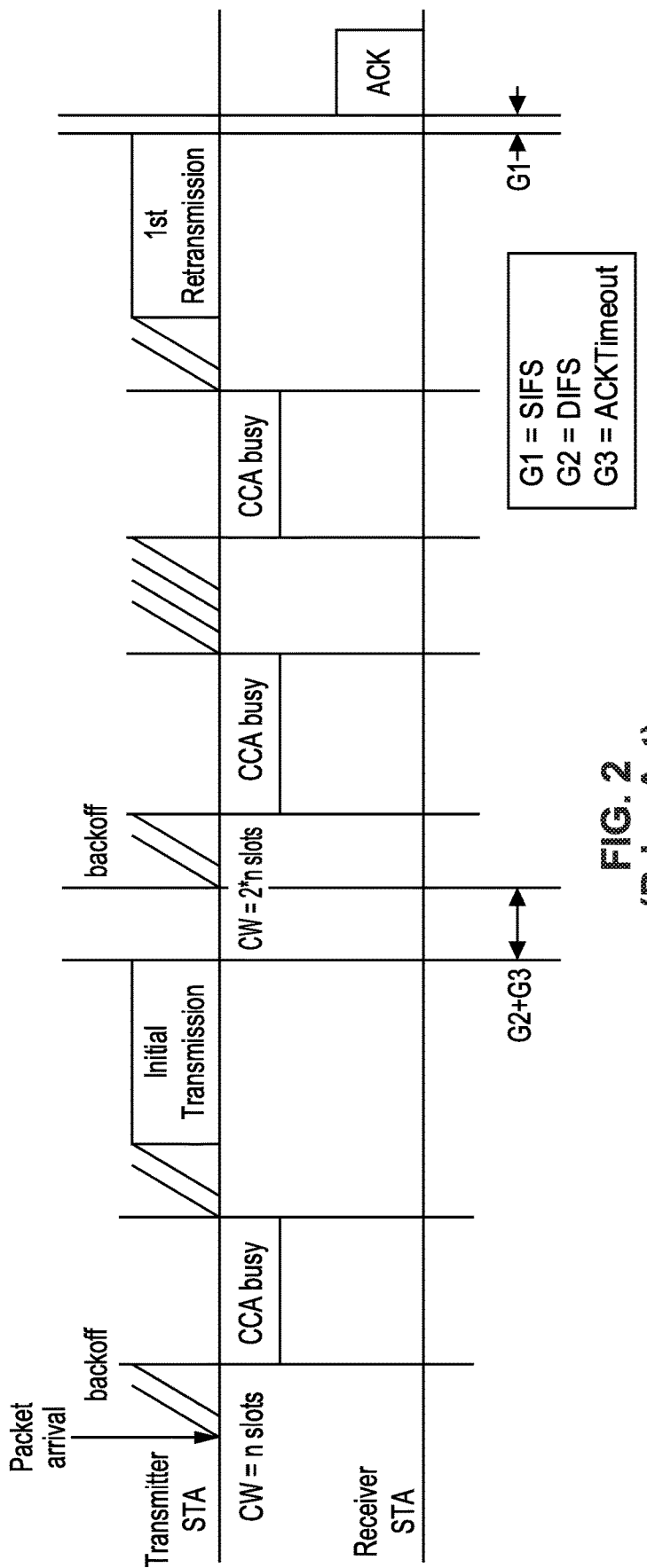
FIG. 2 is a communication sequence diagram of random channel access in CSMA/CA where RTS/CTS is disabled.
FIG. 3 is a data field diagram for a Request To Send (RTS) frame.
FIG. 4 is a data field diagram for a Clear To Send (CTS) frame.

FIG. 2 illustrates one example of random channel access in CSMA/CA where the RTS/CTS is disabled. It will be noted that the 802.11 standard regarding CSMA/CA utilizes the two lowest levels in the OSI networking stack, which are the Physical (PHY) layer and the Medium Access Control (MAC) layer. When the MAC layer of the transmitter STA receives the data from its upper layers, it contends for the channel to gain access. When the transmitter STA contends for the channel, it has to wait until the backoff time, whereby the size of the contention window is n slots, and counts down to zero. The count-down process will be interrupted, such as by a Clear Channel Assessment (CCA) that indicates busy, when other packet transmissions are occurring over the channel. After the transmitter STA gains channel access to transmit the data, it packetizes the data into a packet and transmits the packet over the channel. As shown in the figure, if the initial transmission of the packet does not succeed, a retransmission of the packet is performed. The transmitter STA sets backoff time again to contend for channel access. This time, the size of the contention window is doubled, which is 2*n slots, due to the retransmission. The expected backoff time is also doubled by the contention window size. When the backoff time is increased, there is also a greater chance that the count-down process will be interrupted (i.e., CCA busy) by other packet transmissions.

1.2. Channel Occupancy by RTS/CTS

In CSMA/CA, a STA is able to occupy the channel by using an RTS/CTS exchange which protects packet transmissions from interference from other nodes, especially in a hidden node problem (situation).

FIG. 3 illustrates the content of a RTS frame. A Frame Control field indicates the type of the frame. A Duration field contains network allocation vector (NAV) information used for CSMA/CA channel access. A Recipient Address (RA) field contains the address of a recipient of the frame. A Transmitter Address (TA) field contains the address of the station that transmitted the frame.

FIG. 4 illustrates the content of the CTS frame. A Frame Control field indicates the type of the frame. A Duration field contains NAV information used for CSMA/CA channel access. An RA field contains the address of the recipient of the frame.

Figure 5:
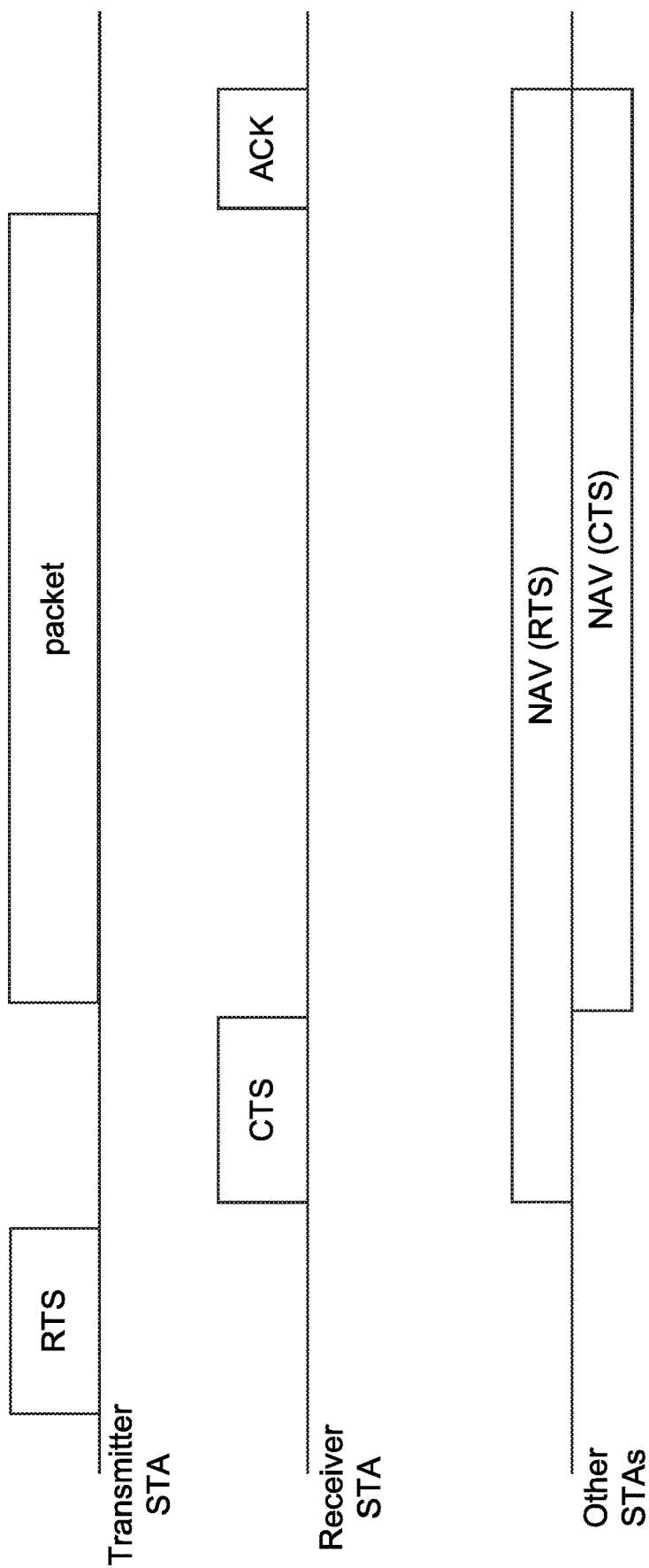
FIG. 5 is a communication sequence diagram of a station occupying the channel by using RTS/CTS exchange in CSMA/CA.

FIG. 5 depicts an example explaining how a station occupies the channel by using RTS/CTS exchange in CSMA/CA. Before the transmitter STA transmits the packet, it first sends an RTS frame to request channel occupancy time for the packet transmission. When the receiver STA receives the RTS frame, it can send a CTS frame back to the transmitter STA to report that the channel occupancy time is reserved for the packet transmission. The other STAs receiving RTS and CTS frames will set the network allocation vector (NAV) to reserve that time, so that during the period of time set by the NAV, the other STAs will not transmit any packets.

2. Problem Statement

The current wireless communication systems using CSMA/CA do not identify or distinguish, an RTA packet from a non-RTA packet, nor do they reserve specific channel times for RTA traffic. Under CSMA/CA all the packets must use the same random channel access scheme. The random channel access scheme in CSMA/CA cannot guarantee channel time for RTA packet transmission. CSMA/CA arranges channel access after the data arrives at the MAC layer. In most cases, the data has to wait in the queue to be transmitted, which causes a queuing delay for packet transmission.

The RTA packet in the present disclosure, however, has priority over non-RTA packets. In addition, within the RTA packets the RTA packet with higher priority is configured to transmit earlier than RTA packets with lower priority. However, the random channel access scheme in CSMA/CA is directed to fair access between all the packet transmissions, so that packets with lower priority have an equal chance to be transmitted earlier than packets with higher priority. The RTS/CTS exchange in CSMA/CA forces all the other STAs to set the NAV and keep quiet. Though this design protects the packet transmission between two STAs from the interference due to other STAs, it blocks channel access to other STAs, that may have more important data to be transmitted.

Conventional CSMA/CA is a distributed channel access mechanism such that there is no coordination between STAs, whereby the probability that multiple STAs simultaneously contend for the channel is high, thus leading to contention collision. When a channel contention collision occurs, the packet transmission is corrupted, which thus requires retransmission of the packet to remedy. And according to conventional WLAN implementations, each retransmission requires STAs to contend for the channel with ever longer contention windows, which also adds significant delay to packet transmission. The random channel access scheme in CSMA/CA uses RTS/CTS to avoid channel contention collisions.

However, RTS/CTS is only allowed to be utilized after the packet arrives at the MAC layer of the STA, thus allowing two neighboring APs to schedule the same channel time for packet transmission. If they continue to schedule the same channel time periodically, they may have contention collision for a long time.

3. Contributions of Present Disclosure

By utilizing the disclosed technology, STAs are able to identify and distinguish RTA packets from non-RTA packets. The disclosed technology allows the STA to have knowledge of the arrival time of RTA traffic at its MAC layer and schedule the future channel time for RTA traffic transmission. The disclosed technology allows the STAs to share channel scheduling for RTA traffic transmission between each other. Each STA is able to adjust its own scheduled channel time for RTA traffic transmission to avoid the channel contention collision. The disclosed technology allows the STA to use multiple methods to reduce the probability of channel contention collisions when the STA knows there are multiple STAs contending for the channel. The disclosed technology allows the STA to occupy the channel before the RTA packet arrives. When the RTA packet arrives, the STA can transmit the packet without contending for the channel. The disclosed technology also is configured for backward compatibility with legacy CSMA/CA devices.

4. Example Embodiments

4.1. STA Hardware Configuration

Figure 6:
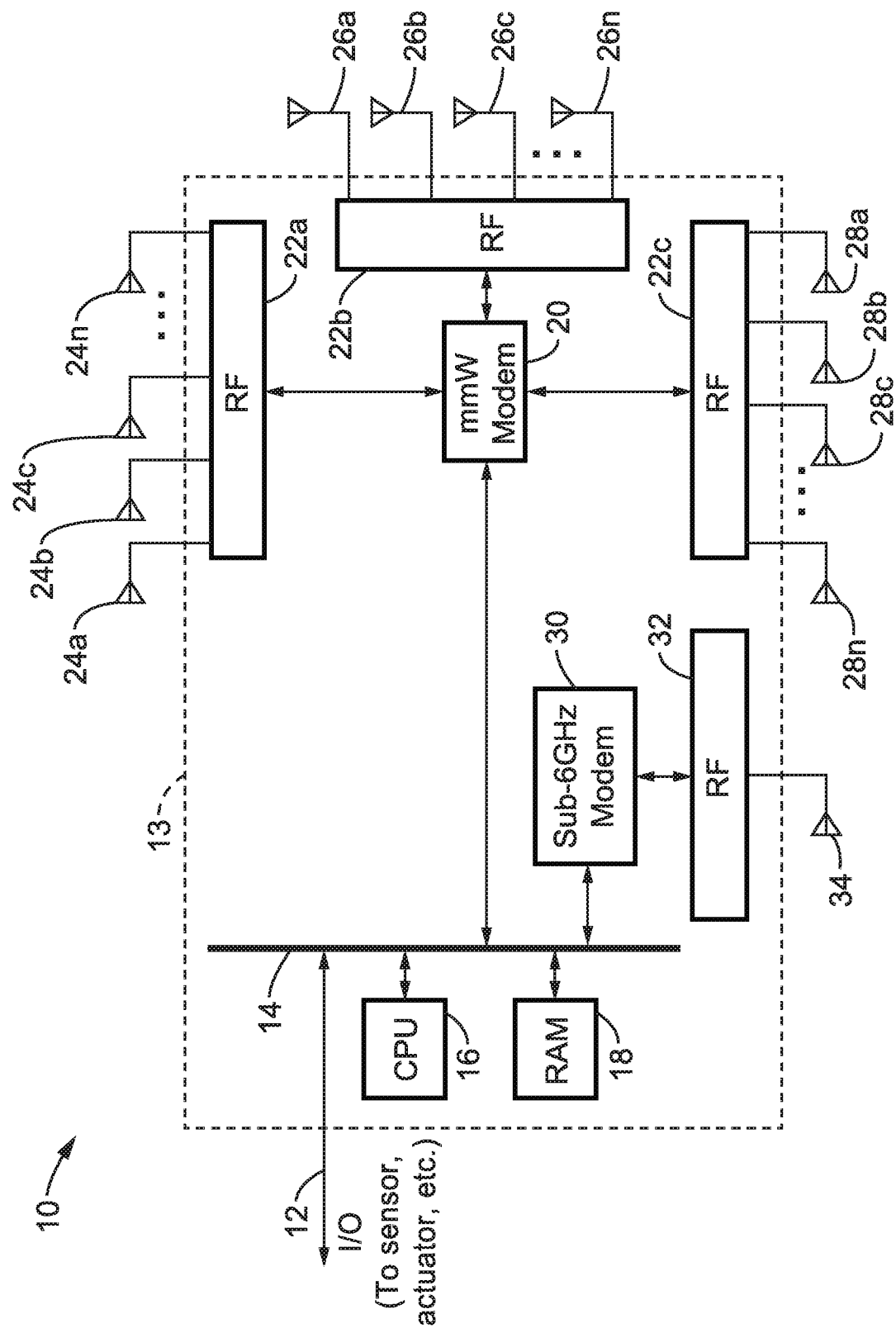
FIG. 6 is a block diagram of station (STA) hardware according to at least one embodiment of the present disclosure.

FIG. 6 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA" (a station attempting to join the network), or one of the STAs already in the network. It should also be appreciated that the programming is configured to operate in different modes (source, intermediate, destination, access point (AP) and so forth); depending on what role it is playing in the current communication context.

The STA may be configured with a single modem and single radio-frequency (RF) circuitry, or it may be configured with multiple modems and multiple RF circuits as depicted by way of example and not limitation in the figure.

In this example, the host machine is shown configured with a millimeter-wave (mmW) modem 20 coupled to radio-frequency (RF) circuitry 22a, 22b, 22c to a plurality of antennas 24a-24n, 26a-26n, 28a-28n to transmit and receive frames with neighboring STAs. In addition, the host machine is also seen with a sub-6 GHz modem 30 coupled to radio-frequency (RF) circuitry 32 to antenna(s) 34, although this second communication path is not absolutely necessary for implementing the present disclosure.

Thus, this host machine is shown configured with two modems (multi-band) and their associated RF circuitry for providing communication on two different bands. By way of example and not limitation the intended directional communication band is implemented with a millimeter-wave (mmW) band modem and its associated RF circuitries for transmitting and receiving data in the mmW band. The other band, generally referred to a discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits, in a desired frequency band or range of frequency bands. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

It is seen therefore, that the host machine accommodates a modem which transmits/receives data frames with neighboring STAs. The modem is connected to at least one RF module to generate and receive physical signals. The RF module(s) are connected to multiple antennas which are controlled to perform beamforming for transmission and reception. In this way, the STA can transmit signals using multiple sets of beam patterns.

4.2. Example STA Topology for Consideration

Figure 7:
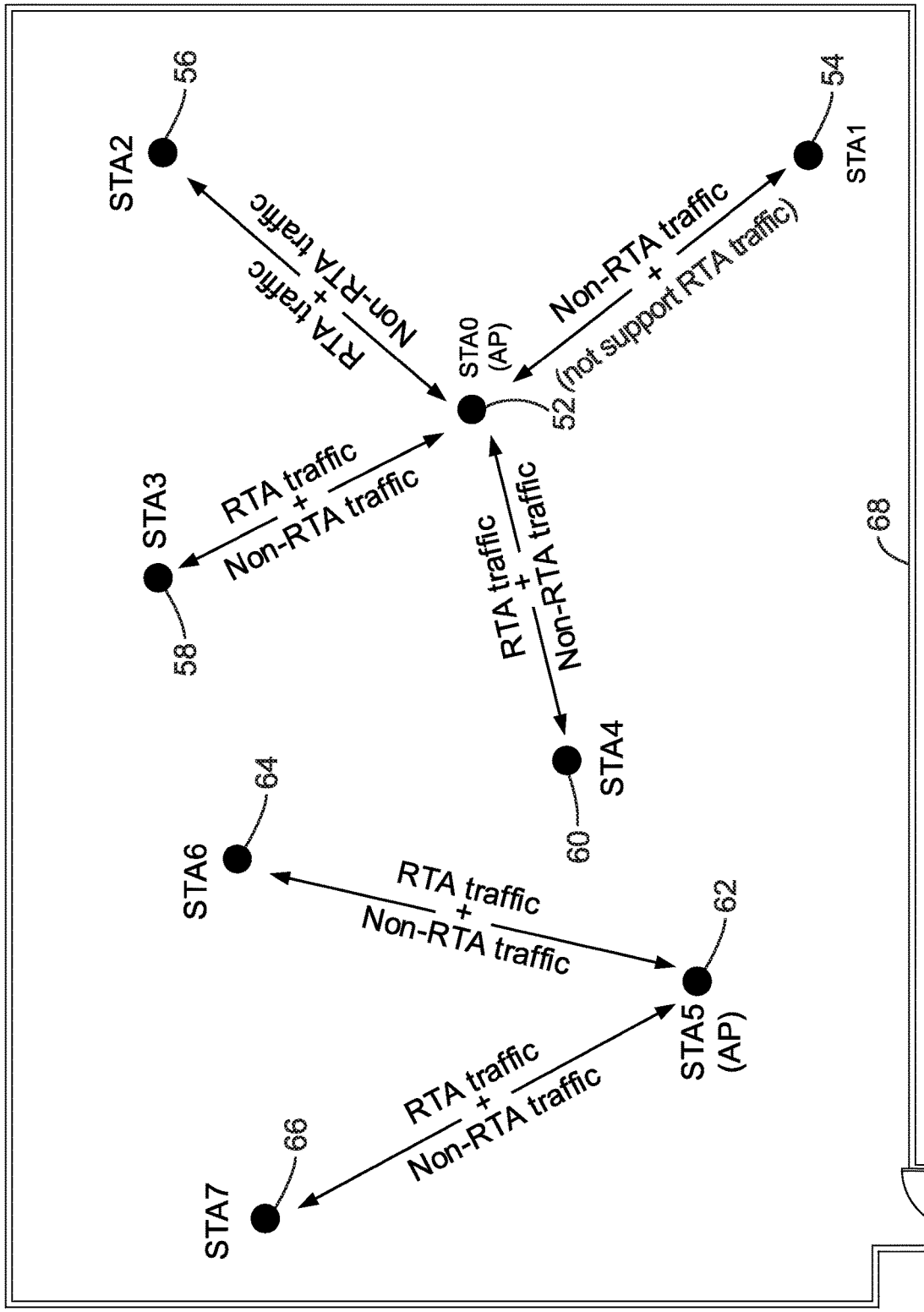
FIG. 7 is a network topology diagram showing a topological example addressed according to at least one embodiment of the present disclosure.

FIG. 7 illustrates an example network topology (scenario) 50 as an aid to explaining the goal of the disclosed technology. By way of example and not limitation, this example assumes there are eight (8) STAs consisting of two Basic Service Sets (BSSs) in a given area 68, herein exemplified as a room. Each STA can communicate with the other STAs in the same BSS. All STAs use CSMA/CA for random channel access. A first BSS depicts STA0 52 operating as an access point (AP) and non-AP stations STA1 54, STA2 56, STA3 58 and STA4 60. A second BSS depicts STA5 62 as AP along with STA6 64, STA7 66.

As shown in FIG. 7, STA 1 is a legacy STA that transmits all the packets using CSMA/CA. That is, the disclosed technologies are not applied to this STA. All the other STAs in this example are considered to support both applications requiring low latency communication and applications that utilize best effort communication. The data generated from the application requiring low latency communication is called Real Time Application (RTA) traffic and will be packetized as RTA packets at the transmitter STA. Also, the data generated from the non-time sensitive applications are called non-RTA traffic and are packetized as non-RTA packets at the transmitter STA. As a consequence, the transmitter STA generates both RTA traffic and non-RTA traffic for communication. The location of the STAs and their transmission links are as shown in this example network topology figure.

When the STA transmits a non-RTA packet, the STA can follow the regular CSMA/CA scheme. When the STA transmits an RTA packet, the STA schedules the channel time for transmission in advance. One goal of the disclosed technology is to reduce latency of RTA traffic.

4.3. STA Layer Model

Figure 8:
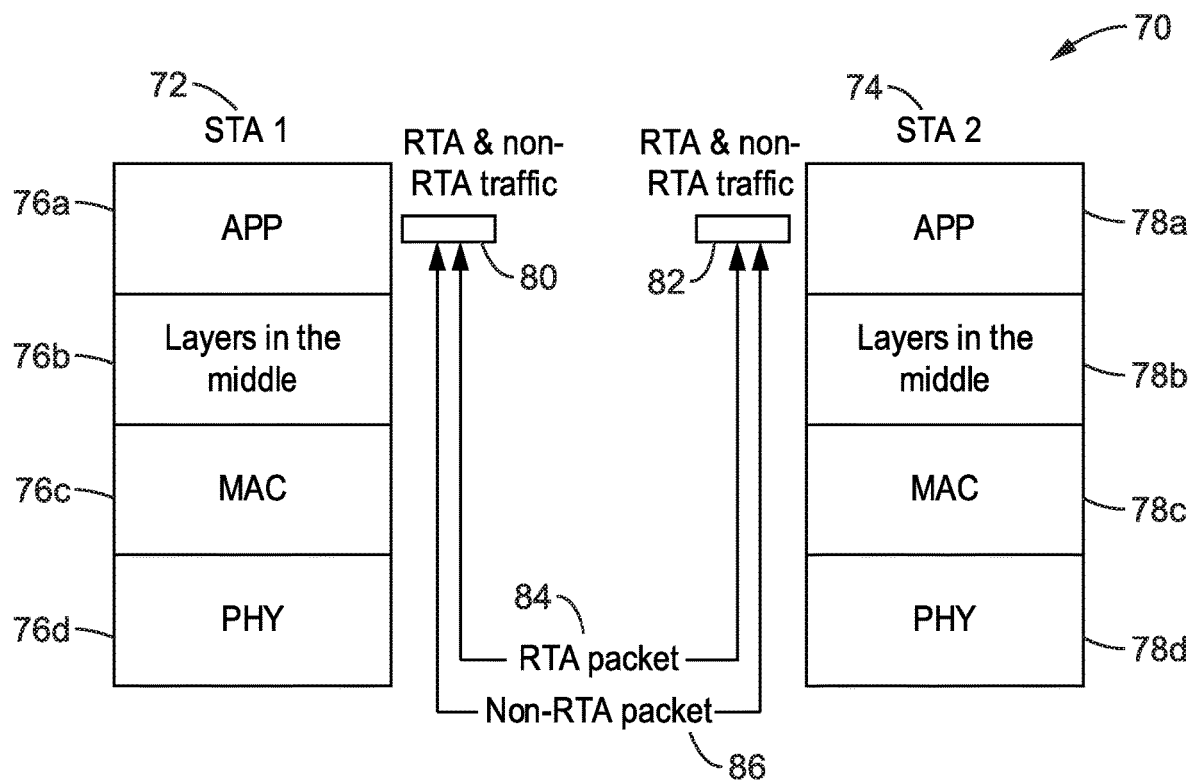
FIG. 8 is a layered communication diagram for RTA and non-RTA traffic communication in an open systems interconnection (OSI) model according to at least one embodiment of the present disclosure.

FIG. 8 illustrates an example embodiment 70 of RTA and non-RTA traffic communication which generally follow an Open Systems Interconnection (OSI) model. In an OSI model there is an Application Layer, Transport Layer, Network Layer (IP), Data Link Layer (MAC), and Physical Layer (PHY). In the present disclosure the transport layer and network layer are merely referred to as layers in the middle, with the described protocol (e.g., proposed IEEE802.11 variant/standard) utilizing the MAC and PHY layers.

In this section, the STA layer model for traffic communication is explained. As shown in this example two STAs, STA1 72 and STA2 74 generate RTA traffic and non-RTA traffic 80, 82 and communicate with each other with RTA packets 84 and non-RTA packets 86. The overall process is explained below.

Both RTA traffic and non-RTA traffic are generated by the APP layer 76a, 78a of the respective transmitter STAs. The APP layer of the transmitter STA passes the RTA traffic and non-RTA traffic to the MAC layer 76c, 78c via (through) layers in the middle 76b, 78b. The MAC layer 76c, 78c and the PHY layer 76d, 78d append additional signal fields in the MAC header and PLCP header to the packet, and the packets are transmitted over the PHY layer of the network.

The receiver STA receives the packets at the PHY layer, decodes and sends them to its MAC layer if the packets are decoded correctly, after which the data is fed to its APP layer through (via) layers in the middle.

4.4. Mechanism for Identifying RTA and Non-RTA Packets

The disclosed technology classifies packets in the wireless communication system as being either RTA or non-RTA packets. RTA packets use the disclosed technologies for packet transmissions, while non-RTA packets may use the regular CSMA/CA scheme. To that end, the STA identifies and distinguishes between the RTA packet and the non-RTA packet at the MAC layer, as is described in this section.

According to the STA layer model shown in FIG. 8, it is possible that the MAC layer of the transmitter STA identifies the RTA traffic and non-RTA traffic from the upper layers and packetizes them into RTA packets and non-RTA packets, respectively. This section provides the details of how the transmitter STA identifies the RTA traffic using prior negotiation.

According to the STA layer model shown in FIG. 8, the transmitter STA transmits the packets to the receiver STA over the PHY layer of the network. When the receiver STA receives the packet at the MAC layer, it is able to identify the RTA packet and non-RTA packet based on the information embedded in the MAC header or Physical Layer Convergence Protocol (PLCP) header. This section provides the details on how the receiver STA identifies the RTA packet based on the PLCP or MAC header information.

The RTA traffic has to be communicated within a given lifetime to assure data validity. In other words, if the RTA traffic is not received by the receiver before this lifetime expires, the RTA traffic is invalid and can be discarded. The STA packetizes the RTA traffic into RTA packets for transmitting through the PHY layer. Hence, the RTA packet also has a lifetime for its transmission. This section provides details of how the STA copes with the lifetime expiration of the RTA packet.

4.4.1. Prior Negotiation

Often, real time applications (RTAs) generate traffic periodically, just as with connection-oriented communication. RTA connection-oriented communications established by an application between STAs is called an RTA session. It is possible that STAs can have multiple RTA sessions in the network. Each STA according to the present disclosure is able to manage those RTA sessions properly.

Before an RTA session starts transmitting RTA traffic, a prior negotiation occurs between the transmitter STA and the receiver STA to establish the connection. During the prior negotiation, the transmitter STA and the receiver STA record the RTA session with the RTA session identifying information that can be used for identifying the RTA traffic at the MAC layer of the transmitter side and the RTA packet at the MAC layer of the receiver side.

As was shown in FIG. 8, when the APP layer passes the traffic to the MAC layer on the transmitter side, the layers in the middle add header information to the traffic. When the MAC layer of the transmitter STA receives traffic from the upper layers, it extracts the header information from the upper layers and looks up (searches) the RTA session records created by the prior negotiation. If the header information matches one RTA session in the records, the traffic is RTA; otherwise, the traffic is considered non-RTA. The header information that could be used for identifying RTA traffic is listed in Table 1. In this section, the details of the prior negotiation are described.

According to the prior negotiation results, it is also possible that the receiver STA classifies the RTA and non-RTA packet by the channel resource for packet transmission, such as time, frequency, and other metrics. When a packet is received using the channel resource that is granted for an RTA packet, then the STA identifies it as an RTA packet. Otherwise, that packet is a non-RTA packet. This scenario will be used when the packet is transmitted in multi-user uplink mode.

Figure 9:
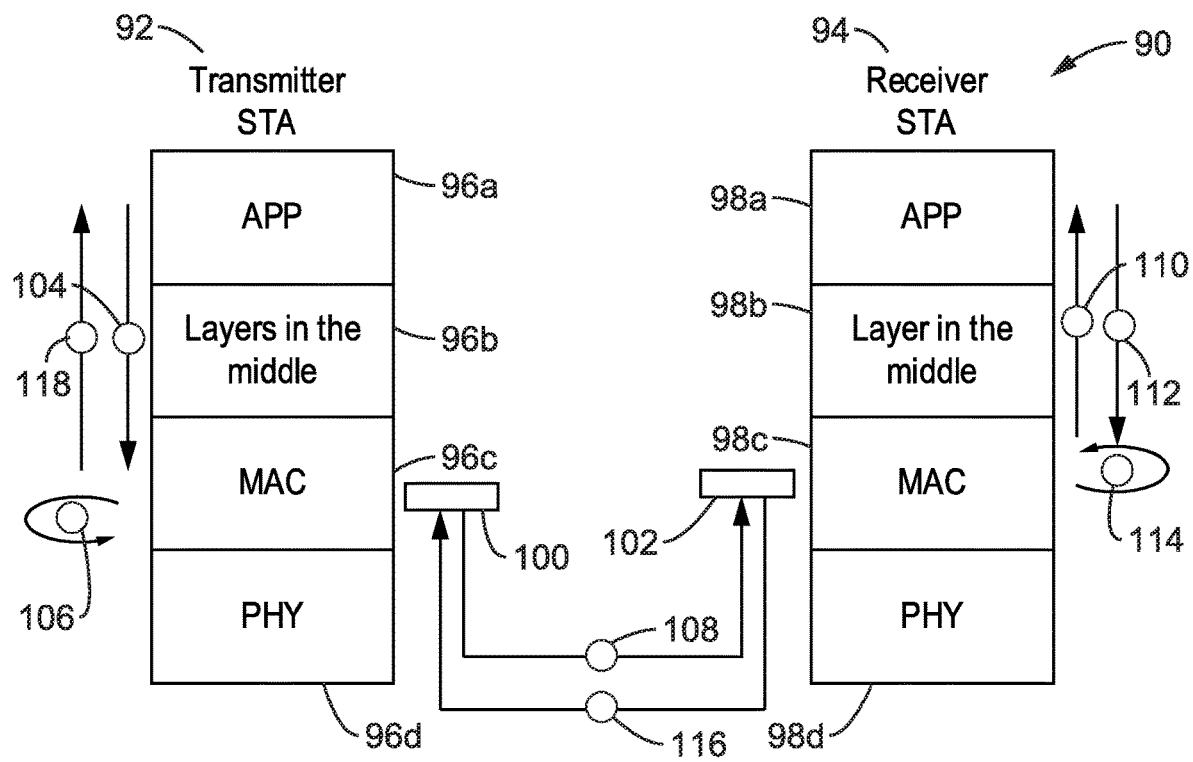
FIG. 9 is a layered communication diagram showing prior negotiation for RTA traffic communications according to at least one embodiment of the present disclosure.

FIG. 9 illustrates an example embodiment 90 of prior negotiation between transmitter 92 and receiver 94 for RTA traffic packet 100 at transmitter side and packet 102 at receiver side. It should be appreciated that one prior negotiation establishes one RTA session and could be used for all the RTA packets generated by that RTA session. The figure shows prior negotiation for establishing an RTA session between two STAs in a STA layer model as was seen in FIG. 8. A transmitter STA 92 is shown having layers APP 96a, layers in the middle 96b, MAC layer 96c and PHY layer 96d with a receiver STA 94 having the same layers APP 98a, layers in the middle 98b, MAC layer 98c and PHY layer 98d. The process of the prior negotiation is explained below.

Referring to FIG. 9, the following steps are seen. The APP layer 96a of transmitter 92 requests 104 a resource (e.g., time, channel) negotiation. Thus, on the transmitter STA side, the APP layer starts an RTA session and requests a negotiation of the channel resources, such as time and bandwidth, for its RTA traffic transmission. This negotiation request is transmitted from the management entity in the APP layer to the management entity residing in the MAC layer.

The MAC layer of the transmitter STA receives the negotiation request from the upper layer and checks 106 resource availability on its side. Also, it records the RTA session identifying information provided by the upper layers for identifying RTA traffic in the session. The record of the identifying information could be picked (selected) from the information listed in Table 1, such as TCP/UDP port number, the type of service, etc. It may deny the request from the upper layer, such as if the resource is unavailable, or re-negotiate with the upper layer.

If the MAC layer of the transmitter STA finds the resource available, it sends 108 a negotiation request frame to the MAC layer of the receiver STA. The negotiation frame contains the identifying information of the RTA session so that the receiver can record and use it afterwards.

After the MAC layer of the receiver STA receives the negotiation request frame, it first informs 110 its APP layer to get ready for receiving RTA packets by sending a negotiation request from the management entity in the MAC layer to the management entity in the APP layer. The negotiation may fail if the APP layer is not available for RTA transmission.

The APP layer of the receiver grants the availability of resources at its layer and sends 112 this information from the management entity in the APP layer to the management entity that resides in the MAC layer.

Then, the MAC layer of the receiver STA checks 114 the resource availability on its side. The MAC layer can deny or re-negotiate if the resource is unavailable. The MAC layer of the receiver STA collects all the negotiation information on its side and reports it 116 to the MAC layer of the transmitter.

The MAC layer of the transmitter receives the negotiation result and forwards it 118 to its APP layer. If the negotiation succeeds, the APP layer can start to transmit RTA traffic using the resource granted by both STAs.

According to the RTA session records created by the prior negotiation, the MAC layer of the transmitter STA identifies the RTA traffic and non-RTA traffic by the header information from the upper layers. When the APP layer generates RTA traffic, the RTA traffic is passed to its MAC layer with the header information provided by the layers in the middle. By looking up the RTA session records created by the prior negotiation, the transmitter STA is able to use that header information to identify the RTA traffic and packetizes the RTA traffic into RTA packet at the MAC layer.

Figure 10:
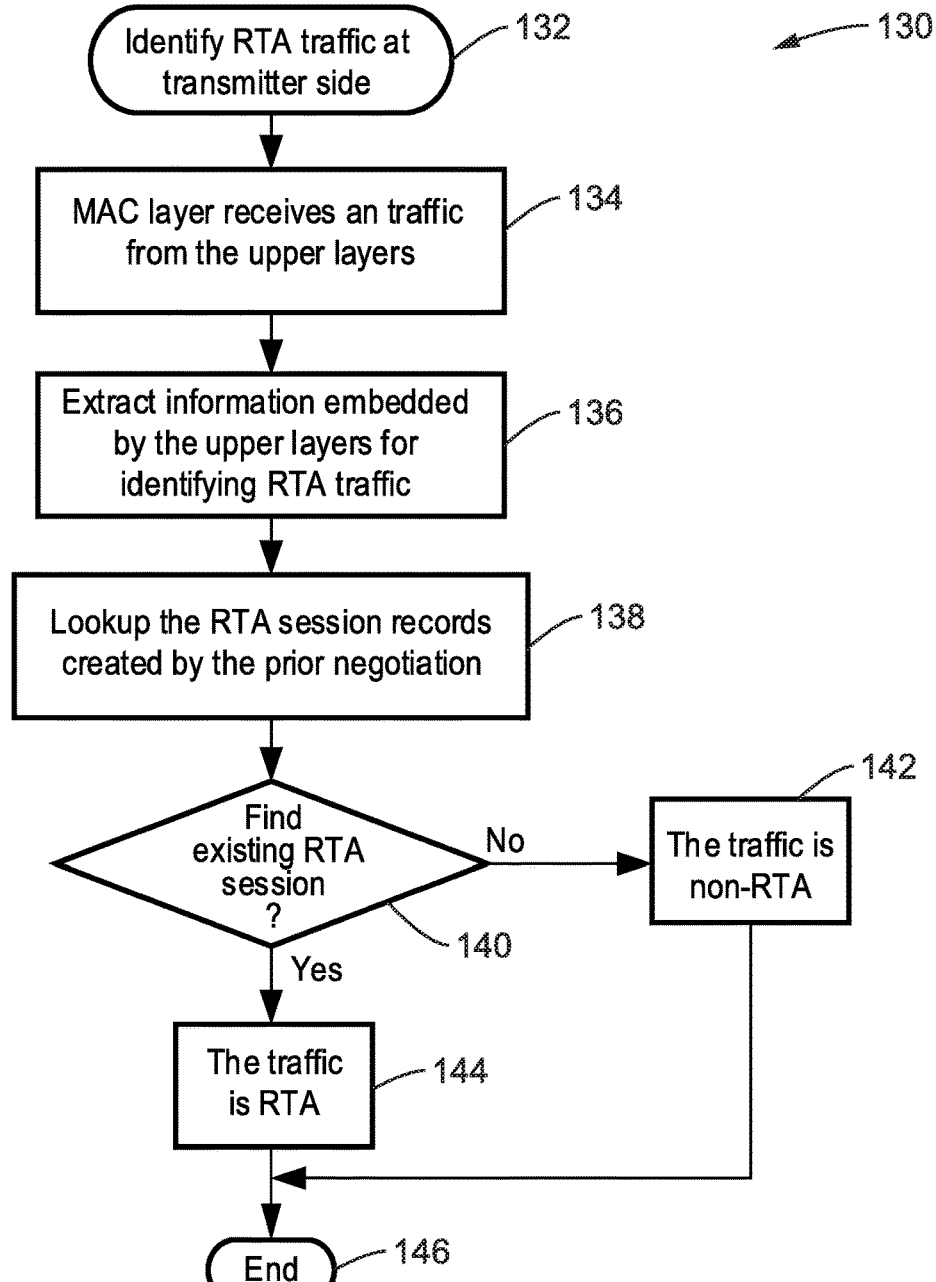
FIG. 10 is a flow diagram of identifying RTA packet traffic on the transmitter side according to at least one embodiment of the present disclosure.

FIG. 10 illustrates an example embodiment 130 of identifying RTA packet traffic on the transmitter side. The routine starts 132 and the MAC layer of the transmitter STA receives traffic 134 from the upper layer. The MAC layer extracts 136 information embedded by the upper layer for identifying RTA traffic, and is checking the header information of the upper layers, such as the type of service and the TCP/UDP port number.

The MAC layer of the transmitter STA compares (looks up) 138 the header information from the upper layers with the RTA session records created by the prior negotiation. A check 140 is made on the header information. If the header information from the upper layers matches an RTA session in the record, then block 144 is reached with the traffic determined to be RTA traffic, otherwise block 142 is reached with the traffic considered to be non-RTA traffic, after which processing ends 146.

4.4.2. Packet Header Information

Figure 11:
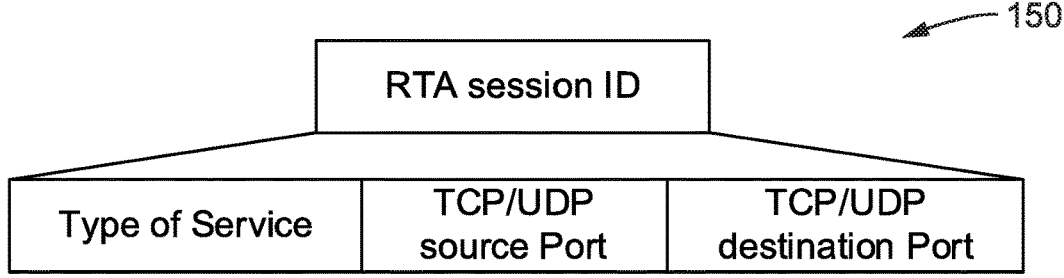
FIG. 11 is a data field diagram of RTA session identifying information according to at least one embodiment of the present disclosure.

FIG. 11 illustrates an example embodiment 150 of an RTA session identifying information format. When the transmitter STA generates RTA packets, it adds additional signal fields in the PLCP or MAC header. When the additional signal field contains the RTA session identifying information, the receiver STA can use the RTA session identifying information in the PLCP or the MAC header to distinguish at the MAC layer between an RTA packet and a non-RTA packet. One example of the RTA session identifying information is shown in the figure.

Figure 12:
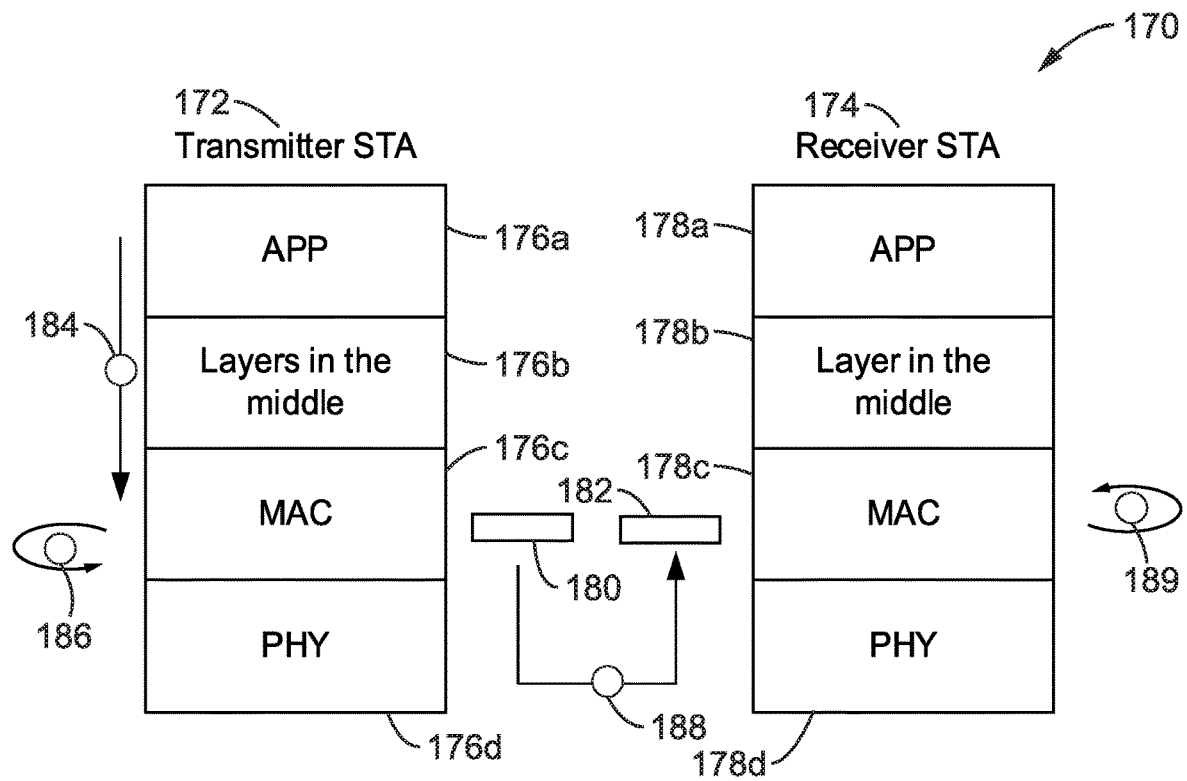
FIG. 12 is a layered communication diagram of header information exchange according to at least one embodiment of the present disclosure.

FIG. 12 illustrates an example embodiment 170 of header information exchange 180, 182 between APP layer and MAC layer. A transmitter STA 172 is seen with APP layer 176*a*, layers in the middle 176*b*, MAC layer 176*c*, and PHY layer 176*d*. A receiver STA 174 is seen with the same layers APP layer 178*a*, layers in the middle 178*b*, MAC layer 178*c*, and PHY layer 178*d*.

The figure depicts details of how this process works between two STAs in the STA layer model. The APP layer of the transmitter STA generates 184 RTA traffic and passes it to the MAC layer. When the traffic is passed through the layers in the middle, the header information, such as the type of service field and the TCP/UDP port numbers is added to the traffic.

When the MAC layer of the transmitter STA receives the RTA traffic from the upper layer, it extracts the header information, such as the type of service and the TCP/UDP port numbers from the traffic. By looking up the RTA session records created by the prior art, the MAC layer identifies 186 the traffic is RTA.

Then the MAC layer of the transmitter STA packetizes the traffic into an RTA packet 180 and embeds the type of service and the TCP/UDP port numbers in the MAC header or the PLCP header as the RTA session identifying information. One example of the RTA session identifying information was shown in FIG. 11. Next, the transmitter STA sends 188 the RTA packet to the receiver STA which receives it as packet 182.

When the receiver STA receives the RTA packet at its MAC layer, it can identify 189 the RTA packet based on the RTA session identifying information in the PLCP or the MAC header.

Figure 13:
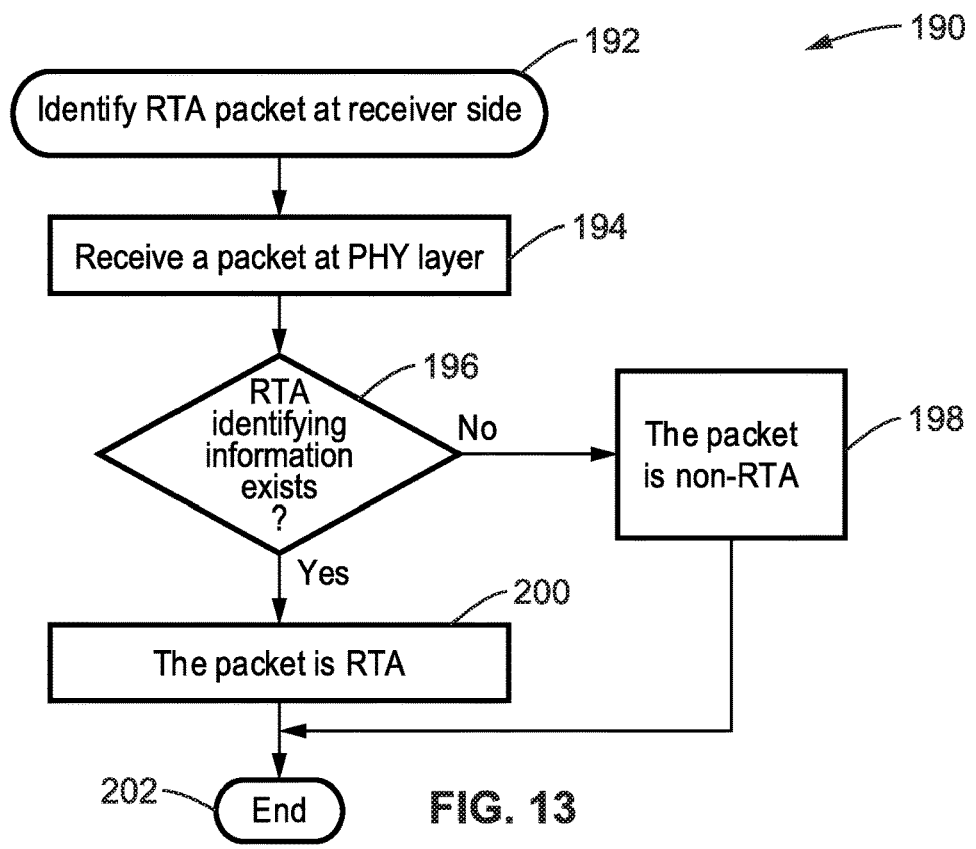
FIG. 13 is a flow diagram of identifying an RTA packet on the receiver side at the MAC layer according to at least one embodiment of the present disclosure.

FIG. 13 illustrates an example embodiment 190 of a process for identifying an RTA packet on the receiver side at the MAC layer. The process starts 192 and the receiver receives a packet at the PHY layer 194. As explained in FIG. 12, the MAC header or the PLCP header of RTA packets includes the identifying information of a RTA session. Referring again to FIG. 13 a check is made 196 to determine if the identifying information exists. If the identifying information exists, then execution moves to block 200 as the receiver STA has determined that the packet is an RTA packet. Otherwise, if the information does not exist, then execution moves from block 196 to 198, as it has been determined that the packet is a non-RTA packet. After which the process ends 202.

4.4.3. RTA Packet Lifetime Expiration

In the conventional WLAN, the retransmissions of a packet are discontinued when the number of retransmissions of that packet exceeds the retry limit, and the packet is dropped. However, the RTA packet has a limited lifetime for being transmitted, and may not be valid through multiple retransmission attempts. The system of the present disclosure is configured so that when the lifetime of the RTA packet expires, the retransmission of that RTA packet stops and the packet is dropped.

The RTA traffic has a lifetime which represents the time during which the information of the packet (traffic) is considered valid. The lifetime of the RTA packet is used to ensure that the RTA traffic carried by the packet is valid when the packet is received by the receiver STA. Therefore, the lifetime of the RTA packet should not be longer than the lifetime of the RTA traffic. In the simplest case, those two lifetimes can be set to the same value.

Figures 14, 15:
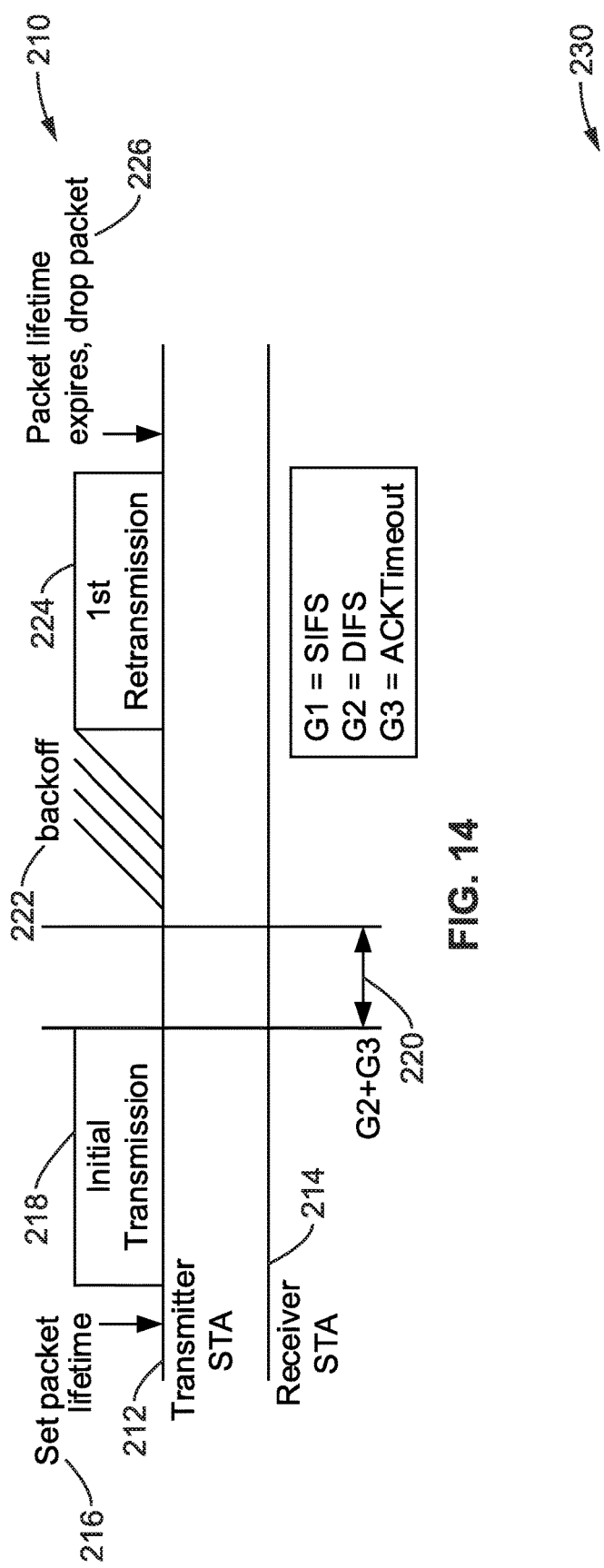
FIG. 14 is a communication sequence diagram of an RTA packet being dropped due to an expired packet lifetime according to at least one embodiment of the present disclosure.
FIG. 15 is a data field diagram of RTA session information according to at least one embodiment of the present disclosure.

FIG. 14 illustrates an example embodiment 210 of an RTA packet being dropped due to an expired packet lifetime, in particular the case of when the retransmission of an RTA packet is not scheduled due to the expiration of the packet lifetime. The figure depicts a transmitter STA 212 and receiver STA 214. When the transmitter STA transmits an RTA packet, it sets a lifetime 216 to transmit that packet. An initial transmission is seen 218. In the figure the value G1 represents Short Interframe Spaces (SIFS), G2 represents Distributed Coordination Function (DCF) Interframe Spaces (DIFS) and G3 represents an ACKnowledgement (ACK) Timeout. Before performing any retransmitting of the RTA packet, the transmitter STA checks whether the lifetime of the packet expires. The retransmission is not scheduled and that packet is dropped if the lifetime has expired. In this example, the transmitter after the period 220 (G2+G3), and performs a backoff 222, after then having obtained the channel, the STA transmits a first retransmission 224 since the packet lifetime has not expired. After that, it checks the packet lifetime and it is found in this example that it has expired 226, so it stops retransmitting and drops the packet.

On the receiver side, the RTA packet could be stored in the buffer before the packet lifetime expires. When the packet lifetime expires, the receiver should delete that packet from the buffer since the RTA traffic in the packet is no longer valid.

4.5. Creating an RTA Session

This section details how a STA creates (initiates) an RTA session and how the STA manages multiple RTA sessions at its MAC layer. As mentioned in Section 4.4.1, the transmitter and the receiver STAs are able to identify the RTA traffic or packet by looking up the RTA session record created by prior negotiation. The disclosed technology allows the STAs to create an RTA session table when a STA has RTA sessions to be established. A STA collects information about each RTA session and records the information in the RTA session table. RTA sessions can be inserted, removed, and modified in the table.

4.5.1. RTA Session Information

When a STA records an RTA session, it collects the information of that RTA session which could be used to track the session. In order to track the RTA session, the following requirements must be met. (a) Identifying information to identify the RTA session and distinguish it from other RTA sessions. (b) Collecting status information to report the recent status of the RTA session. (c) Obtaining information to indicate the transmission quality requirement of the RTA traffic generated by the RTA session. (d) Utilizing transmission information to show the channel resource that is distributed to the RTA traffic generated by the RTA session. In at least one embodiment this session information is retained in a session table.

FIG. 15 illustrates an example embodiment 230 of RTA session information. The identifying information that is from the MAC header, such as Source MAC Address and Destination MAC Address, which are from the layers above the MAC layer are listed in Table 1, such as Session ID, Type of Service, Source IP Address, Source Port, Destination IP Address, Destination Port.

The following describes aspects of the status information such as Session Status, Comment, and Last Active Time. The session status shows whether the RTA session is set to generate traffic or not. Table 2 lists the possible states of RTA session status. When the RTA session status is active, the RTA session is enabled and generating RTA traffic. When the RTA session status is inactive, the RTA session is disabled to not generate RTA traffic by the user. When the RTA session status is error, the RTA session is not able to generate or transmit RTA traffic because of the error.

The Comment field can be used to show the details of the RTA session status. It can be used to carry warnings or error messages. For example, the comment could indicate that the transmission quality is poor when multiple RTA packets have been corrupted in the session.

The Last Active Time can be used to trigger an event, such as to check the status of the RTA session. Last Active Time is updated every time when RTA packet transmission occurs for the RTA session. This information can be used to track whether the RTA traffic is generated or delivered regularly. If the last active time is not updated for a certain period of time, then the RTA session is not generating or delivering RTA traffic. In at least one embodiment the RTA session status is regularly checked to determine whether errors are occurring.

Requirement information including Bandwidth Requirement, Delay Requirement, Jitter Requirement, Periodic Time, Priority, Session Start Time, and Session End Time are now described. The Bandwidth Requirement indicates the amount of RTA traffic to transmit. The Delay Requirement indicates the transmission delay of the RTA packets. The Jitter Requirement indicates the maximum difference in the RTA packet delay during each periodic transmission time. The Periodic Time indicates the period of time between RTA transmissions in the RTA session. That is to say that the RTA session generates traffic every "periodic time". The Priority indicates the priority of the RTA traffic. The system is configured to first transmit RTA traffic with higher priority. The Session Start Time and Session End Time indicates the start time and the end time of the RTA session.

Transmission information including Time Allocation options, Resource Unit (RU) Allocation, and Space Stream (SS) Allocation are now described. The Time Allocation options provide the options of method in which the AP is allowed to allocate channel time for the RTA packet transmissions. For example, as shown in Table 3, the option of "Flexible" indicates that the AP has full flexibility to schedule channel time for the transmission. The option of "Fixed" indicates that the AP must allocate constant channel time for the transmission. The option of "Random" indicates that the allocated channel time is chosen randomly for each period. The option of "Algorithm" indicates that the allocated channel time is determined by a selected algorithm (process/routine). The RU allocation option field provides options on how the resource unit (RU) of the channel is distributed to the RTA session for transmission. The RU is a unit in Orthogonal Frequency Division Multiple Access (OFDMA), according to terminology used in IEEE 802.11ax, which determines which channel frequency to use for transmission. The options can be similar to those provided in the time allocation options. The SS allocation option field indicates the options of the Spatial Stream allocation for the RTA session traffic transmission. The SS allocation can represent a unit in MIMO terminology as used in IEEE 802.11, or an index of directional antenna patterns in beamforming terminology. The options can be similar to those provided in the time allocation options.

4.5.2. RTA Session Table

Table 4 depicts an example of RTA session table created by STA 0 when considering the network topology in FIG. 7. Although the RTA session in this table could contain all the information listed in FIG. 15, or additional fields as desired, it has been shown with fewer fields in this RTA session table to simplify representation and understanding. The RTA session table at STA 0 (AP) as shown in Table 4 contains three RTA sessions. Each row in the table represents an RTA session, with the session ID field is simplified to an index number ("#"). The first row represents RTA session 1 (simplified Session ID), which transmits RTA traffic from STA 2 to STA 0. RTA session 1 starts at 1 ms (Session Start Time) and ends at 900 ms (Session End Time). Every time the RTA session generates traffic, STA 0 has full flexibility to allocate channel time (Time Allocation Options), the RU (RU Allocation Options) as well as the spatial stream (SS Allocation Options). The periodic Time of RTA session 1 is 10 ms, which means RTA session 1 generates RTA traffic every 10 ms.

The second row represents RTA session 2, which transmits RTA traffic from STA 0 to STA 3. RTA session 2 starts at 3 ms and ends at 800 ms. Every time the RTA session generates traffic, STA 0 has full flexibility to allocate channel time (Time Allocation Options) and the RU (RU Allocation Options), however, the spatial stream (SS Allocation Options) in this case are fixed. The periodic Time of RTA session 2 is 20 ms, indicating that RTA session 2 generates RTA traffic every 20 ms.

The third row represents RTA session 3, which transmits RTA traffic from STA 0 to STA 4. RTA session 3 starts at 3 ms and ends at 800 ms. Every time the RTA session generates traffic, STA 0 has full flexibility to allocate channel time (Time Allocation Options), RU (RU Allocation Options) as well as the spatial stream (SS Allocation Options). The periodic Time of RTA session 3 is 20 ms, which indicates that RTA session 3 generates RTA traffic every 20 ms.

4.5.3. Initiation Between AP and STA

This section provides details on how an RTA session is initiated between an AP and its associated STA. Before a STA transmits RTA traffic, the AP and STA create an RTA session with RTA session information. The RTA session information is recorded in the RTA session table at both AP and STA, which can be used to identify RTA traffic and the RTA packet. The AP is able to manage the RTA sessions using the RTA session table. As described in Section 4.4.1, an RTA session uses the prior negotiation to establish the RTA traffic communication between STAs. During this procedure, a management frame exchange is performed to share the RTA session information between STAs.

Figure 16:
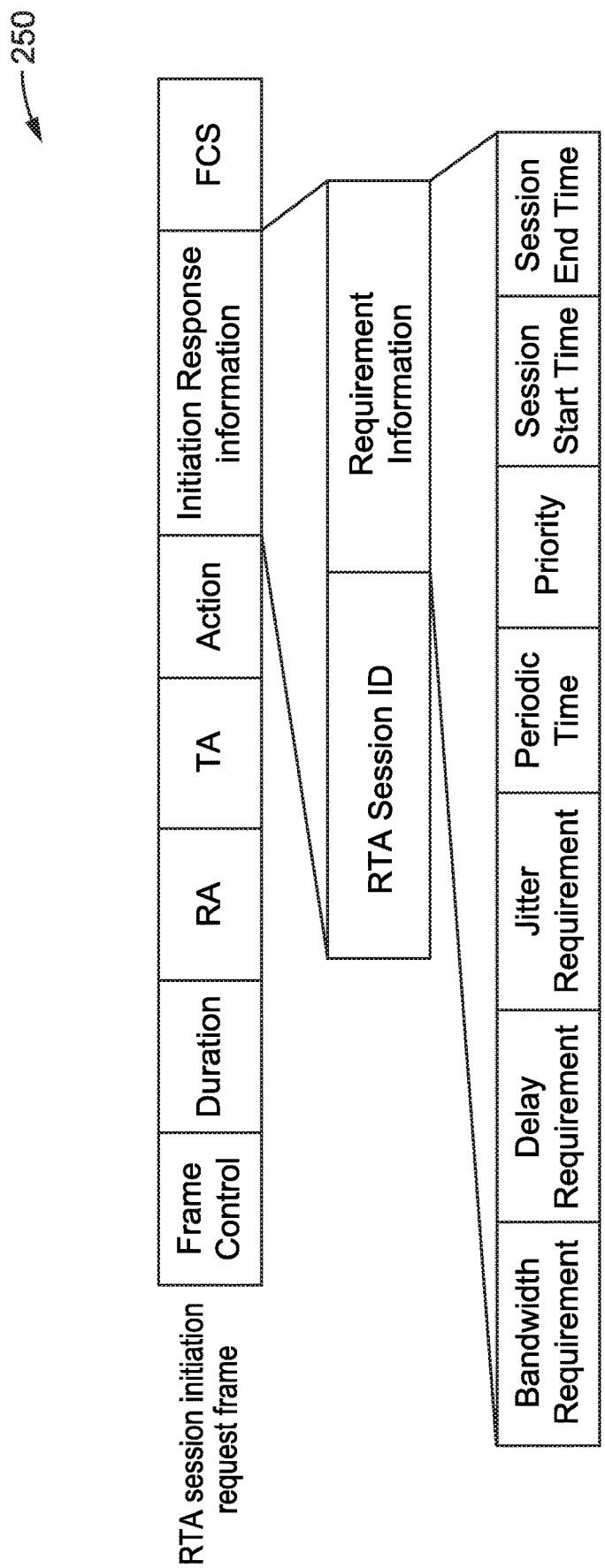
FIG. 16 is a data field diagram of an RTA request initiation request frame according to at least one embodiment of the present disclosure.
Figure 17:
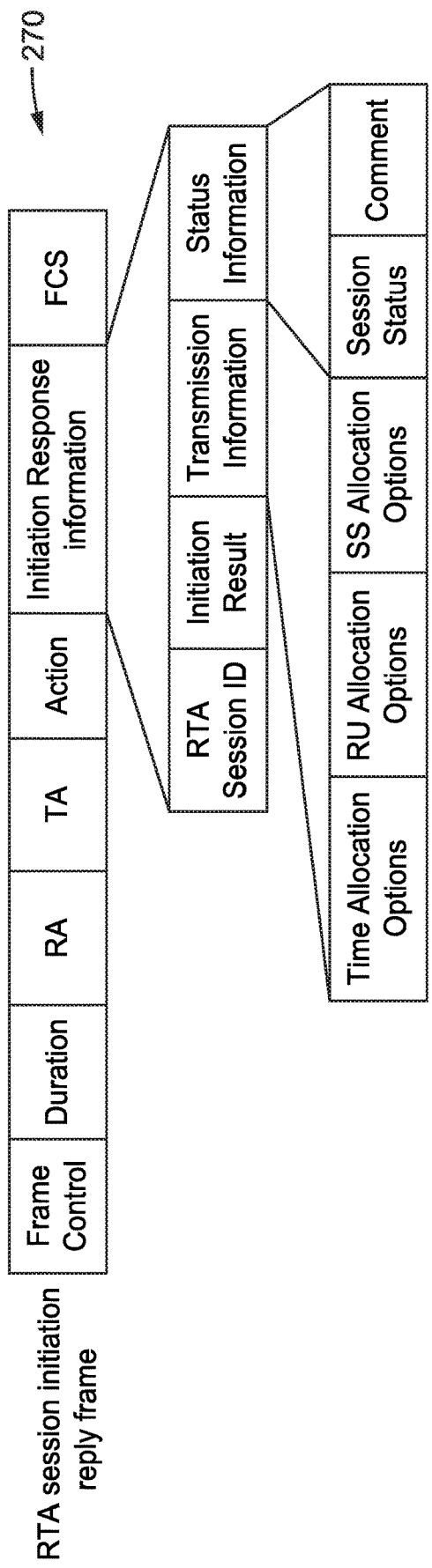
FIG. 17 is a data field diagram of an RTA request initiation reply frame according to at least one embodiment of the present disclosure.
Figure 18:
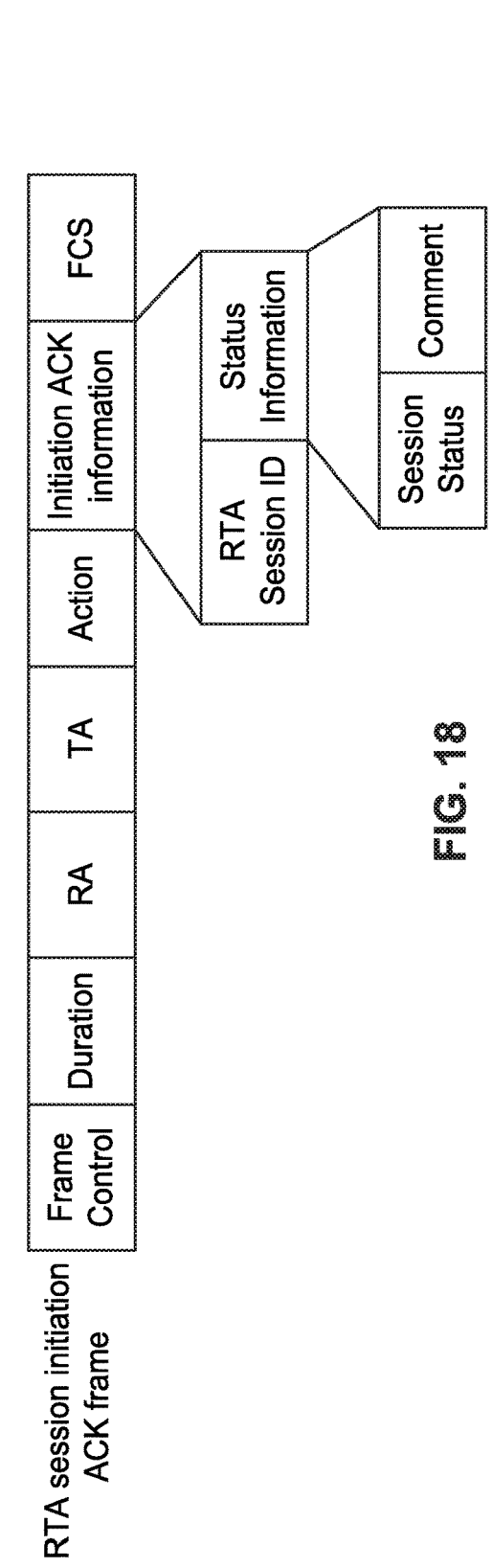
FIG. 18 is a data field diagram of an RTA session initiation acknowledgement (ACK) frame according to at least one embodiment of the present disclosure.
Figure 19:
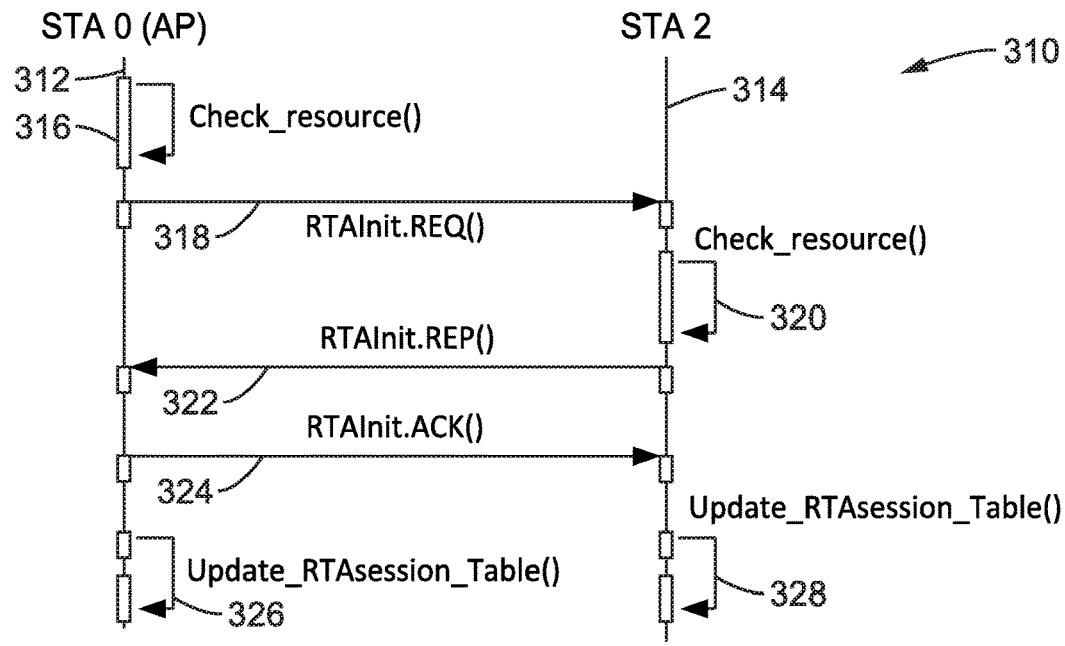
FIG. 19 is a communication interchange diagram of initiating an RTA session from the perspective of the MAC layer as performed according to at least one embodiment of the present disclosure.

FIG. 16, FIG. 17 and FIG. 18 illustrate an example embodiment of management frames 250, 270, 290 used to initiate an RTA session, while FIG. 19 depicts an example of how STAs exchange the management frames at the MAC layer to initiate an RTA session.

In FIG. 16 is shown the content of the RTA session initiation request frame having the following fields. (a) A Frame Control field indicates the type of the frame. (b) A Duration field contains NAV information used for CSMA/CA channel access. (c) An RA field contains an address for the recipient of the frame. (d) A TA field contains the address of the STA that transmitted the frame. (e) An Action field indicates the type of management frame, and in this case indicates that the management frame is an RTA session initiation request frame. (f) An Initiation Request Information field follows the Action field when the Action field indicates that the frame is RTA session initiation request frame, and it contains the following fields. (f)(i) An RTA Session ID which provides identifying information of RTA session, as was seen in FIG. 11. (f)(ii) A Resource Requirement field indicating the information required about the RTA session as described in Section 4.5.1., which contains the following fields. (f)(ii)(A) A Bandwidth Requirement field indicates the amount of the RTA traffic to transmit. (f)(ii)(B) A Delay Requirement field indicates the transmission delay of the RTA packets. (f)(ii)(C) A Jitter Requirement field indicates the maximum difference in the RTA packet delay during each periodical transmission time. (f)(ii)(D) A Periodic time indicates the duration of time that RTA session generates RTA traffic once. (f)(ii)(E) A Priority field indicates the priority of the RTA traffic. (f)(ii)(F) A Session Start Time field and Session End Time field indicate the start time and the end time of the RTA session, respectively. (g) An FCS field at the ends provides a Frame Check Sequence.

In FIG. 17 is seen fields within the RTA session initiation reply frame. (a) A Frame Control field indicates the type of the frame. (b) A Duration field contains NAV information used for CSMA/CA channel access. (c) An RA field contains an address for the recipient of the frame. (d) A TA field contains the address of the STA that transmitted the frame. (e) An Action field indicates the type of management frame, and in this case it indicates that the management frame is an RTA session initiation reply frame. (f) An Initiation Response Information field follows the Action field when the Action field indicates that the frame is an RTA session initiation reply frame, and it contains the fields as follows. (f)(i) An RTA Session ID field provides identifying information of the RTA session, and content of which was shown in FIG. 11. (f)(ii) An Initiation Result field is a small field, such as only one bit, that provides an indication of whether the initiation is granted or not. When this field is set to a first state (e.g., "1"), then the initiation is granted by the other STA, otherwise this field is set to a second state (e.g., "0") indicating the initiation was not granted. (f)(iii) A Transmission Information field provides transmission information of the RTA session as was described in Section 4.5.1, and contains the following subfields. (f)(iii)(A) A Time Allocation Option field shows the options of allocation method to distribute the channel time to the RTA session for transmission. (f)(iii)(B) An RU Allocation Options field shows the options of allocation method to distribute the resource unit (RU) of the channel to the RTA session for transmission. (f)(iii)(C) An SS Allocation Options field indicates the options of allocation method to distribute the spatial stream to the RTA session. (f)(iv) A Status Information field indicates status information of the RTA session as described in Section 4.5.1, and includes the following subfields. (f)(iv)(A) A Session Status field indicates the status of RTA session. (f)(iv)(B) A Comment field indicates more details of the RTA session status, which for example can be used to report the initiation result and its details. (g) An FCS field at the ends provides a Frame Check Sequence.

In FIG. 18 is shown the contents of an RTA session initiation ACK frame having the following fields. (a) A Frame Control field indicates the type of frame. (b) A Duration field contains NAV information used for CSMA/CA channel access. (c) An RA field contains an address for the recipient of the frame. (d) A TA field contains the address of the STA that transmitted the frame. (e) An Action field indicates the type of management frame, which in this case indicates that the management frame is an RTA session initiation ACK frame. (f) An Initiation ACK Information field follows the Action field when the Action field indicates that the frame is RTA session initiation ACK frame, and contains the following fields. (f)(i) An RTA Session ID field which provides information on the RTA session, and whose content was shown in FIG. 11. (f)(ii) A Status Information field contains status information of RTA session as described in Section 4.5.1. and contains the following subfields. (f)(ii) (A) A Session Status field indicates the status of the RTA session. (f)(ii)(B) A Comment field indicates more details of the RTA session status. (g) An FCS field at the end provides a Frame Check Sequence.

FIG. 19 illustrates an example embodiment 310 of a communications procedure of initiating an RTA session from the perspective of the MAC layer, depicting interaction between an AP station (STA 0) 312 and a second station (STA 2) 314. As shown in the figure, STA 0 initiates an RTA session with STA 2. STA 0 first checks 316 the resource availability on its side. Then, it sends an RTA session initiation request frame (RTAInit.REQ) 318 containing the RTA session identifying information and requirement information to STA 2. STA 2 receives the RTA session initiation request frame and checks 320 the resource availability according to the requirement information in the received frame. If the resource is available, STA 2 sends an RTA session initiation reply frame (RTAInit.REP) 322 containing the RTA session transmission information back to STA 0. If the resource is unavailable, the RTA session initiation reply frame would indicate the failure of the initiation procedure. STA 0 receives the RTA session initiation reply frame and sends an RTA session initiation ACK frame (RTAInit.ACK) 324 containing the RTA session status information to STA2. The RTA session finishes exchanging information between two STAs. Both STAs collect the session information, preferably on the whole RTA session, and add the RTA session in its RTA session table 326, 328. The RTA session depicted in the figure can be launched by either AP or STA. The RTA sessions listed in Table 4 can be created by this initiation procedure.

4.5.4. Initiation Between STAs

Figure 20:
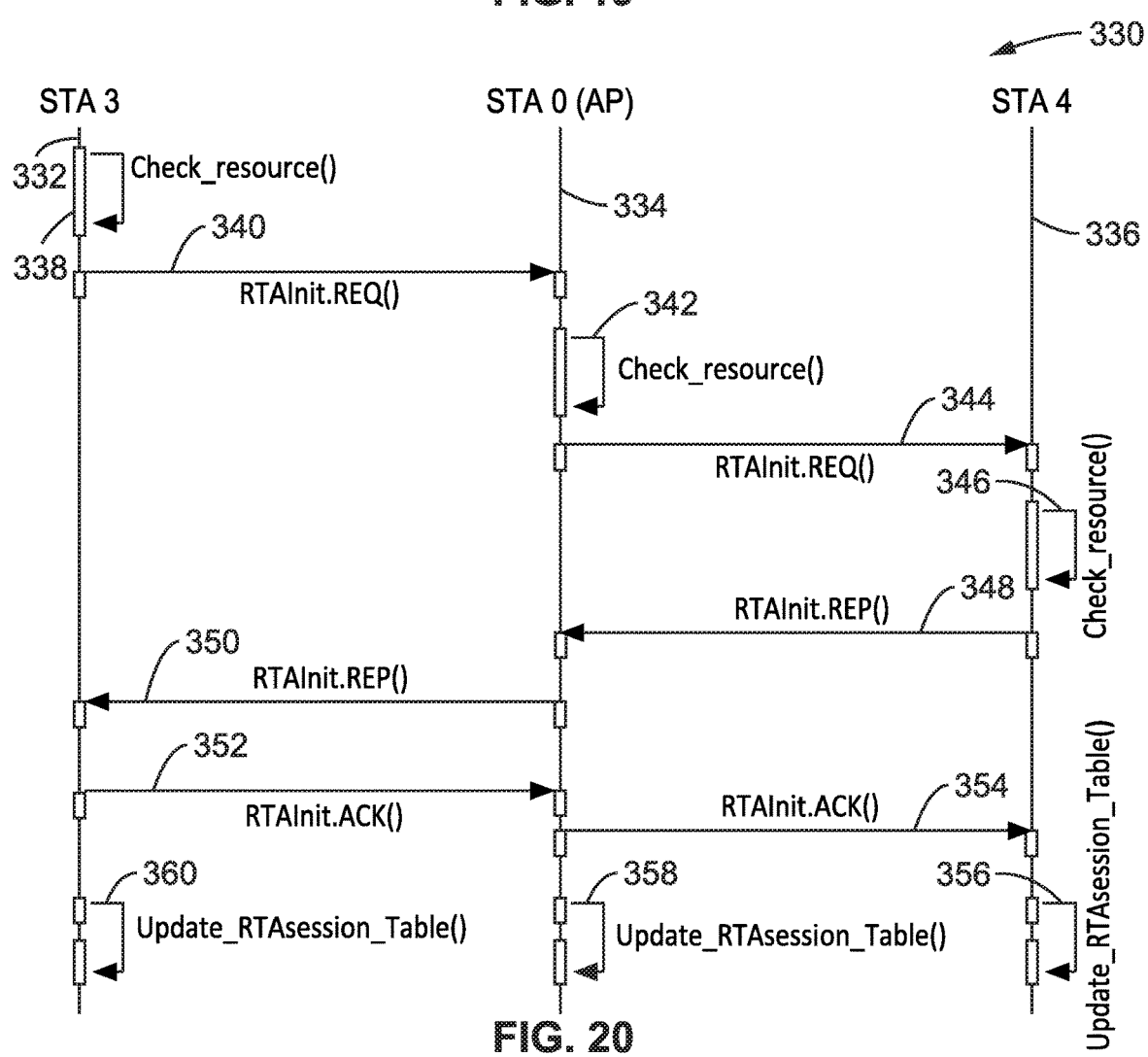
FIG. 20 is a communication interchange diagram of RTA session initiation between stations according to at least one embodiment of the present disclosure.

FIG. 20 illustrates an example embodiment 330 of RTA session initiation between STA0 (AP) 334, STA3 332 and STA4 336. The disclosed technology also allows an RTA session to be initiated between STAs that are associated to the same AP. The figure depicts an example of executing the procedure of initiating an RTA session from the perspective of the MAC layer. As shown in the figure, STA 3 initiates an RTA session with STA 4. STA 3 first checks 338 the resource availability on its side. Then, it sends an RTA session initiation request frame (RTAInit.REQ) 340 containing the RTA session identifying information and requirement information to STA 0 (AP). STA 0 receives the RTA session initiation request frame and checks 342 the resource availability according to the requirement information in the received frame. If the resource is available, STA 0 then forwards the RTA session initiation request frame 344 to STA 4. STA 4 receives the RTA session initiation request frame and checks 346 the resource availability according to the requirement information in the received frame. If the resource is available, STA 4 sends an RTA session initiation reply frame (RTAInit.REP) 348 containing the RTA session transmission information back to STA 0. If the resource is unavailable, the RTA session initiation reply frame would indicate the failure of the initiation procedure. STA 0 receives the RTA session initiation reply frame and forwards it 350 to STA 3. STA 3 then sends 352 an RTA session initiation ACK frame (RTAInit.ACK) containing the RTA session status information to STA 0 and STA 0 forwards 354 the RTA session initiation ACK frame to STA 3. The RTA session finishes exchanging information between two STAs. Both STAs and the AP collect information on the RTA session and add 356 358, and 360, the RTA session in its RTA session table.

Table 5 shows an example of the RTA session table at STA 0 after a new RTA session is initiated between STA 3 and STA 4. The RTA session table before the initiation procedure is shown in Table 4. Here, a new RTA session 4 is inserted into the RTA session table. The session ID represents the simplified RTA session identifying information. In the new RTA session, the AP will use a selected process/routine to allocate the channel time for transmitting traffic generated by RTA session 4. The AP has full flexibility to allocate the RU and the SS resources of the channel.

4.6. RTA Channel Scheduling

When an RTA session generates traffic periodically, the AP is able to schedule the channel resource allocation for the traffic transmission of the RTA session. The AP creates an RTA scheduled period (RTA-SP) for each active RTA session according to the information listed in the RTA session table. Every periodic time, the RTA-SP is allocated a period of channel time to transmit the RTA traffic.

The disclosed technology allows the AP to schedule RTA-SPs based on the information in its RTA session table at the MAC layer. Each RTA-SP is responsible for transmitting the RTA traffic or RTA packets of a certain RTA session. The method of identifying RTA traffic or RTA packets at the MAC layer of the STA is explained at Section 4.4. Then the AP stores the RTA-SPs in an RTA channel scheduling table and advertises the RTA-SPs in the table to its neighboring STAs (including APs). The APs and STAs execute the RTA-SPs by following the list in the RTA channel scheduling table. Every time when the AP advertises its RTA-SPs, the AP is able to adjust the RTA-SPs and includes the adjustment in the advertisement.

Taking into account the lifetime of the RTA packet, as explained in Section 4.4.3, when RTA-SP is allocated a period of channel time to transmit RTA packets every periodic time, the duration of the allocated channel time should not be any longer than the lifetime of the RTA packet to ensure validity of the delivered packet.

4.6.1. Channel Resource Block

Figure 21:
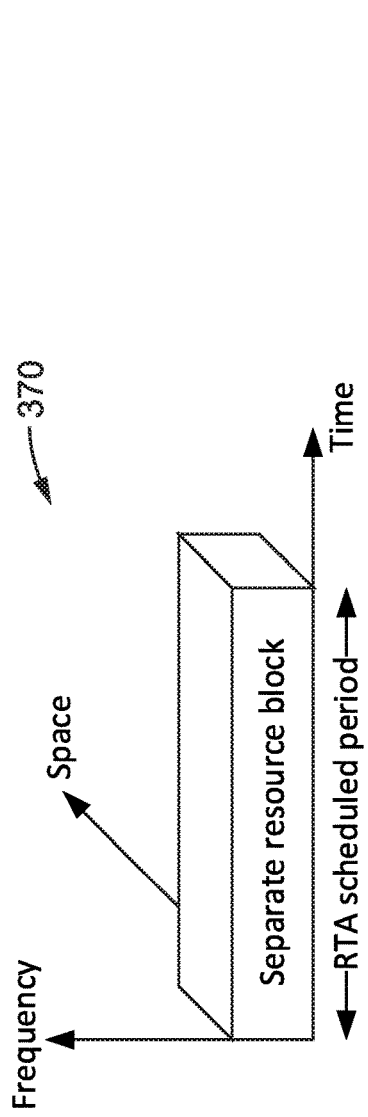
FIG. 21 is a space, time frequency diagram of a resource block according to at least one embodiment of the present disclosure.

FIG. 21 illustrates an example embodiment 370 of a resource block for RTA traffic transmission in an RTA scheduled period. During RTA-SP, the RTA traffic can be transmitted using the allocated channel resource at a specific channel time, frequency and space. The allocated time, frequency, and space of the channel resource generates a separate resource block for the RTA traffic transmission in an RTA-SP, which is shown in the figure. When RTA-SPs share the channel resource block they are said to be overlapped. If two RTA-SPs are not overlapped, the packets transmitted during one RTA-SP never collide with the packets transmitted during the other RTA-SP. Due to the separate resource block used in the RTA-SP, the channel scheduling scheme is able to schedule the multi-user transmission, such as MIMO and OFDMA.

4.6.2. RTA Channel Scheduling Table

When the AP schedules RTA-SPs for RTA sessions in its RTA session table, it creates an RTA channel scheduling table to list all the RTA-SPs. One example of the RTA channel scheduling table is shown in Table 6.

Table 6 shows an example of RTA channel scheduling table of STA 0. The RTA-SPs in the table are scheduled based on the RTA session table as shown in Table 5. Each row in the table represents an RTA-SP scheduled by the AP. The content of each column is explained as follows. The RTA-SP Number (SP #) represents the order number of RTA-SP. A Session ID (Sess. ID) shows which RTA session schedules the RTA-SP. The Session ID in the RTA channel scheduling table can be pointed to the Session ID in the RTA session table. For example, RTA-SP 1 with Session ID 1 in Table 6 means that the RTA-SP is scheduled for RTA session 1 in Table 5. For the purpose of making explanations simpler, RTA session 1 is called the RTA session of RTA-SP 1.

The period start time and the period end time represent the start time and the end time of the RTA-SP. The period time of RTA-SP can be equal to the Periodic Time of its RTA session in the RTA session table. Table 6 lists the RTA-SPs scheduled for all the RTA sessions in Table 5. The Period Start Time of RTA-SP is the same as the Session Start Time of its RTA session.

Periodic Time represents that the RTA-SP should be allocated channel resources (e.g., channel time, RU, SS) for transmitting RTA packets every periodic time. The allocated channel time starts at Period start time+Periodic time*n (n=1, 2, 3, . . . ), thus, starting one or more periodic time periods after the allocated channel start time. For example, RTA-SP 1 will have 1 ms channel time for transmission starting at 1 ms, 11 ms, 21 ms, and so forth.

Time Allocation, RU Allocation and SS Allocation show the allocated channel resource of time, frequency and space, respectively. Time Allocation, RU Allocation and SS Allocation can be "fixed", "random", or "algorithm" according to the allocation options provided in the RTA session table. As shown in the table, the time allocations are fixed in the table. When RU Allocation or SS Allocation is random, the RTA packet can be transmitted using random channel resource of frequency or space according to the channel condition during RTA-SP. When RU Allocation or SS Allocation is fixed, then the RTA packet can only be transmitted using an allocated channel resource of frequency or space during the RTA-SP. For example, SS1 is denoted as a channel resource of SS Allocation. RTA-SP 2 can only use SS1 for RTA packet transmission during its allocated channel time.

Priority is the priority of the RTA-SP, which has the same priority as its RTA session. The RTA-SP with higher priority has the higher priority to use the allocated resource block for transmission.

Activity represents the actions the AP will take during the RTA-SP.

This action can be determined by the AP checking the Tx Node and Rx Node of the RTA session in the RTA session table. If the AP is the Tx Node, then it transmits RTA packets during the RTA-SP. If the AP is the Rx Node, then it receives RTA packets during the RTA-SP. If the AP is neither the Tx Node nor the Rx Node, it could arrange the RTA-SP for the RTA session that is initiated between STAs. Additionally, the AP could also listen to the RTA-SP if the RTA-SP is advertised by other APs.

4.6.3. RTA Channel Scheduling Information Exchange

After an AP creates the RTA-SPs for the RTA channel scheduling, the AP advertises its own RTA-SPs to the other APs and STAs. The STAs associated with that AP can execute the RTA-SPs following the advertisement. The APs and STAs outside the BSS can use the information to execute and adjust their RTA channel scheduling.

The STAs (non-AP) could also have their own RTA channel scheduling table to list all the RTA-SPs heard from all the APs.

This section gives an example to show how an AP advertises the RTA-SPs by embedding the RTA channel scheduling information in its beacon frame. The beacon frame that carries the RTA channel scheduling information is called an RTA beacon frame.

Figure 22:
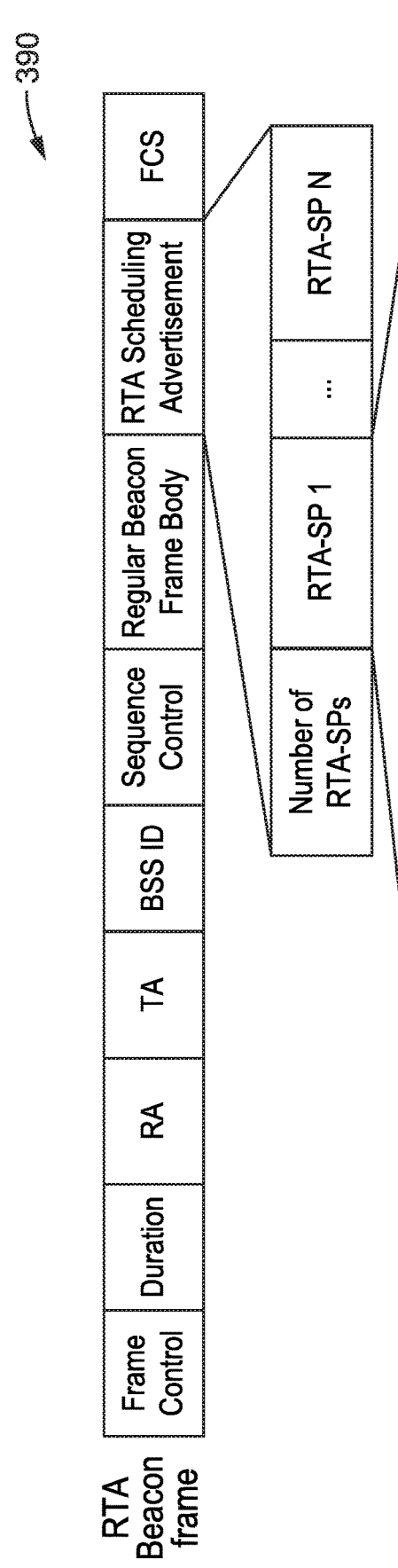
FIG. 22 is a data field diagram of an RTA beacon frame format according to at least one embodiment of the present disclosure.

FIG. 22 illustrates an example embodiment 390 of an RTA beacon frame format having the following fields. (a) A Frame Control field indicates the type of frame. (b) A Duration field contains NAV information used for CSMA/CA channel access. (c) An RA field contains an address for the recipient of the frame. (d) A TA field contains the address of the STA that is transmitting the frame. (e) A BSS ID is the label to identify the local BSS from other BSSs on the network. (f) A Sequence Control field contains the fragment number and the sequence number of the packet. (g) A Regular Beacon Frame Body field has the same content of the frame body in the regular beacon frame. (h) An RTA Scheduling Advertisement field indicates the RTA scheduling information, and contains the following fields. (h)(i) A Number of RTA-SP fields indicate the number of RTA sessions whose RTA-SPs are included in this frame. (h)(ii) Each RTA-SP field indicates the information of RTA-SP, having the following contents: Session ID, Period Start Time, Period End Time, Periodic Time, Time Allocation, RU Allocation, SS Allocation, Priority, and Activity, which are the same as the RTA-SP information shown in the RTA channel scheduling table. (i) An FCS field at the end provides a Frame Check Sequence.

Table 7 shows an example of the RTA channel scheduling table at STA 0 (AP) after it receives an RTA beacon frame from STA 5 (AP). The RTA channel scheduling table before receiving the RTA beacon frame was shown in Table 6. According to the RTA beacon frame, STA 0 knows that STA 5 schedules RTA-SPs 5 and 6 on its side. STA 0 adds RTA-SPs 5 and 6 into the RTA channel scheduling table as shown in Table 7. The start time and end time of the RTA-SPs from the neighboring STA 5 could be parsed in its BSS's Timing Synchronization Function (TSF) according to the information of the RTA beacon.

4.6.4. RTA Channel Scheduling Adjustment

The AP is able to adjust the RTA-SPs in the RTA channel scheduling table. The purpose of the adjustment is to avoid multiple RTA-SPs using the same channel resource blocks.

Figure 23:
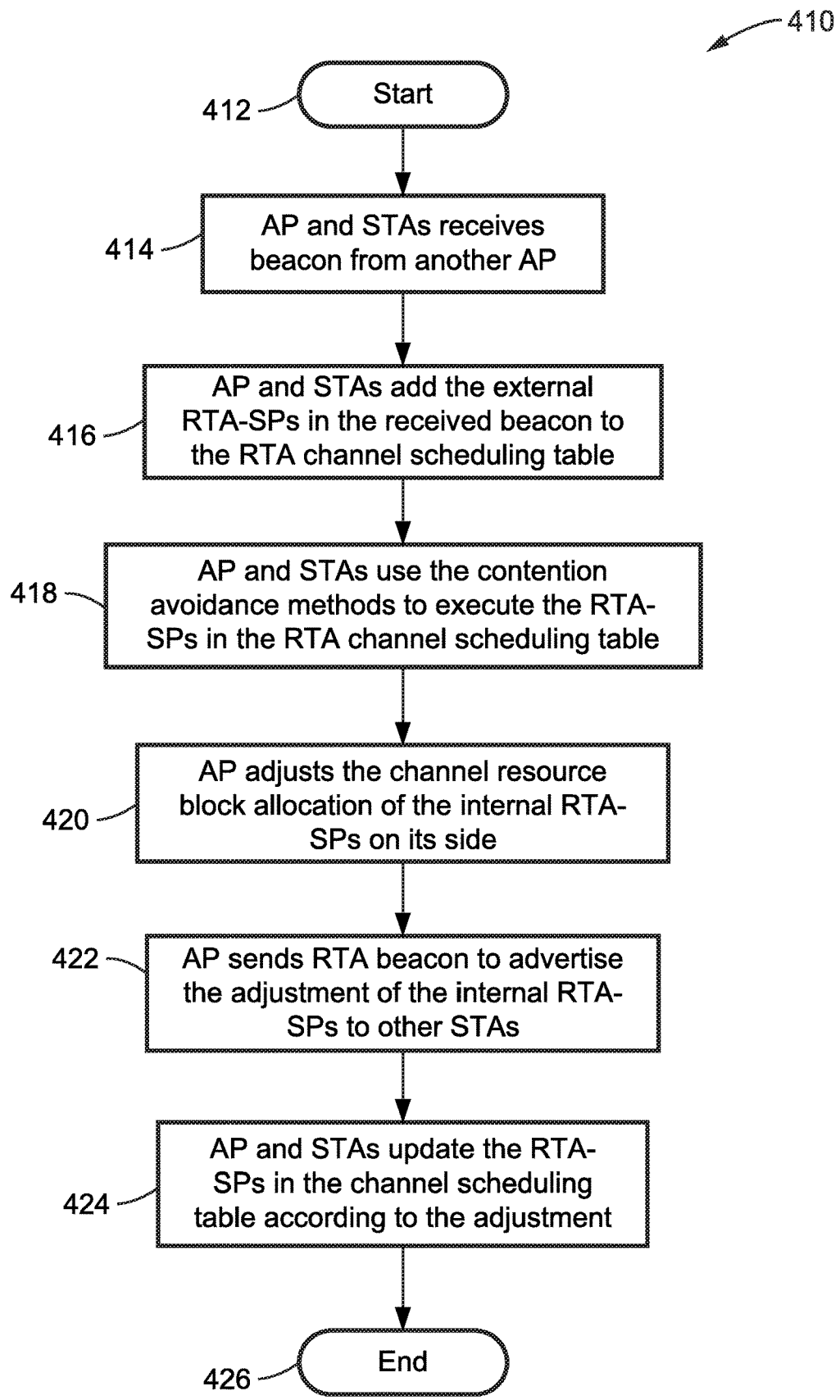
FIG. 23 is a flow diagram of AP and STAs in one BSS executing the RTA-SPs and how the AP adjusts the RTA-SPs during one beacon interval according to at least one embodiment of the present disclosure.

FIG. 23 illustrates an example embodiment 410 of how the AP and STAs in one BSS execute the RTA-SPs and how the AP adjusts the RTA-SPs during one beacon interval. In this example scheduling, the RTA-SPs are separated into internal RTA-SPs and external RTA-SPs. The internal RTA-SPs are the RTA-SPs that are generated by the AP according to the RTA session table. The external RTA-SPs are the RTA-SPs received from the beacon frames of other APs. The AP is only allowed to adjust its internal RTA-SPs.

The AP and its associated STAs execute the RTA-SPs in the RTA channel scheduling table. The process starts 412 after the AP and its associated STAs have RTA channel scheduling tables, the tables include the internal RTA-SPs generated by the AP and the external RTA-SPs received 414 from the RTA beacon frames of other APs. When the AP and its associated STAs receive the RTA beacon frames from another AP, they extract the RTA-SPs in the received beacon frame and adds the external RTA-SPs to their RTA channel scheduling tables 416. It should be noted that if the external RTA-SP already exists in the table, then the AP or the STA only needs to update the RTA-SP in the table if necessary.

Before AP transmits its RTA beacon, the AP is not allowed to adjust its internal RTA-SPs in its channel scheduling table. If there exists multiple RTA-SPs that share the same channel resource block, the AP and its associated STAs are able to use 418 the channel contention avoidance methods to avoid the contention collision. The contention avoidance methods will be described in Section 4.7.

The AP adjusts the channel resource block allocation 420 to its internal RTA-SPs right before it transmits an RTA beacon frame. Then, it embeds the updated RTA-SPs in the beacon frame and sends 422 the beacon to advertise the adjustment of the internal RTA-SPs to its neighboring STAs. In at least one embodiment the external RTA-SPs are also included in the beacon.

After the beacon is sent, the AP and its associated STAs update the internal RTA-SPs in their RTA channel scheduling tables 424. The AP and STAs then execute the internal RTA-SPs according to the updated RTA channel scheduling table. After these operations RTA-SP processing ends 426.

Table 8 gives an example to explain how an AP adjusts its internal RTA-SPs in the RTA channel scheduling table. According to blocks 414, 416 of FIG. 23, when STA 0 (AP) receives an RTA beacon frame from STA 5 (AP), STA 0 adds the external RTA-SPs 5 and 6 to its RTA channel scheduling table as shown in Table 7. In Table 7, RTA-SP 1 shares the same channel time with RTA-SP 5. It is also possible that RTA-SP 4 shares the same channel resource block with RTA-SP 6. STA 0 needs to adjust the channel resource allocation to RTA-SPs 1 and 4 to avoid those two RTA-SPs overlaps with the external RTA-SPs. As shown in Table 8, STA 0 changes the period start time of RTA-SP 1 from 1 ms to 9 ms so that the channel time allocated to RTA-SP 1 does not overlap with the RTA-SP 5. STA 0 also forces RTA-SP 4 to use RU2 for RTA packet transmission. Since RTA-SPs 4 and 5 use separate RUs, they will not interfere with each other. STA 0 may realize that the channel condition at RU2 is not as good as RU1, so it prolongs the channel time for RTA-SP 4 from 3 ms to 4 ms to ensure the RTA packet in RTA-SP4 can be delivered successfully.

4.7. Contention Collision Avoidance

As seen in block 416 of FIG. 23, the AP and its associated STAs are able to use multiple methods to avoid the channel contention collision before the AP updates its internal RTA-SPs. This section provides several examples of contention collision avoidance methods when considering the following: (a) backward compatibility with the legacy CSMA/CA STAs, and (2) occurrence of overlap between multiple RTA-SPs.

4.7.1. Channel Frequency Separation

The objective of the channel frequency separation is to separate some channel frequencies between non-RTA traffic transmission and RTA traffic transmission. By transmitting RTA traffic and non-RTA traffic in separate channel frequencies, those traffic transmissions will not interfere with each other, especially when there exist legacy CSMA/CA STAs transmitting the non-RTA traffic only.

If a STA can recognize the RTA channel scheduling from APs and transmit packets following the RTA channel scheduling, that STA is said to support the RTA feature. Otherwise, that STA does not support the RTA feature. A legacy CSMA/CA does not support the RTA features and only transmits non-RTA packets since it cannot identify RTA packets.

Figure 24:
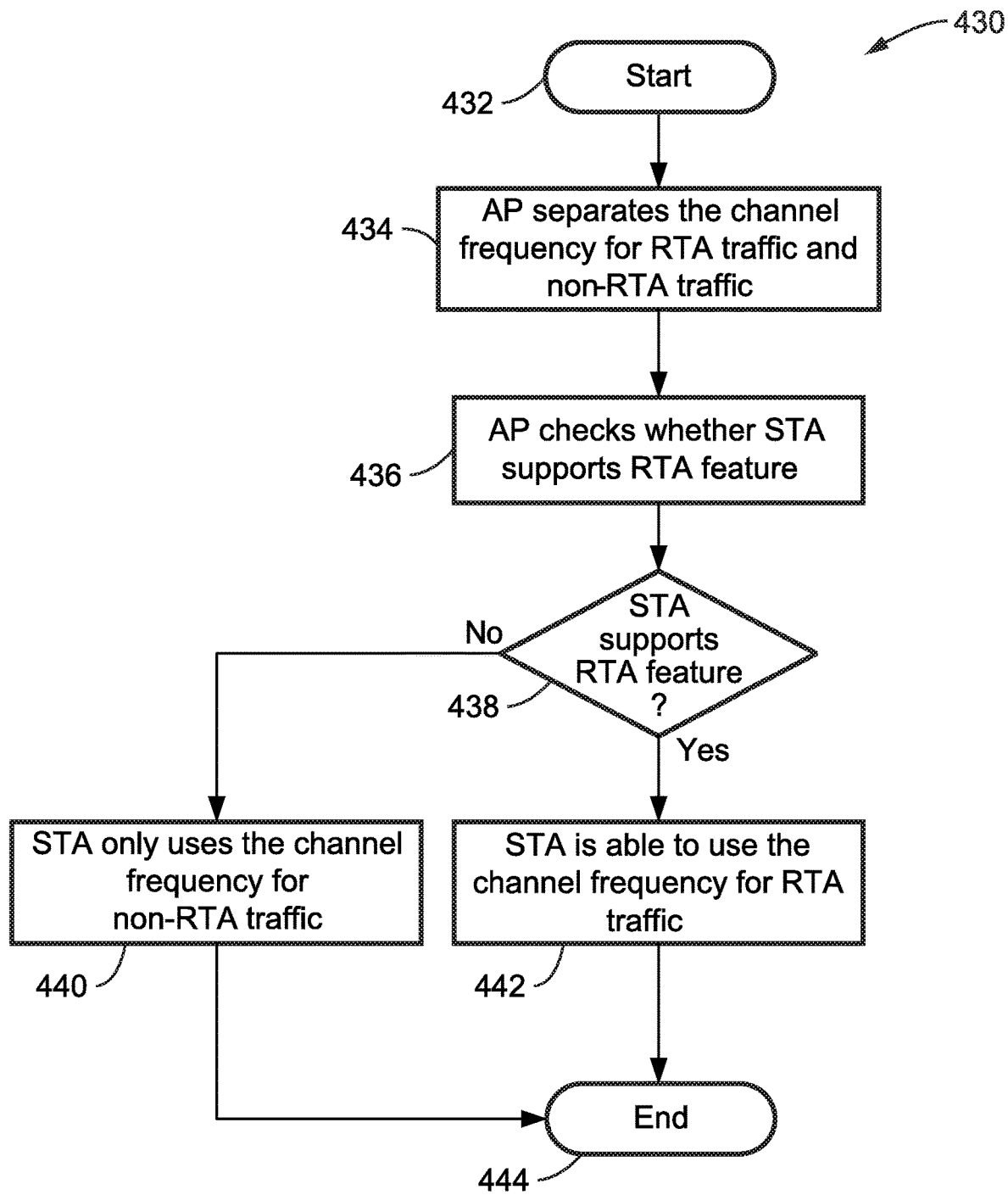
FIG. 24 is a flow diagram of an AP separating channel frequencies to STAs depending on whether they support the RTA feature according to at least one embodiment of the present disclosure.

FIG. 24 illustrates an example embodiment 430 of how an AP separates the channel frequencies to STAs depending on whether they support the RTA feature. The process starts 432, so that when an AP uses channel frequency separation method, it allocates 434 some channel frequency resource for RTA packet transmission and some other channel frequency resource for non-RTA packet transmission.

Then the AP determines 436 whether a STA supports the RTA feature, with a check being made 438. If the STA supports the RTA feature, then execution reaches block 442 as the STA can recognize the RTA packet and the AP allows the STA to use the channel frequencies that are allocated for RTA packet transmission, after which execution ends 444. Otherwise, if it is determined at block 438 that the STA does not support the RTA feature, then block 440 is reached, wherein the STA can only use the channel frequency that is allocated to transmitting non-RTA packets, after which execution ends 444.

When a STA supports the RTA feature and is allowed to use the channel frequency that is allocated to transmit RTA packets, that STA is able to recognize (know) the RTA-SPs advertised by the AP. Thus, according to the RTA-SPs, the STA recognizes when to refrain from transmitting packets. Therefore, the STA is able to transmit non-RTA packets using the channel frequency allocated for transmitting RTA packets when there is no RTA-SP scheduled. The STA is also allowed to use the channel frequency allocated for transmitting packets.

FIG. 25 illustrates an example embodiment 450 of the AP 452 sending a channel switch announcement frame 456 to the STA 454 (defined in IEEE 802.11) to the legacy CSMA/CA STA that does not support RTA features, to inform the legacy CSMA/CA STA to transmit packets using a certain channel frequency. In response to this announcement an acknowledgement 458 is sent back from STA1 454.

FIG. 26 illustrates an example embodiment 470 of channel allocation for RTA packet and non-RTA packet transmission, between STA0 (AP) 472 and a station supporting RTA seen as STA 2 and STA 3 474. When a STA supports the RTA feature, it is allowed to use the channel frequency allocated for RTA packet transmission. As shown in the figure, the AP is able to send an RTA channel allocation announcement frame 476 to its neighboring STAs to inform them of the channel frequency separation, and to which they transmit an acknowledgement 478 upon receipt.

FIG. 27 illustrates an example embodiment 490 the frame format of RTA channel allocation announcement frame. When STAs receive the RTA channel allocation announcement frame, they will know which channel frequencies are allocated for RTA packet transmission and which are allocated for non-RTA packet transmission. Since those STAs are able to recognize the RTA packet and transmit packets following the RTA-SPs, they have more flexibility to use multiple channel frequencies. The content of the RTA channel allocation announcement frame is as follows. (a) A Frame Control field indicates the type of frame. (b) A Duration field contains NAV information used for CSMA/CA channel access. (c) An RA field contains an address of the recipient of the frame. (d) A TA field contains the address of the STA that transmitted the frame. (e) An Action field indicates that the frame is used for announcing the channel frequency separation for RTA and non-RTA traffic. (f) An RTA Supported Channels field indicates the channels that are allocated to transmitting RTA traffic. (g) A Non-RTA Supported Channels field indicates the channels that are allocated to transmitting non-RTA traffic only. (h) An FCS field at the end provides a Frame Check Sequence.

Figure 28:
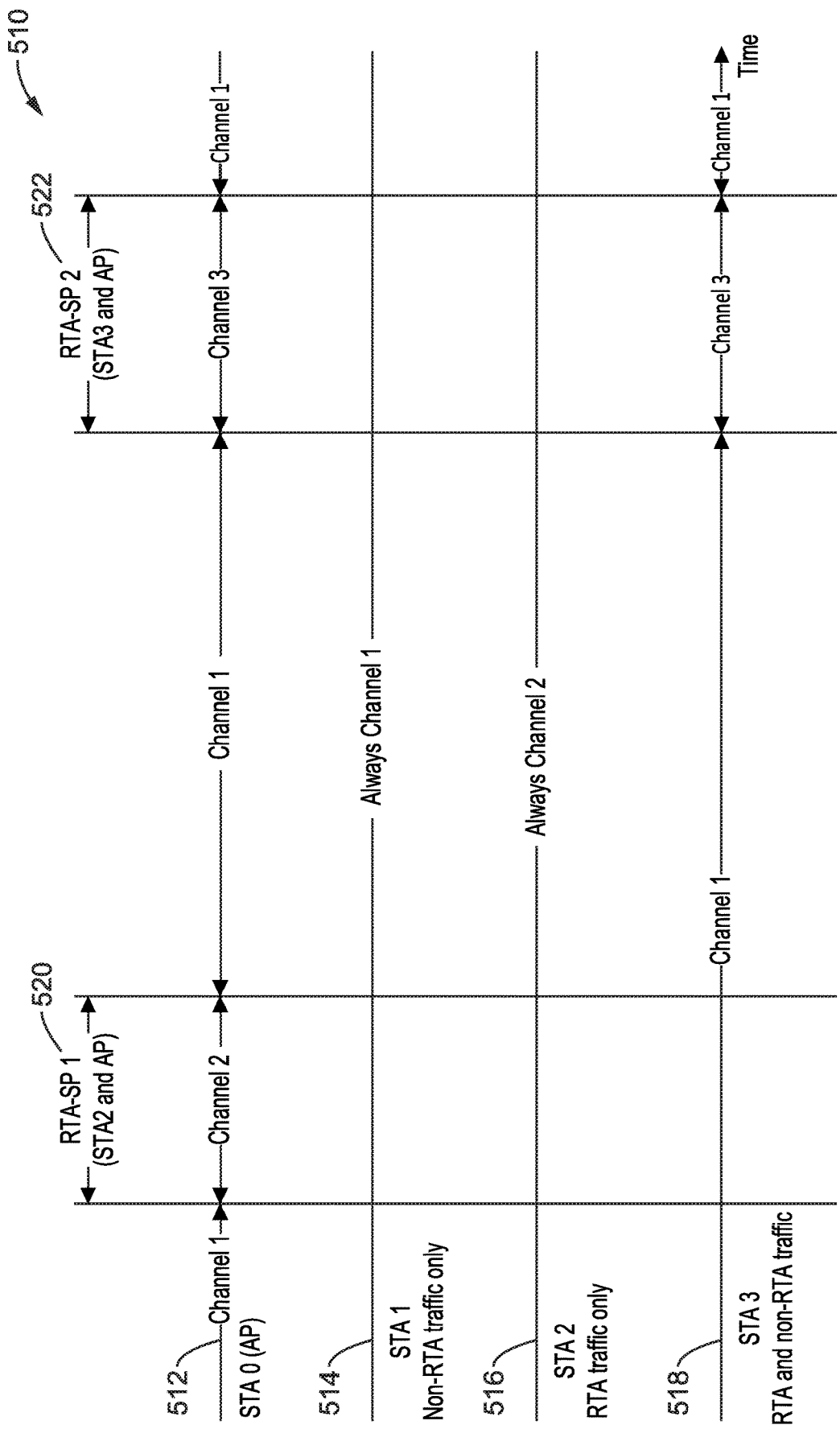
FIG. 28 is a communication sequence diagram of the channel frequency separation method performed when the AP can only operate one channel according to at least one embodiment of the present disclosure.

FIG. 28 illustrates an example embodiment 510 an example of how the channel frequency separation method operates in the case when the AP can only operate one channel. The example considers the network topology example as shown in FIG. 7, showing interaction between STA0 512, STA1 514, STA2 516, and STA3 518. The RTA-SPs are described in Table 8. STA0 512 is the AP that can only operate one channel. STA1 514 is a legacy STA that does not support RTA features. STA2 516 transmits RTA traffic only and STA3 518 transmits and receives both RTA traffic and non-RTA traffic. In this example, STA 0 allocates channel 1 for non-RTA packet transmission only and channels 2 and 3 for RTA packet transmission. As explained in FIG. 25, the AP sends a channel switch announcement frame to STA 1 to let it only work at channel 1. The AP sends the RTA channel allocation announcement frame to STA 2 and 3 so that those two STAs know that channel 2 and 3 are allocated to transmit RTA packets.

In the example of FIG. 28, STA 2 chooses to operate only on channel 2 only since it only has RTA traffic. STA 3 uses channel 1 to transmit non-RTA packet and channel 3 to receive RTA packets. The channel switch of the AP and each STA at different channel periods are explained as follows.

During the RTA-SP 1 520, STA 2 transmits RTA packets to the AP over channel 2. The AP switches to channel 2 to receive RTA packet from STA 2. STA 1 and 3 do not operate on channel 2, so they won't interfere with RTA packet transmission between the AP and STA 2.

During the RTA-SP 2 522, the AP transmits RTA packets to STA 3 over channel 3. The AP and STA 3 switch to channel 3 for packet transmission. For the same reason as in RTA-SP 1, the RTA packet transmission between the AP and STA 3 would not be interfered with by the other STAs.

For the remainder of the time, the AP uses channel 1 for non-RTA packet transmission. STA 1 is able to transmit and receive non-RTA packet during that time. STA 3 could also switch its channel frequency to channel 1 for non-RTA packet transmission. Since STA 2 only has RTA traffic and always operates on channel 2, it could set itself into a sleep mode at other times to save power.

Figure 29:
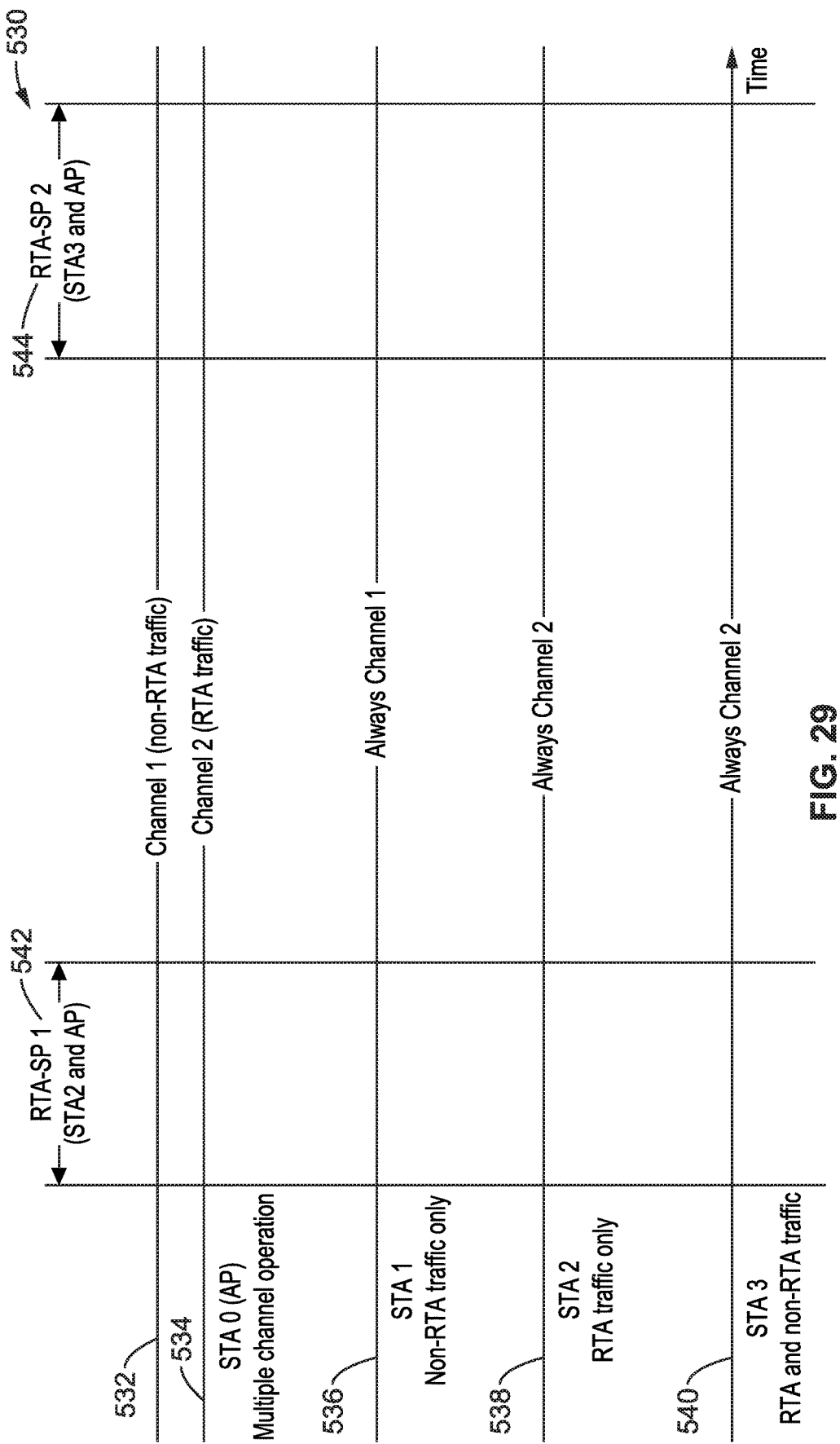
FIG. 29 is a communication sequence diagram of the channel frequency separation method performed when the AP can operate multiple channels according to at least one embodiment of the present disclosure.

FIG. 29 illustrates an example embodiment 530 demonstrating how the channel frequency separation method operates when the AP can operate multiple channels. The example considers the network topology as shown in FIG. 7, with the RTA-SPs being described in Table 8. STA0 534 is the AP that can operate multiple channels at the same time. STA1 536 is a legacy STA that does not support RTA feature. STA2 538 transmits RTA traffic only and STA3 540 transmits and receives both RTA traffic and non-RTA traffic. In this example, STA 0 allocates channel 1 532 for non-RTA packet transmission only and channel 2 for RTA packet transmission. As explained in FIG. 25, the AP sends a channel switch announcement frame to STA 1 so that it will only operate using channel 1. The AP sends the RTA channel allocation announcement frame to STA 2 and to STA 3 so that those two STAs know that channel 2 is allocated to transmit RTA packets. In this example, both STA 2 and 3 choose to work at channel 2. The channel switch of the AP and each STA at different channels are explained as follows.

At channel 1, the AP uses it for non-RTA packet transmission. STA 1 is able to transmit and receive non-RTA packet over channel 1 all the time. At channel 2, the AP uses it for RTA packet transmission. During the RTA-SP 1 542, STA 2 transmits RTA packets to the AP over channel 2. STA 3 refrains from transmitting packets since it knows the existence of RTA-SP 1. During RTA-SP 2 544, the AP transmits RTA packets to STA 3 over channel 2. For the same reason as in RTA-SP 1, STA 2 refrains from transmitting packets during that period. For the remainder of time, the AP and STA 3 could use channel 2 for non-RTA packet transmission. They could contend for the channel and transmit non-RTA packets when there is no RTA-SP. Since STA 2 has only RTA traffic, it could set itself into sleep mode to save power.

4.7.2. Trigger-Based Uplink Transmission Only for Non-RTA Traffic

In order to protect RTA packet transmissions from interference due to the operation of legacy CSMA/CA STAs, one possible method is to let the AP launch the packet transmission with the legacy CSMA/CA STAs all the time.

Figure 30:
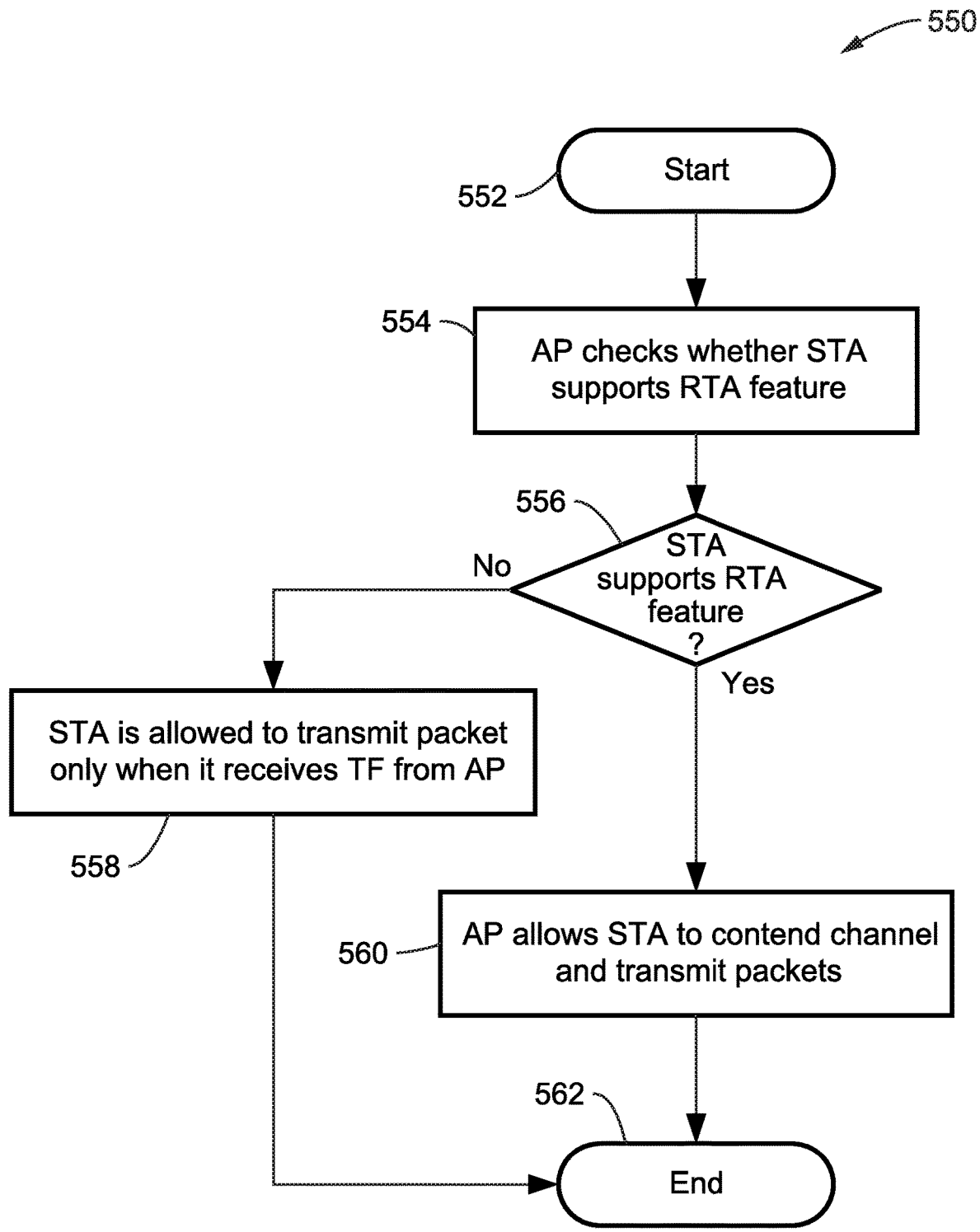
FIG. 30 is a flow diagram of uplink transmission management according to at least one embodiment of the present disclosure.

FIG. 30 illustrates an example embodiment 550 detailing how an AP decides the packet transmission procedure with the STAs depending on whether they support the RTA feature. The process starts 552 and then the AP determines 554 whether a STA supports the RTA feature. A check is made 556 if the STA supports the RTA features. If the STA supports the RTA feature then execution reaches block 560, as the STA can recognize RTA channel scheduling and the AP allows the STA to contend for the channel and launch packet transmissions by itself, and then the process ends 562. Otherwise, if it is found at check 556 that the STA cannot recognize the RTA channel scheduling, then execution reaches block 558 and the STA is only allowed to transmit non-RTA packets when it receives the trigger frame (TF) from the AP, after which the process ends 562.

Figure 31:
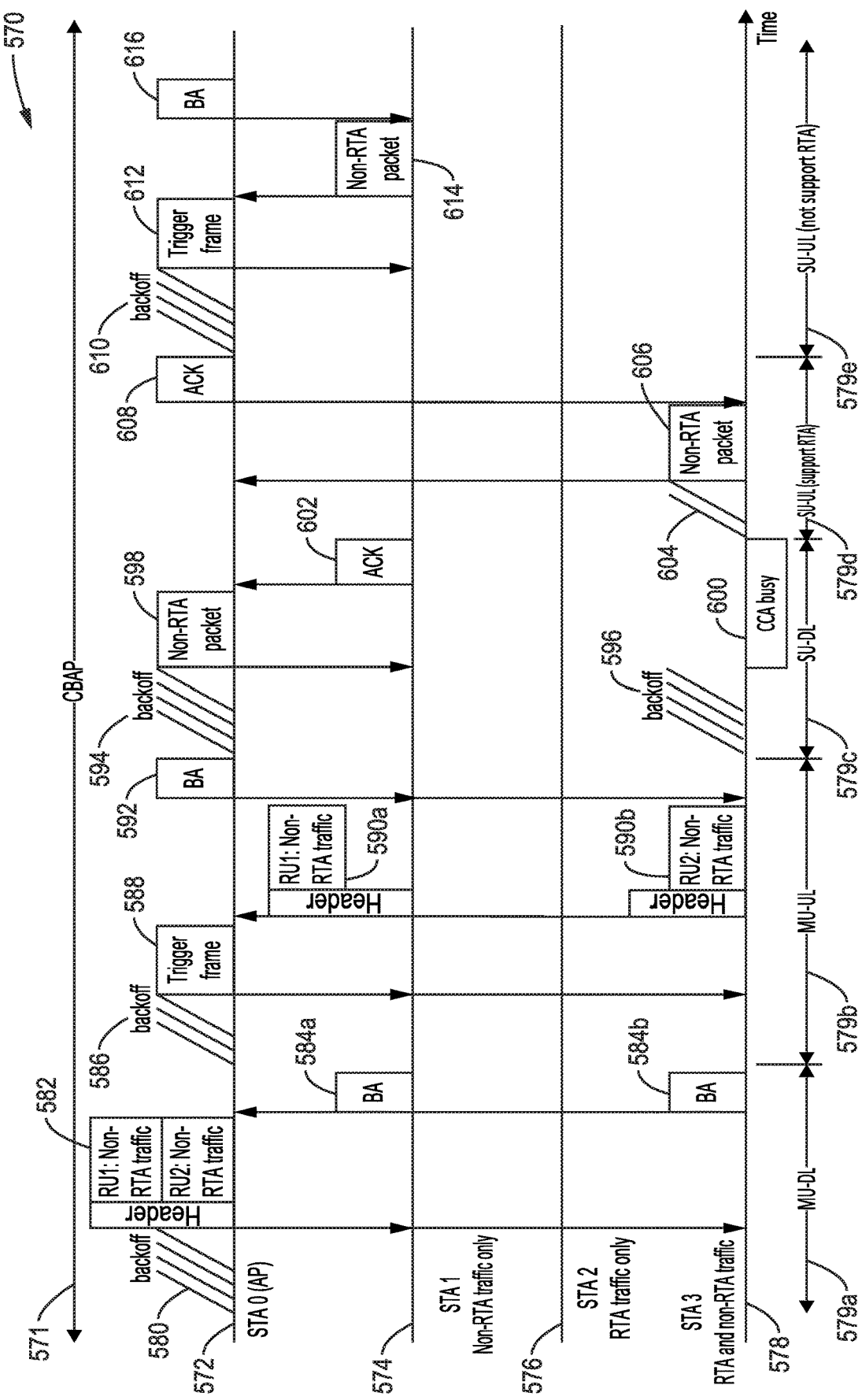
FIG. 31 is a communication sequence diagram of packet transmission formats during CBAP as performed according to at least one embodiment of the present disclosure.

FIG. 31 illustrates an example embodiment 570 depicting a number of packet transmission procedures during the Contention-Based Access Period (CBAP), i.e., the period when STAs contend for the channel using the CSMA/CA scheme. A CBAP 571 interval is shown along with communications between STA0 (AP) 572, STA1 (Non-RTA traffic only) 574, STA2 (RTA traffic only) 576, and STA3 (RTA and non-RTA traffic only) 578. The types of communications are denoted along the bottom of the figure as multi-user downlink (MU-DL) mode 579$a$, multi-user uplink (MU-UL) mode 579$b$, single user downlink (SU-DL) mode 579$c$, single user uplink (SU-UL) mode that supports RTA 579$d$, and single user uplink (SU-UL) mode that does not support RTA 579$e$.

The packet transmissions shown in this figure follow the regular transmission procedure for non-RTA traffic and are launched by the AP. In multi-user downlink (MU-DL) mode 579$a$, STA 0 contends and after backoff 580 obtains the channel and transmits 582 non-RTA traffic over resource units RU1 and RU2 to STA 1 and STA 3 which send a Block ACK (BA) 584$a$, 584$b$. In multi-user uplink (MU-UL) mode 579$b$, STA 0 contends using backoff 586 to gain channel access and send a trigger frame 588, in response to which STA 1 transmits non-RTA traffic 590$a$, and STA 3 transmits non-RTA traffic 590$b$, to which STA 0 responds with a Block ACK (BA) 592.

In single user downlink (SU-DL) mode 579$c$, STA 0 contends with backoff 594 shown, and gains channel access to transmit non-RTA packet 598 to STA 1, which ACKS 602. It will be noted that STA 3 also tried to contend 596 for the channel, and sensed busy 600. In single user uplink (SU-UL) mode that supports RTA 579$d$, STA 3 contends 604 and gains channel access to send non-RTA packet 606 to STA 0 which responds with an ACK 608. In single user uplink (SU-UL) mode that does not support RTA 579$e$, STA 0 contends 610 and gains channel access to send trigger frame 612, and receives a non-RTA packet 614 from STA1 to which it responds with Block ACK (BA) 616.

It will be noted that in single user uplink (SU-UL) mode, if the STA supports the RTA feature, it knows when to transmit packets and when to refrain from transmitting packets based on the RTA-SP information. Otherwise, the STA does not support the RTA feature as it has no ability to sense channel time allocated for CBAP and RTA-SP. Then, the STA is only allowed to transmit non-RTA packet after it receives the trigger frame from the AP.

Figure 32:
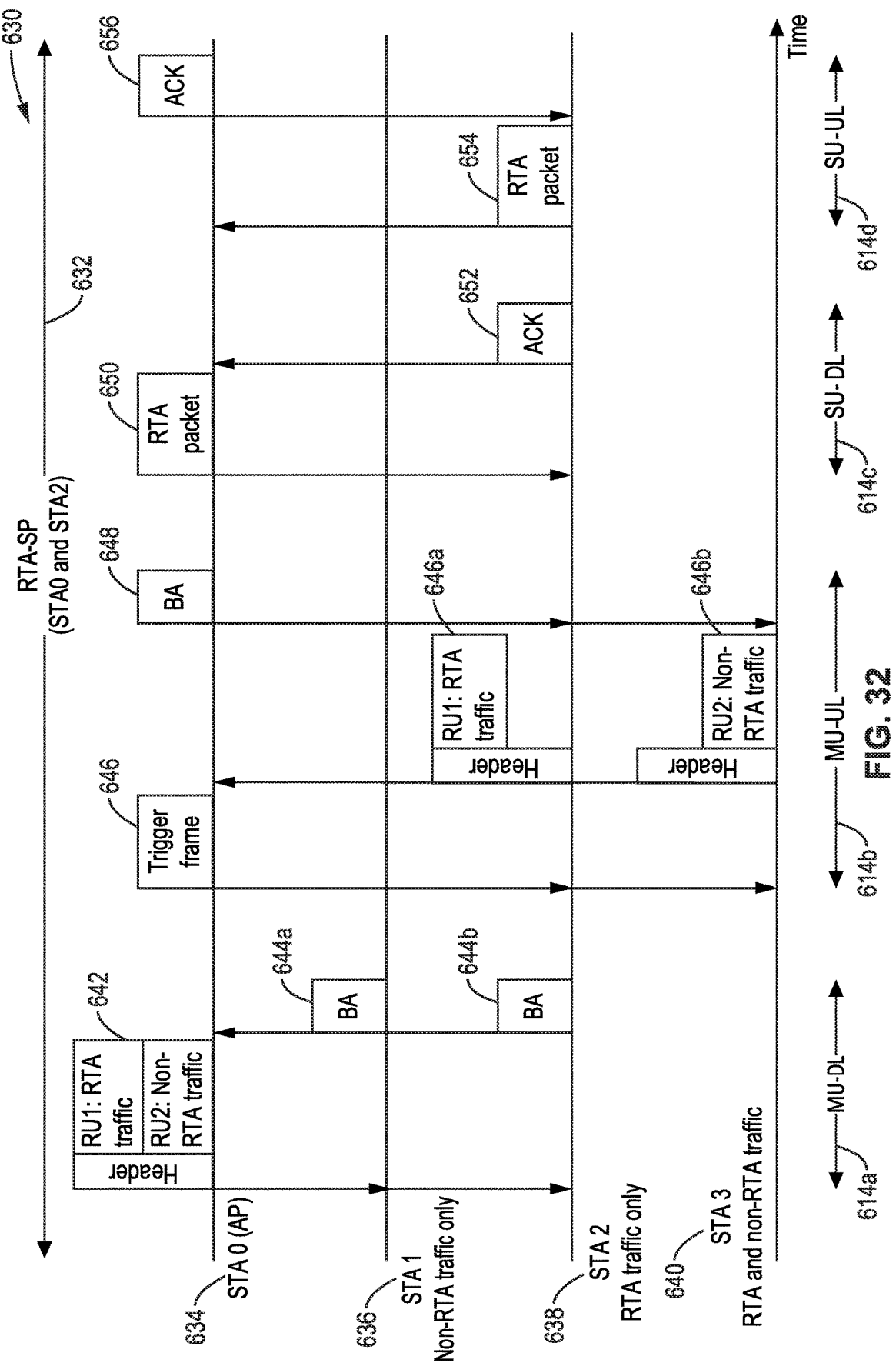
FIG. 32 is a communication sequence diagram of packet transmission formats during RTA-SP as utilized according to at least one embodiment of the present disclosure.

FIG. 32 illustrates an example embodiment 630 showing packet transmission procedures during RTA-SP. An RTA-SP 632 interval is shown along with communications between STA0 (AP) 634, STA1 (Non-RTA traffic only) 636, STA2 (RTA traffic only) 638, and STA3 (RTA and non-RTA traffic only) 640. In comparing this with FIG. 31 it will be noted that there is no need for contending for channel access before performing the communications.

The RTA-SP 632 shown in the figure is for RTA packet transmission between STA 0 (AP) and STA 2. As shown in the figure, in the multi-user downlink (MU-DL) mode 614a and the multi-user uplink (MU-UL) mode 614b, the packet could use the regular format but has to carry the RTA traffic inside the packet. For example, the MU-DL packet 642 transmitted by STA 0 has to carry RTA traffic to STA 2, as well as non-RTA traffic to STA 1; both of which are seen responding with a Block ACK (BA) 644a, 644b. The communication of the MU-UL packet is depicted with STA 0 generating a trigger frame 646, and communications back from STA 2 carrying RTA traffic 646a, and communication from STA 2 carrying non-RTA traffic 646b, to which STA 0 responds with Block ACK (BA) 648. In single user downlink (SU-DL) mode 614c an RTA packet 650 is sent and acknowledged 652 from STA 2, while in single user uplink (SU-UL) mode 614d an RTA packet 654 is sent from STA2 and received at STA 0 which acknowledges 656 receipt. Thus, in SU-DL and SU-UL packet transmissions follows the regular transmission procedure and carries the RTA traffic for that RTA-SP.

4.7.3. Quiet Mode

Another option for protecting the RTA packet transmission from interference due to legacy CSMA/CA STAs is to let the legacy CSMA/CA STAs keep quiet (i.e., not transmitting) during the RTA-SPs. The AP is able to set the STAs to a quiet mode by sending an RTA quiet frame.

Figure 33:
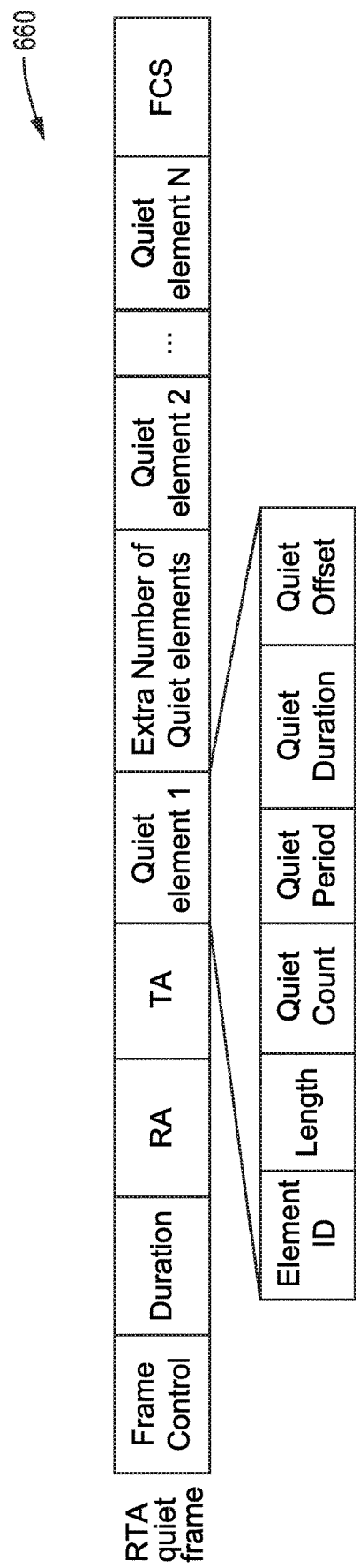
FIG. 33 is a data field diagram of an RTA quiet frame according to at least one embodiment of the present disclosure.

FIG. 33 illustrates an example embodiment 660 of an RTA quiet frame having the following content. (a) A Frame Control field indicates the type of the frame. (b) A Duration field contains NAV information used for CSMA/CA channel access. (c) A RA field contains an address for the frame recipient. (d) A TA field contains the address of the STA that transmitted the frame. (e) A Quiet element field indicates the quiet information. This field is the same as the regular quiet element in IEEE 802.11 standard, and contains the following fields. (e)(i) Element ID is an index of the Quiet element field. (e)(ii) Length is the length of the Quiet element field. (e)(iii) A Quiet Count indicates the number of Beacon transmission intervals until the quiet period begins. (e)(iv) A Quiet Period indicates the number of beacon intervals between quiet periods. (e)(v) A Quiet Duration indicates the number of time units that the quiet period lasts (spans). (e)(vi) A Quiet Offset indicates the number of time units after a Beacon interval that the next quiet period will begin. (f) An Extra Number of Quiet elements field indicates the extra number of Quiet elements following this field, and is followed by these Quiet elements, which is then followed by a Frame Check Sequence (FCS).

Figure 34:
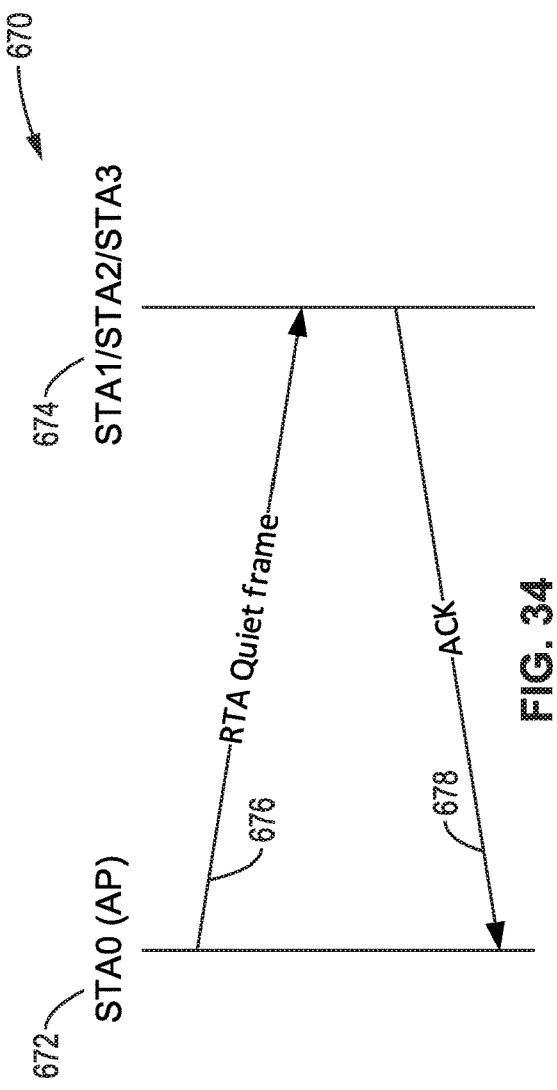
FIG. 34 is a communication interchange diagram of an AP transmitting an RTA quiet frame to set STAs quiet as utilized according to at least one embodiment of the present disclosure.

FIG. 34 illustrates an example embodiment 670 of a procedure for an AP 672 sending an RTA Quiet frame 676 to its associated STAs 674 (e.g., STA1, STA2 and STA3) to set a quiet period, and Acknowledge 678 the transmission. Since the Quiet element in the frame is the same as the regular one defined in the IEEE 802.11 standard, the legacy CSMA/CA STA (e.g., STA 1) is able to recognize the frame and set the quiet period.

Figure 35:
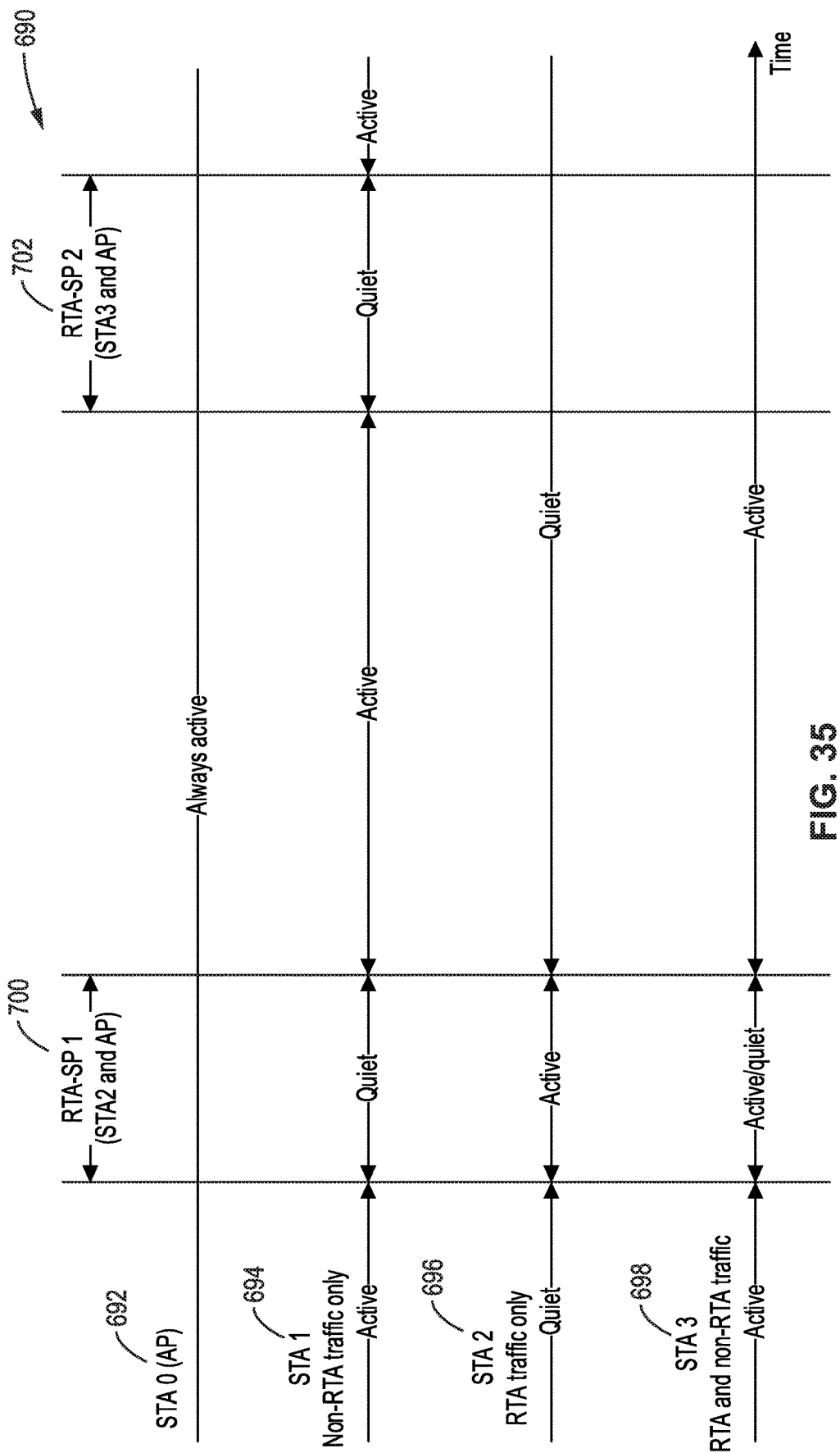
FIG. 35 is a communication sequence diagram of power saving mode setting in STAs based on traffic types as utilized according to at least one embodiment of the present disclosure.

FIG. 35 illustrates an example embodiment 690 describing how an AP sets a quiet period among the STAs to protect the RTA packet transmission from interference due to legacy CSMA/CA STA traffic during RTA-SP. The example considers the network topology as shown in FIG. 7, with the RTA-SPs seen in Table 8.

STA0 692 is the AP, STA1 694 is a legacy STA that does not support RTA feature, STA2 696 transmits RTA traffic only and STA3 698 transmits both RTA traffic and non-RTA traffic. The AP sends the RTA quiet frames to its STAs (i.e., STA 1, 2, 3), separately. In response to receiving the RTA quiet frame, each STA recognizes (knows) its quiet period. As shown in the example, the AP is always active. STA 1 keeps quiet whenever there is an RTS-SP 700, 702. STA 2 is only active during RTA-SP 1 700. It could keep quiet or enter sleeping mode during the remainder of the time. Since STA 3 has both RTA and non-RTA traffic to transmit or receive, it could either keep active all the time, or keep quiet when RTA-SP 1 occurs. No matter whether it keeps active or quiet, it would not contend for the channel during RTA-SP 1 to transmit packets.

4.7.4. Contention Window During RTA-SP

As explained in FIG. 23 the AP and the STAs may have multiple RTA-SPs in its channel scheduling table that are scheduled at the same time. This could arise when (1) the AP receives external RTA-SPs from the other APs but cannot adjust its internal RTA-SPs until transmitting a beacon frame, or (2) the AP is not able to allocate the separate channel resource blocks to its internal RTA-SPs, or (3) a non-AP STA receives the external RTA-SPs from the other APs but its AP does not receive them. When one of the situations above arises, the AP can use the contention avoidance methods to avoid having multiple STAs contending for the channel at the same time. When there are multiple RTA-SPs scheduled at the same time, it is possible that multiple STAs contend for the channel at the same time. The channel contention collision occurs when they gain channel access at the same time. In order to avoid a contention collision due to the multiple overlapped RTA-SPs, the STAs can use the contention window and set backoff times to avoid the collision.

During RTA-SP, the channel contention due to the non-RTA packets can be prevented by using the methods described in Sections 4.7.1, 4.7.2, and 4.7.3. The method in this section focuses on channel contention collision avoidance among RTA packets.

The way of setting backoff time according to the contention window size during RTA-SP can be utilized in the same manner as it in CSMA/CA. However, the contention window size in the RTA-SPs is not the same as in CSMA/CA. In CSMA/CA, the contention window size is prefixed as described in Section 3.1. It is used to avoid the channel contention collision among all the STAs in the same area. The contention window in the RTA-SP, on the other hand, is only for avoiding the channel contention collision among the STAs who have the overlapped RTA-SPs at the same time.

Figure 36:
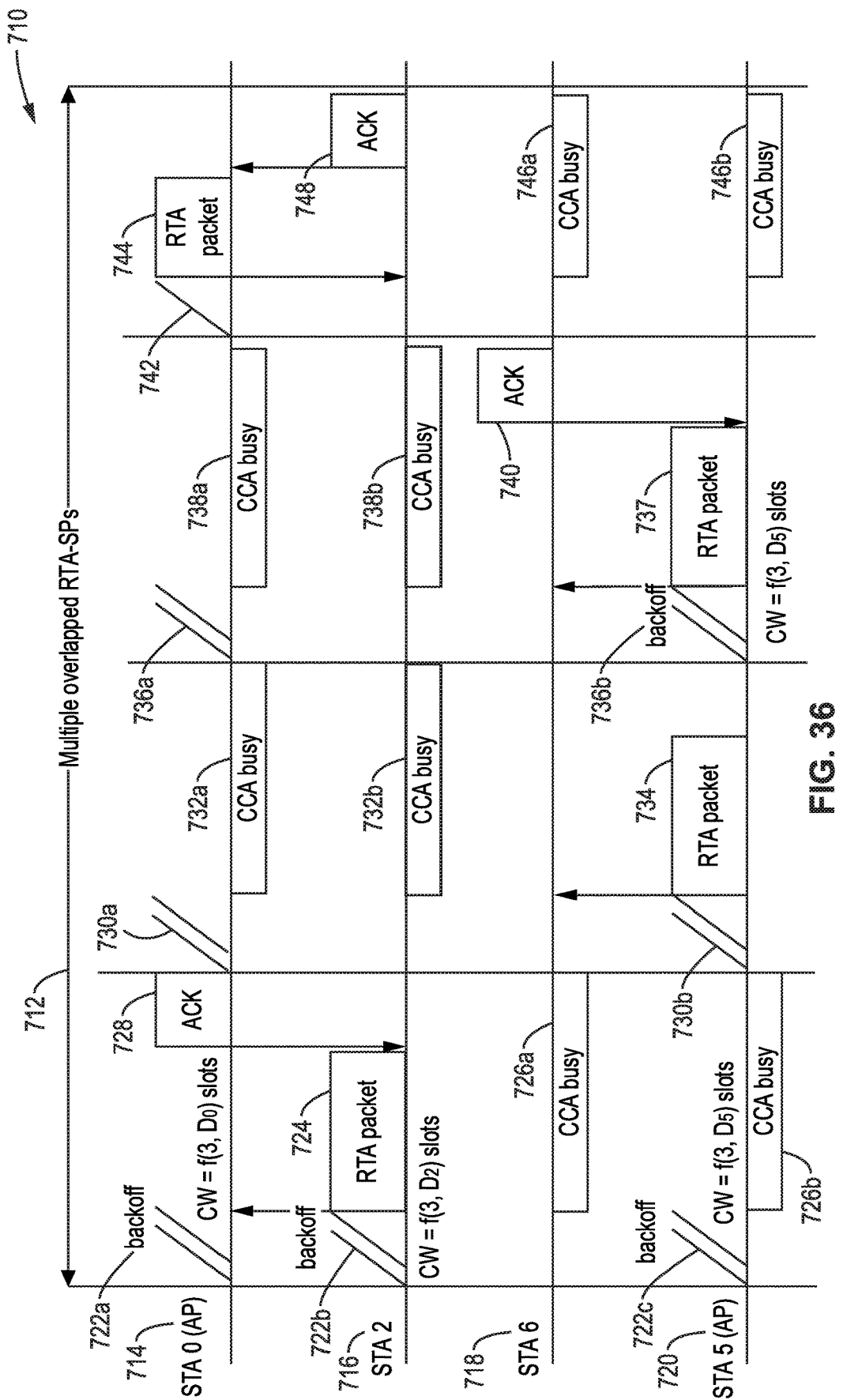
FIG. 36 is a communication sequence diagram of using a constant contention window size to avoid the contention collision among RTA packet transmissions during multiple RTA-SPs as utilized according to at least one embodiment of the present disclosure.

FIG. 36 illustrates an example embodiment 710 of one possible solution for using the contention window to avoid contention collisions among RTA packet transmissions. In this example, the STAs use the constant contention window size during the RTA-SPs to contend for the channel. As shown in the topology example of FIG. 7, STA 0 and STA 5 are APs, and STA 2 and STA 6 are STAs associated with STA 0 and STA 5, respectively.

This example considers a scenario when there are multiple (three) overlapped RTA-SPs 712 scheduled at the same time. The first RTA-SP is scheduled for STA2 716, which after contention with backoff 722b, transmits RTA packet 724 to STA0 714 which replies with an ACK 728. It will be noted that STA 0 and STA5 720 are shown also trying to contend for channel access with backoffs 722a, 722c, but after STA 2 obtains the channel they set CCA busy 726a, 726b.

The second RTA-SP is scheduled for STA5 720, that after contention with backoff 730b accesses the channel for transmitting an RTA packet 734 to STA6 718. It will be noted that STA0 714 also tried to contend 730a for the channel, but STA0 714 and STA2 716 set their CCA busy 732a, 732b. The packet was not received as no ACK is seen. Then in a retransmission, after backoff 736b STA5 710 sends RTA packet 737 to STA6 718, and receives ACK 740. Again STA0 714 also tried to contend 736a for the channel, and STA0 714 along with STA2 716 are seen setting their CCA busy 738a, 738b.

The third RTA-SP is scheduled for STA0 714 to transmit, after channel access 742, an RTA packet 744 is sent to STA2 716 which replies with an ACK 748. It is noted that STA6 718 and STA5 720 set CCA busy 746a, 746b.

As explained in Section 4.6.3, the APs and STAs are able to share these multiple RTA-SPs between each other. STA 0, STA 2, and STA 5 set the contention window size based on the number of the overlapped RTA-SPs, which is denoted by n. The value $D_i$ represents the latency requirement of RTA-SP session i, which can be used to determine (calculate) the contention window size. The function of calculating the contention window size is denoted by $f(n, D_i)$. For example, one possible calculation of contention window size is $f(n, D_i)=2^n+D_i/c$, where c is a constant.

STAs use the constant contention window size calculated by $f(n, D_i)$ to set the backoff time during the RTA-SP. As shown in FIG. 36 STA 0 sets its contention window size to $f(3,D_i)$ transmit RTA packet generated by RTA session 0. The backoff time could be decided by a uniform random variable between 0 and $f(n, D_i)$. The STAs await a backoff delay to gain channel access every time before transmitting a packet. For example, STA 5 sets the same contention window size $f(3, D_5)$ to contend for the channel twice to retransmit the RTA packet generated by RTA session 5.

Figure 37:
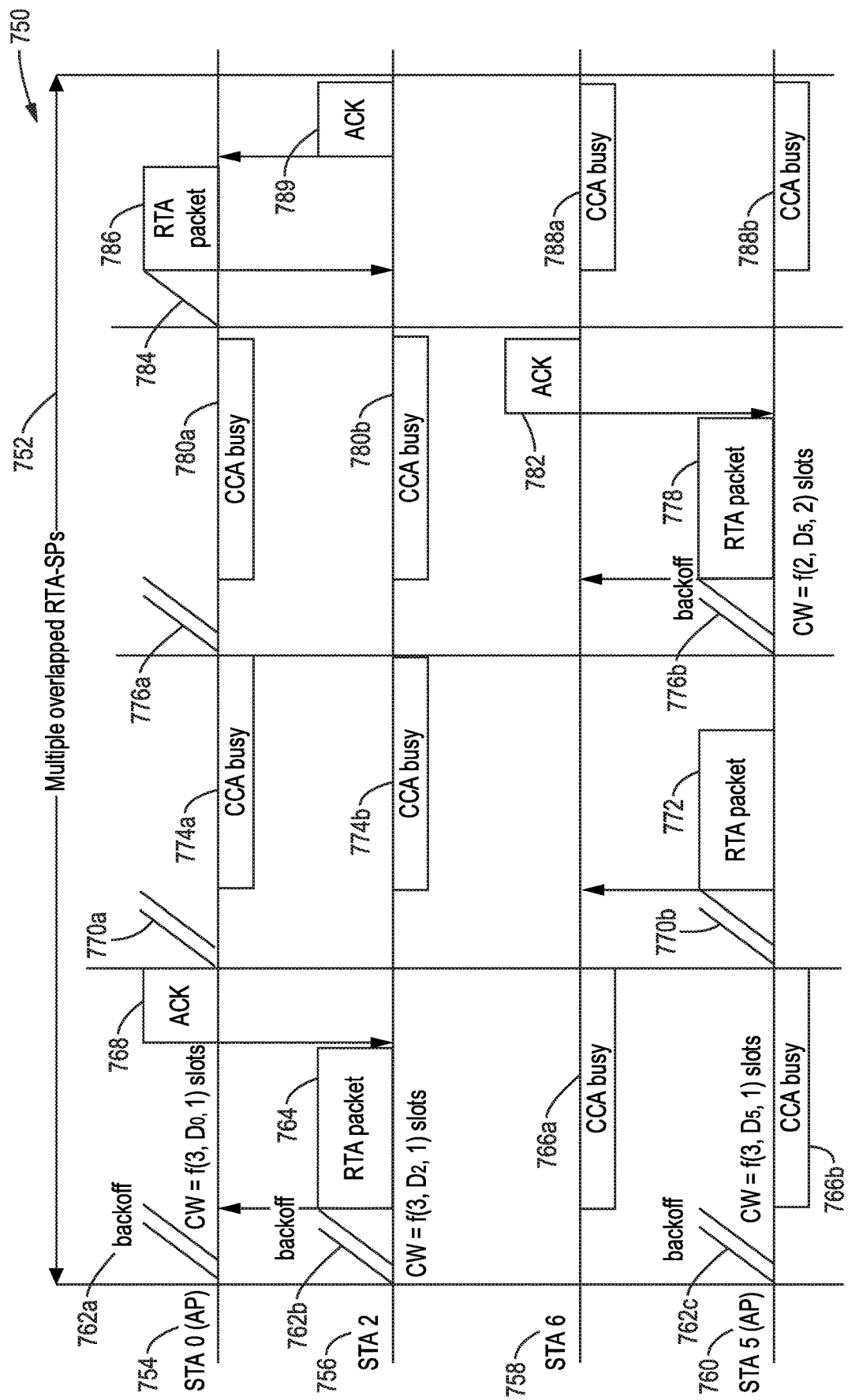
FIG. 37 is a communication sequence diagram of using a dynamic contention window size to avoid the contention collision among RTA packet transmissions during multiple RTA-SPs as utilized according to at least one embodiment of the present disclosure.

FIG. 37 illustrates an example embodiment 750 showing another possible solution of using contention window to avoid the contention collision among RTA packet transmissions. This example is the same as the previous one except that the contention window size can be calculated dynamically according to the change of the number of the overlapped RTA-SPs and other parameters.

As shown in the figure, the retry count of an RTA packet is denoted by r, which represents the number of RTA packet retransmissions. The function of calculating the contention window size is denoted by $f(n,D_i,r)$. For example, one possible calculation of contention window size is $f(n,D_i,r)=2^n+D_i/c \times r$, where c is a constant.

At the beginning of the RTA-SPs 752, there are three RTA-SPs contending for the channel at the same time; specifically those associated with STA0 754, STA2 756 and STA5 760 which determine their contention window size by setting n=3, and their backoffs are seen 762a, 762b and 762c. Since all the RTA packets are transmitted for the first time, they set r=1 in function $f(n,D_i,r)$. As shown in the figure, STA 2 gains channel access first and starts transmitting RTA packet 764 to STA0 754, while STA6 758 and STA5 760 set mark CCA busy 766a, 766b. After receipt STA 0 sends an ACK 768 to STA2 756.

Then STA0 754 and STA5 760 contend for the channel with backoffs 770a, 770b seen in the figure. STA 5 is the second STA that gains channel access and it sends RTA packet 772 to STA6 758, with STA0 754 and STA2 756 having CCA busy set 774a, 774b. This initial transmission to STA6 fails, as indicated by the lack of an ACK.

STA 5 then needs to re-contend for the channel to retransmit the RTA packet. This time, STA 5 knows that STA 2 has finished its RTA-SP and there are only two RTA-SPs contending for the channel. It calculates the contention window size using function $f(n,D_i,r)$ with n=2 and r=2. So STA 0 and STA 5 both contend for the channel with backoffs 776a, 776b seen. STA5 760 obtains the channel and sends packet 778 to STA6 758, during which time STA 0 and STA 2 have CCA busy 780a, 780b. After receiving the packet STA 6 replies with ACK 782.

Now only STA0 has a packet, and after backoff 784 with n=1 and r=1 the channel is quickly accessed to send RTA packet 786 to STA 2, while STA 6 and STA 5 are CCA busy 788a, 788b. Upon receipt of the packet STA2 756 transmits an ACK 789 back to STA0 754.

Figure 38:
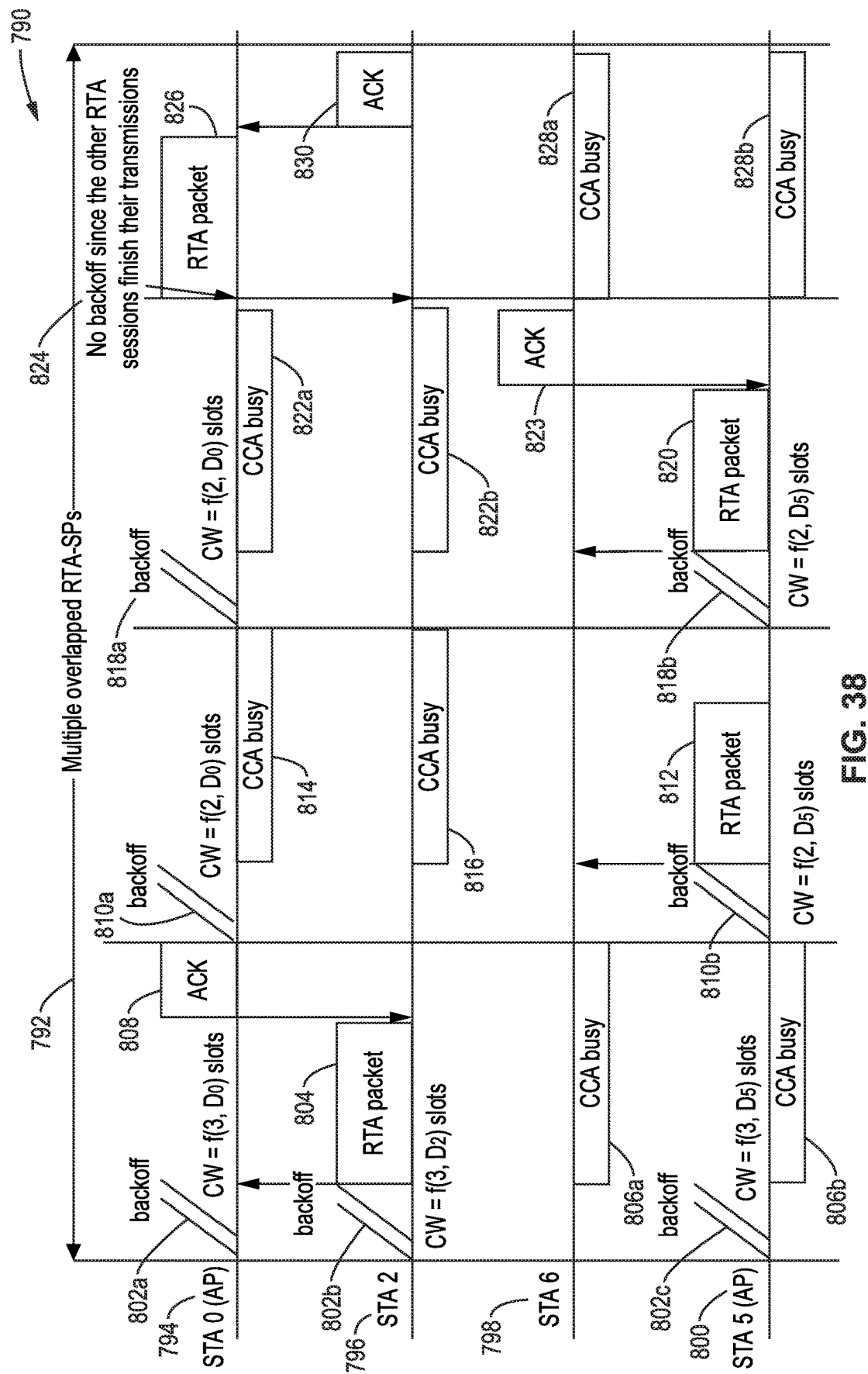
FIG. 38 is a communication sequence diagram of collision avoidance by re-contending for channel access every TXOP during multiple RTA-SPs as utilized according to at least one embodiment of the present disclosure.

FIG. 38 illustrates an example embodiment 790 as a third solution for using the contention window to avoid contention collision among RTA packet transmissions in the multiple overlapped RTA-SPs 792. In this example, every time a STA wins the contention, all the STAs will reset their backoff time to re-contend for the channel after that STA finishes one RTA packet transmission.

This example considers the same scenario as shown in FIG. 36. The function of calculating the contention window size $f(n, D_i)$ could be the same as seen in FIG. 36, while it is also possible to use the function $f(n,D_i,r)$ as shown in FIG. 37, or other functions as desired.

Every time the channel is obtained by a STA, all the STAs set the backoff delay based on the contention window size and start to contend the channel at the same time. The STA with the shortest backoff time will gain channel access and transmit the RTA packet. After that STA finishes its packet transmission, all the STAs reset the backoff time and contend for the channel, and so forth.

As shown in FIG. 38, STA0 794, STA2 796 and STA5 800 set their contention window sizes to $f(3,D_0)$, $f(3, D_2)$ and $f(3,D_5)$, respectively, with backoffs 802a, 802b and 802c shown. The backoff delay could be decided by a uniform random variable between zero (0) and the contention window size. The backoff delay of STA 2 was the shortest, so it won the contention and transmits RTA packet 804 to STA0 794, while STA6 798 and STA5 800 have CCA busy 806a, 806b. Upon receiving the RTA packet STA 0 ACKs 808 (confirms) receipt.

Once this first transmission is successful, STA 0 and STA 5 reset their backoff time with the contention window size $f(2,D_0)$ and $f(2, D_5)$ respectively, with backoffs 810a, 810b seen in the figure. In this period STA 5 gains channel access and transmits RTA packet 812 to STA6 798, while STA 0 and STA 2 have CCA busy 814, 816. However, this packet transmission fails, and both STA 0 and STA 5 know there are still two RTA-SPs contending for the channel. After STA 5 finishes its transmission (i.e., ACK timeout), these stations reset their backoff time with the contention window sizes $f(2,D_0)$ and $f(2, D_5)$, respectively, with backoffs 818a, 818b seen in the figure. STA 5 again obtains channel access and retransmits RTA packet 820 to STA6 798, while STA 0 and STA 2 are in CCA busy state 822a, 822b. This transmission is successful, with STA 6 responding with ACK 823.

Then, STA 0, knowing it is the only STA contending for the channel eliminates 824 the backoff delay and starts sending RTA packet 826 to STA 2, while STA 6 and STA 5 are in CCA busy state 828a, 828b. Upon receiving the packet, STA 2 replies with an ACK 830 to complete the packet transmissions.

4.7.5. Future Channel Time Reservation

In this sections it will be discussed that a STA is able to gain channel access in advance and reserve the channel for RTA-SP. This section provides one method to allow a STA gaining channel access before the start of RTA-SP. The disclosed technology is able to use RTA-RTS/CTS exchange to allow a STA occupying the channel in advance for packet transmission in RTA-SP. RTA-RTS/CTS exchange occupies the channel by setting the NAV at STAs, which is similar to regular RTS/CTS exchange. Compared with regular RTS/CTS exchange, the RTA-RTS/CTS exchange has the following features. When a STA sends an RTA-RTS frame, it will receive an RTA-CTS frame to indicate the success of channel occupancy. The RTA-RTS/CTS frame carries the traffic information that will be transmitted using the channel occupied by the RTA-RTS/CTS exchange. Between the gap between the end of the RTS/CTS exchange and the start of RTA-SP, the STA who sends CTS is allowed to attach multiple signal formats to keep the channel at CCA busy. This section explains the details of the RTA-RTS/CTS exchange and how it can be used for channel occupancy.

Figure 39:
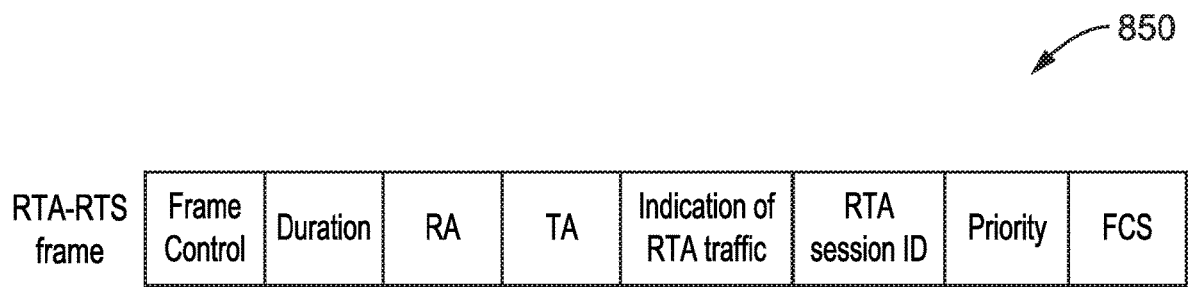
FIG. 39 is a data field diagram of an RTA-RTS frame format according to at least one embodiment of the present disclosure.

FIG. 39 illustrates an example embodiment 850 of an RTA-RTS frame which has the following fields. (a) A Frame Control field indicates the type of frame. (b) A Duration field contains NAV information used for CSMA/CA channel access. (c) An RA field contains an address of a recipient for the frame. (d) A TA field contains the address of the STA that transmitted the frame. (e) An Indication of RTA Traffic field is a short field, exemplified herein as a one bit field, to show whether the packet transmission following the RTA-RTS/CTS exchange is RTA or not. When the bit is set to a first state (e.g., "1"), the packet transmission is RTA. Otherwise, if the field is set to a second state (e.g., "0") it is a non-RTA packet transmission. (f) An RTA Session ID field indicates the identifying information of RTA session. The content of this field is shown in FIG. 11. This field could be used to map to the RTA-SP. (g) A Priority field indicates the priority of RTA traffic that will be transmitted after the RTA-RTS/CTS exchange. (h) The frame ends with a Frame Check Sequence (FCS).

Figure 40:
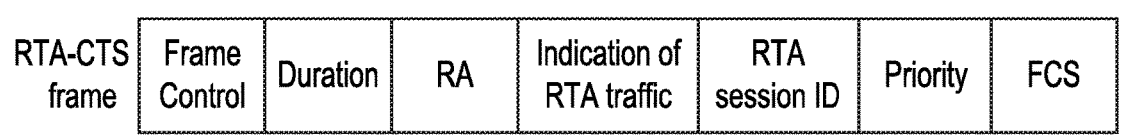
FIG. 40 is a data field diagram of an RTA-CTS frame format according to at least one embodiment of the present disclosure.

FIG. 40 illustrates an example embodiment 870 of an RTA-CTS frame which has the following fields. (a) Frame Control field indicates the type of frame. (b) A Duration field contains NAV information used for CSMA/CA channel access. (c) An RA field contains an address for the recipient of the frame. (d) An Indication of RTA Traffic field is a short field, such as one bit field, indicating whether the packet transmission following the RTA-RTS/CTS exchange is RTA or not. When the bit is set to a first state (e.g., "1"), the packet transmission is RTA. Otherwise, if set to a second state (e.g., "0") it is non-RTA packet transmission. (e) An RTA Session ID field indicates the identifying information of RTA session. The content of this field is shown in FIG. 11. This field could be used to map to the RTA-SP. (f) A Priority field indicates the priority of RTA traffic that will be transmitted after the RTA-RTS/CTS exchange. (g) The frame ends with a Frame Check Sequence (FCS).

Five examples are shown in the following figures to explain how RTA-RTS/CTS exchange is used for channel occupancy in advance for RTA-SPs. All the examples consider the network topology as shown in FIG. 7. In at least one embodiment the RTA-RTS/CTS frames in these examples can be replaced by regular RTS/CTS frames.

Figure 41:
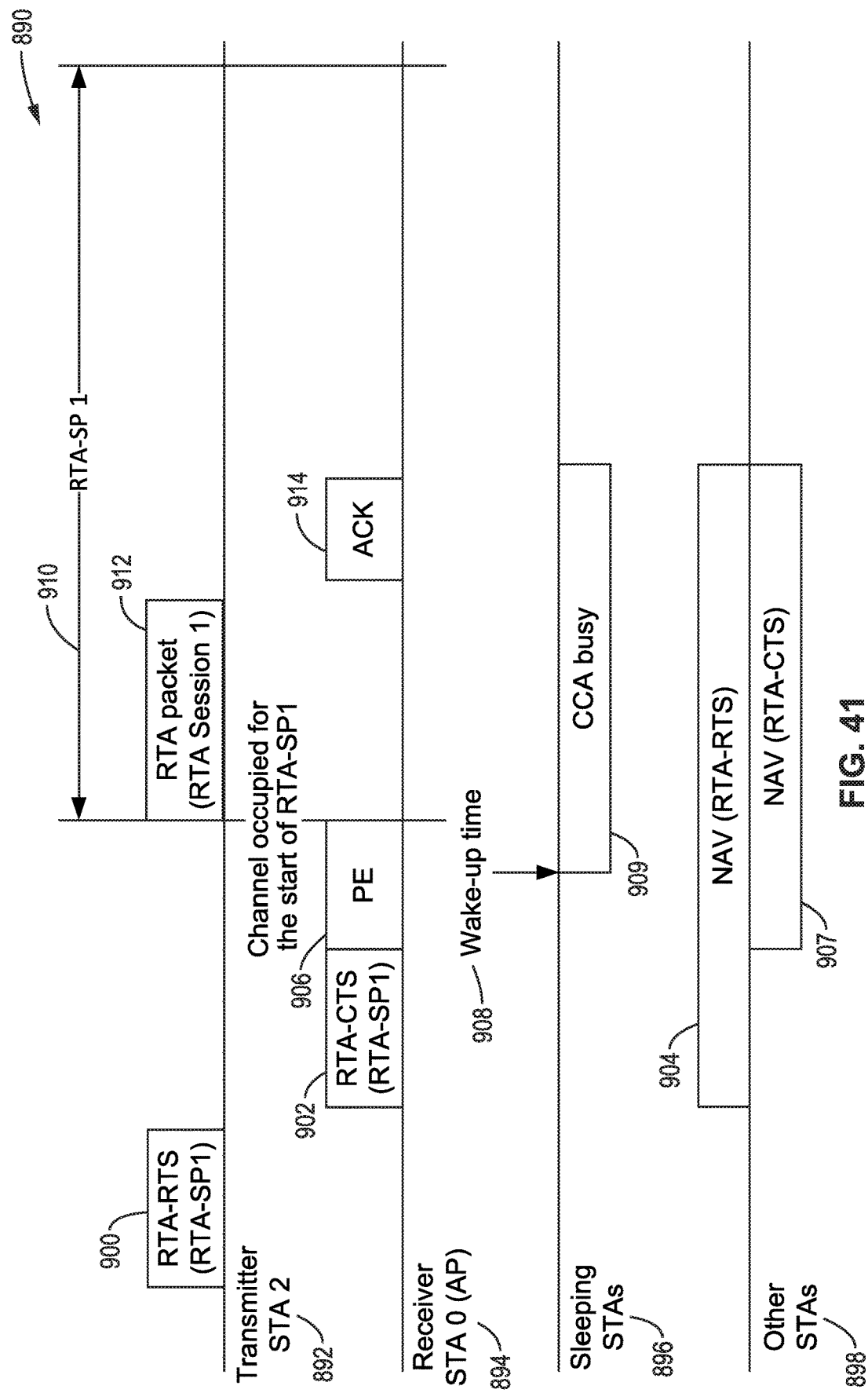
FIG. 41 is a communication sequence diagram of an AP and STA using an RTA-RTS/CTS exchange to occupy the channel in advance for RTA-SP, showing the case of when the AP sends an RTA-RTS frame to the STA as performed according to at least one embodiment of the present disclosure.

FIG. 41 illustrates an example embodiment 890 of an AP and STA using RTA-RTS/CTS exchange to occupy the channel in advance for RTA-SP. In this example are seen STA2 892, STA0 894, sleeping STAs 896 and other STAs 898. This example considers the scenario when AP sends an RTA-RTS frame to STA. Note that the RTA-RTS/CTS exchange is the same when the RTA-RTS frame is transmitted by STA.

As shown in the example, STA 2 decides to occupy the channel in advance for RTA-SP 1. As described in Table 8, STA 0 (AP) is the receiver during RTA-SP 1. STA 2 generates an RTA-RTS frame 900 carrying traffic information to indicate the channel occupancy request for RTA-SP 1 910 and sends it to STA0 894. STA 0 receives the RTA-RTS frame from STA 2, and extracts the traffic information carried by the RTA-RTS frame and compares it with the RTA-SPs listed in its RTA channel scheduling table. STA 0 knows the RTA-RTS frame is requesting the channel occupancy for RTA-SP 1 and sends an RTA-CTS frame 902 back to STA 2. When STA 2 receives the RTA-CTS frame, the channel is occupied successfully.

After STA 2 sends RTA-RTS 900 the other STAs 898 (that are awake) set NAV to RTA-RTS 904, and then set NAV to RTA-CTS 907 after the response from STA 0.

If some STAs 896 are in sleeping mode when the RTA-RTS/CTS exchange occurs, they may neither hear (receive) the RTA-RTS/CTS frames nor set their NAV. In that case, those sleeping STAs may wake up and start to transmit packets during the gap between the end of RTA-CTS frame and the beginning of the RTA-SP. In order to prevent this situation, the receiver STA in at least one embodiment (or mode) could add a packet extension (PE) 906 following the RTA-CTS frame. The figure depicts sleeping STAs 896 having a wake-up time 908 during PE 906, and in response to which they set CCA busy 909. The PE could be any type of signal that results in causing a CCA busy over the channel. For example, the PE could be the following: (a) padding signal of RTA-CTS frame, (b) another MAC frame following RTA-CTS frame (those two frames share the PLCP header and constitute an A-MPDU packet), (c) another independent packet, or (d) a random noise. Additionally, the gap time could also be used for the transmitter STA transmitting any packet transmission or noise to the receiver STA. STA 2 in this example is seen transmitting RTA packets 912 at the beginning of RTA-SP 1 910 without contending for the channel. STA 0 receives and ACKnowledges 914 the packet transmission.

Figure 42:
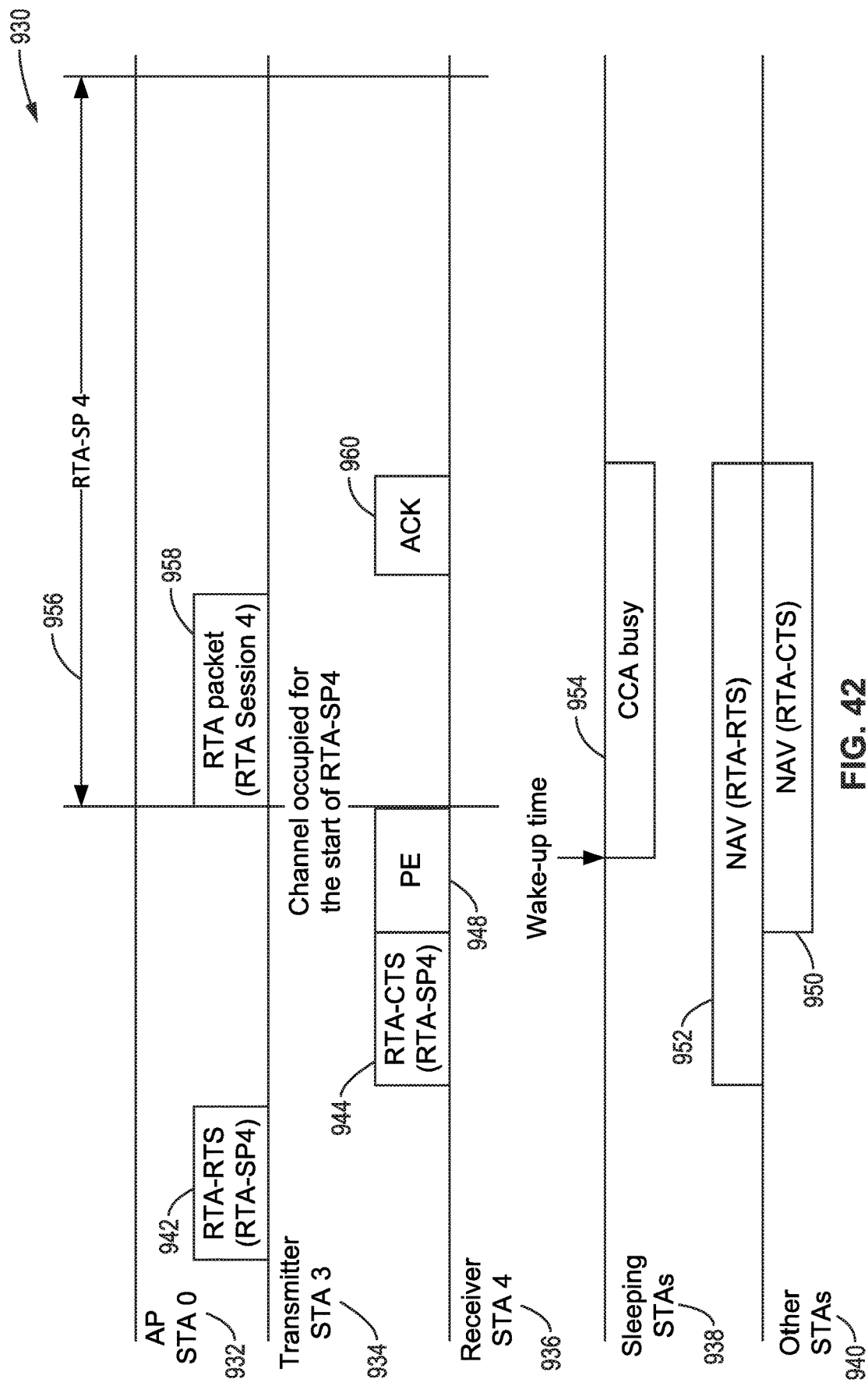
FIG. 42 is a communication sequence diagram of two STAs (no AP) using RTA-RTS/CTS exchange to occupy the channel in advance for RTA-SP as utilized according to at least one embodiment of the present disclosure.

FIG. 42 illustrates an example embodiment 930 an example of two STAs (no AP) using RTA-RTS/CTS exchange to occupy the channel in advance for RTA-SP. As described in Table 8, RTA-SP 4 is scheduled for RTA packet transmission between STA 3 and STA 4. As shown in the figure, STA 3 transmits an RTA-RTS frame to STA 4 to occupy the channel before the beginning of RTA-SP 4. The procedure of the RTA-RTS/CTS exchange is the same as in FIG. 41, and more particularly as follows.

AP STA0 932 is not involved in these transmissions. STA3 934 generates an RTA-RTS frame 942 carrying traffic information to indicate the channel occupancy request for RTA-SP 1 and sends it to STA4 936. STA4 receives the RTA-RTS frame from STA 3, and extracts traffic information from it and compares it with the RTA-SPs listed in its RTA channel scheduling table. STA 4 knows the RTA-RTS frame is requesting the channel occupancy for RTA-SP 4 and sends an RTA-CTS frame 944 back to STA 3. When STA 3 receives the RTA-CTS frame, the channel is occupied successfully.

After STA 3 sends RTA-RTS 942 the other STAs 940 (that are awake) set NAV to RTA-RTS 952, and then set NAV to RTA-CTS 950 after the response from STA 4.

If some STAs 938 are in sleeping mode when the RTA-RTS/CTS exchange occurs, they may neither hear (receive) the RTA-RTS/CTS frames nor set their NAV, so the packet extension (PE) 948 is sent by the receiver. So the figure depicts sleeping STAs 938 waking up and setting CCA busy 954. STA 3 in this example is seen transmitting RTA packets 958 at the beginning of RTA-SP 4 956 without contending for the channel. STA 4 receives and ACKnowledges 960 the packet transmission.

Figure 43:
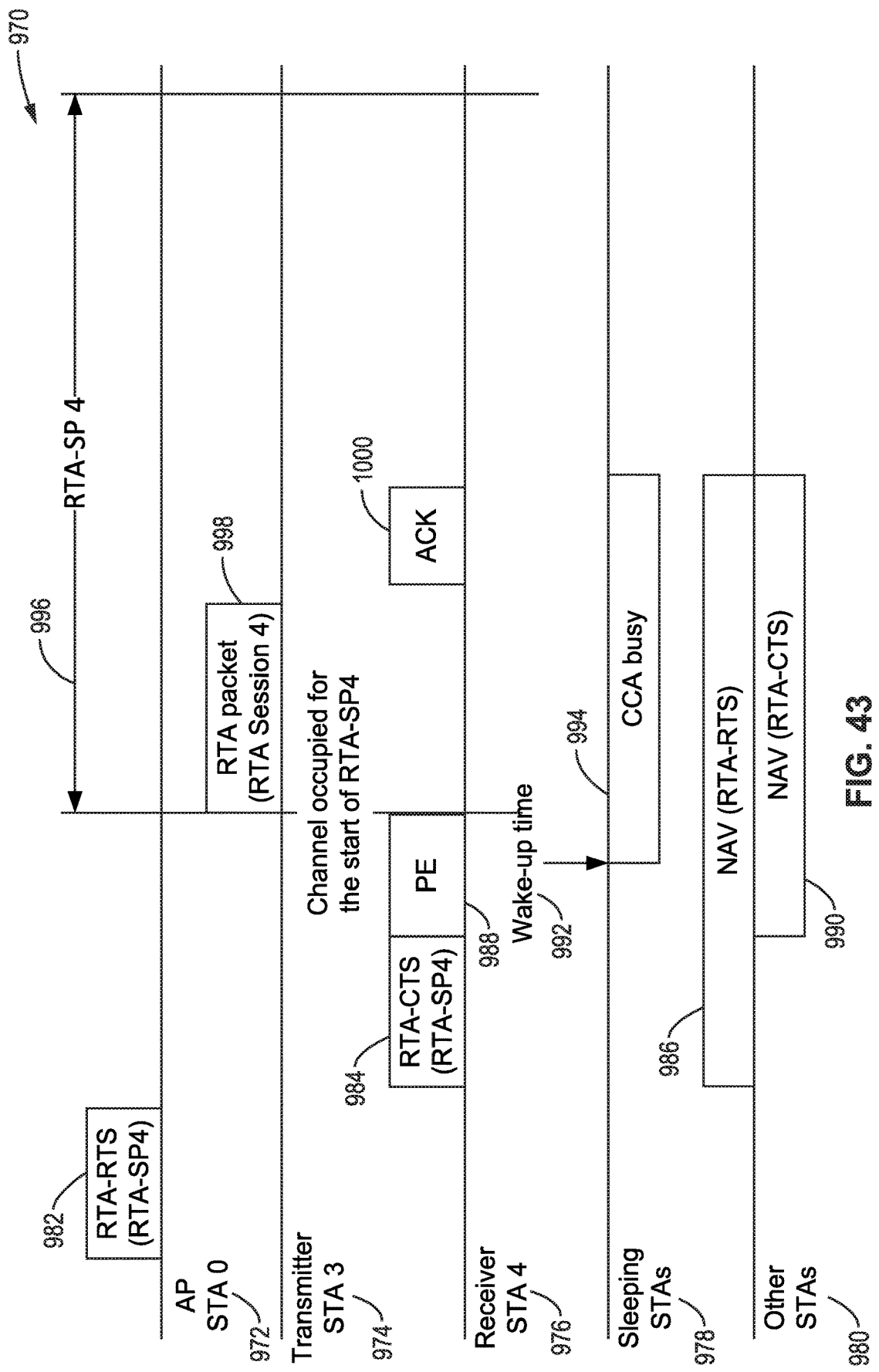
FIG. 43 is a communication sequence diagram of a second example of two STAs (no AP) using RTA-RTS/CTS exchange to occupy the channel in advance for RTA-SP as utilized according to at least one embodiment of the present disclosure.

FIG. 43 illustrates an example embodiment 970 on another way that two non-AP STAs can communicate using RTA-RTS/CTS exchange, with cooperation from the AP, to occupy the channel in advance for RTA-SP. The network scenario in the example is the same as in the previous one. As shown in the figure, STA0 (AP) 972 transmits an RTA-RTS frame 982 to STA4 976 to occupy the channel on behalf of STA3 974. Then STA4 976 transmits an RTA-CTS frame 984 back. Since both RTA-RTS and RTA-CTS frames carry the RTA session information, STA 3 knows the frames are used for occupying the channel for its RTA packet transmission (i.e., RTA-SP 4 996). STA 3 does not set the NAV after receiving those two frames. In response to receiving the RTA-RTS 982, other STAs 980 set NAV (RTA-RTS) 986 and then NAV (RTA-CTS) 990 after receiving RTA-CTS 984. One or more of the sleeping STAs 978 are shown awakening 992 during PE 988, upon which they set CCA busy 994. Upon arrival of RTA-SP4 996, STA3 974 transmits RTA packet 998 in RTA session 4, and receives an ACK 1000 from STA 4.

Figure 44:
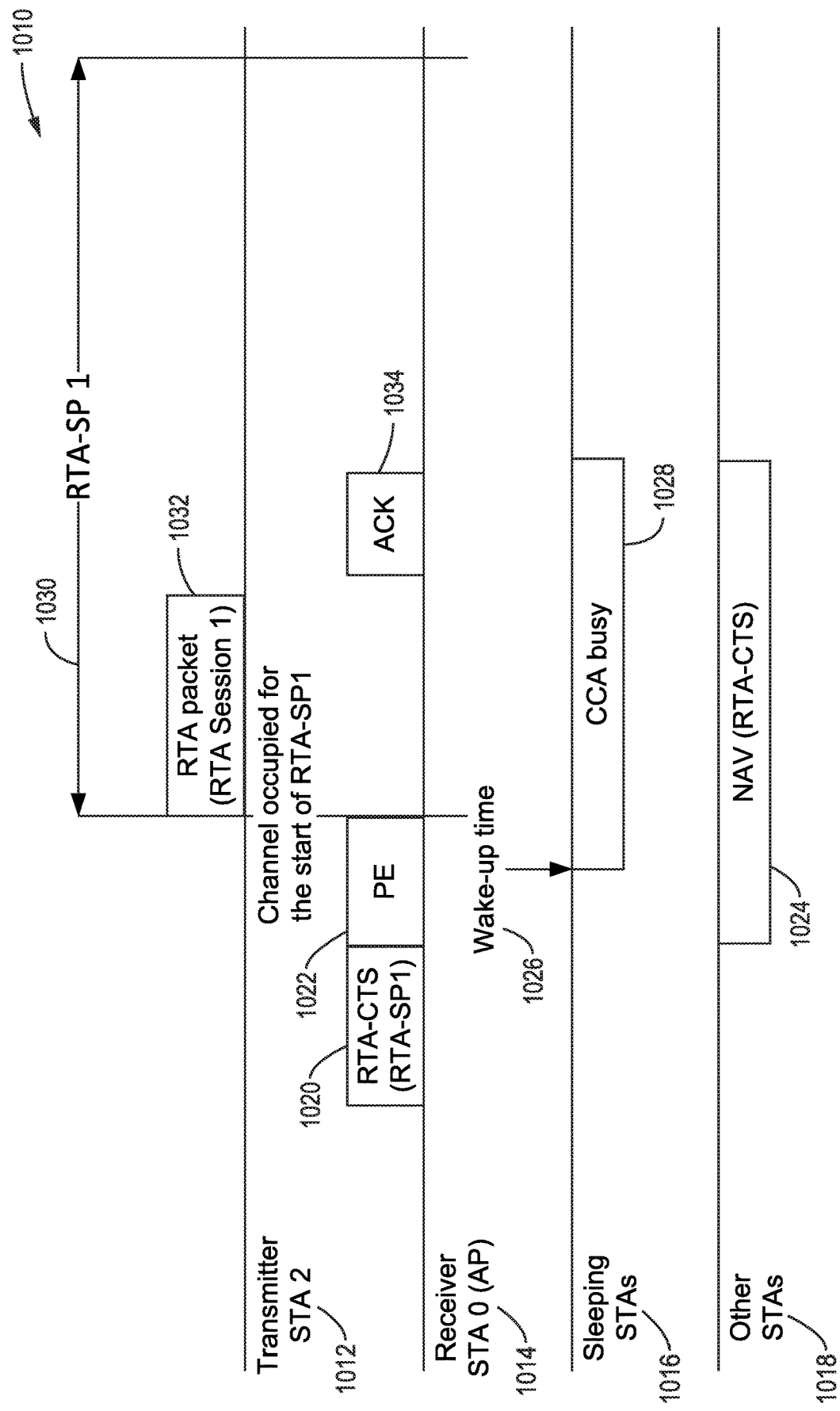
FIG. 44 is a communication sequence diagram of using RTA-CTS only for future channel time reservation as utilized according to at least one embodiment of the present disclosure.

FIG. 44 illustrates an example embodiment 1010 of using RTA-CTS only for future channel time reservation. It is possible that the receiver STA uses RTA-CTS frame only to occupy the channel in advance for its RTA-SP. The network scenario in the example is the same as in FIG. 41. As shown in the figure, STA0 1014 transmits an RTA-CTS frame 1020 to occupy the channel for RTA-SP1 1030 in advance. STA2 1012 recognizes that it is the transmitter during RTA-SP1 and does not set the NAV, however, other STAs 1018 set NAV (RTA-CTS) 1024 and keep quiet for RTA-SP1, while the sleeping STAs 1016 would set CCA busy 1028 if they wake up 1026, such as during PE interval 1022. It should be appreciated that the method in this example could also be utilized to reserve future channel time for the RTA-SPs between AP and STA and the RTA-SPs between STAs (no AP). To finish off the example it is seen that at the start of RTA-SP1 1030, STA2 1012 transmits RTA packet 1032, and afterward receives an ACK 1034 from STA0 1014.

Figure 45:
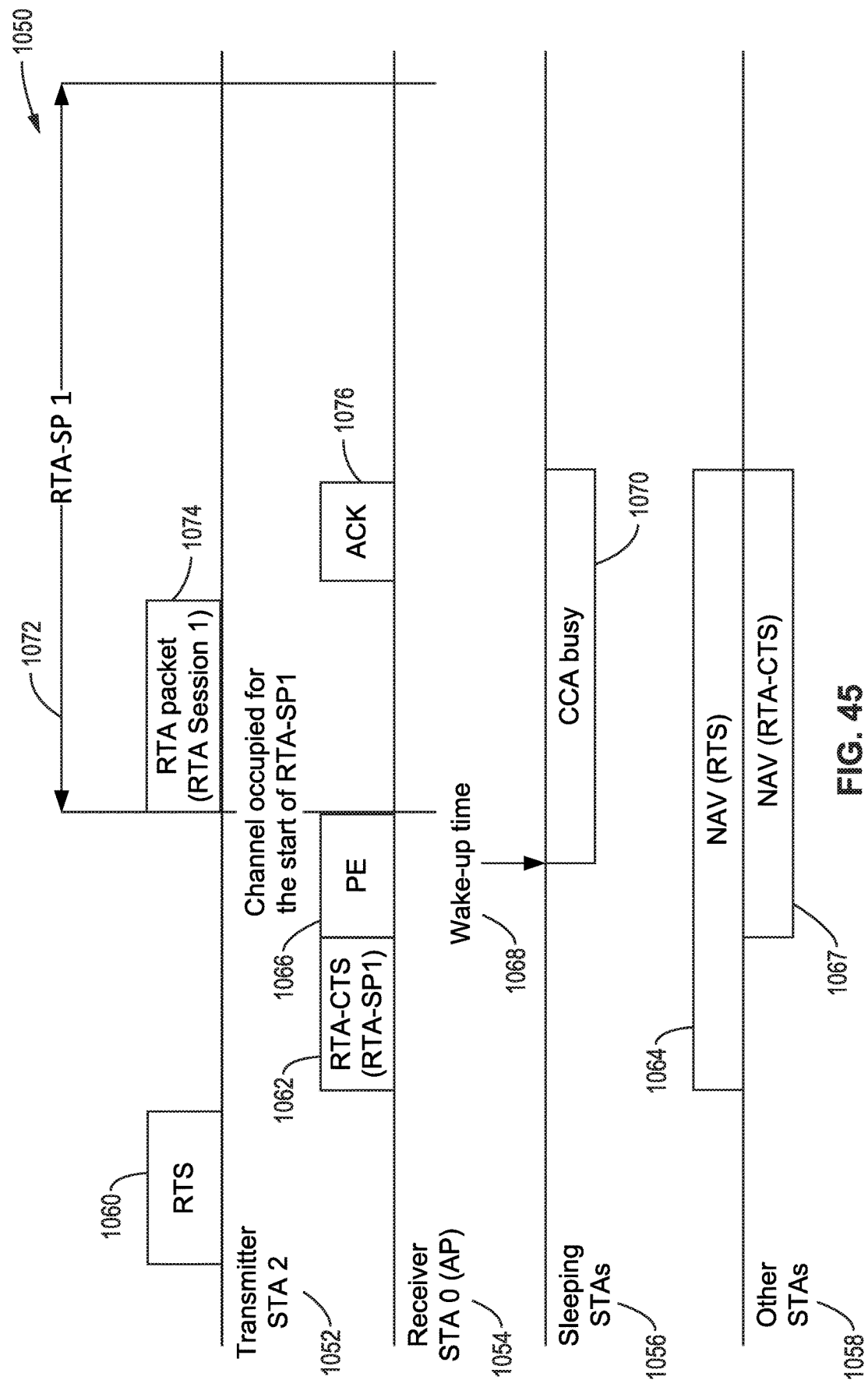
FIG. 45 is a communication sequence diagram of a STA sending a regular RTS frame to occupy the channel in advance for its RTA-SP as utilized according to at least one embodiment of the present disclosure.

FIG. 45 illustrates an example embodiment 1050 of a STA sending a regular RTS frame to occupy the channel in advance for its RTA-SP. The network scenario in the example is the same as in FIG. 41. As shown in FIG. 45, STA2 1052 transmits a regular RTS frame 1060 to AP STA0 1054. Then STA 0 realizes that RTA-SP 1 is scheduled in the near future, so it transmits an RTA-CTS frame 1062 carrying the information of RTA-SP 1 1072 back to STA 2. STA 2 receives the RTA-CTS frame and knows this frame is used for occupying the channel for RTA-SP 1. Other STAs 1058 set NAV (RTS) 1064 in response to RTS 1060, and then NAV (CTS) 1067 after receiving RTA-CTS 1062, and keep quiet for RTA-SP1, while the sleeping STAs 1056 would set CCA busy 1070 if they wake up 1068, such as during a PE interval 1066. To complete this example, upon reaching the time of RTA-SP1 1072, STA2 1052 transmits RTA packet 1074, after which it receives an ACK 1076 from STA0 1054.

5. General Scope of Embodiments

The enhancements described in the presented technology can be readily implemented within various wireless communication circuits. It should also be appreciated that wireless communication circuits are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with wireless packet communications. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit configured for wirelessly communicating over at least one channel with at least one other wireless station on a local area network (WLAN) in its reception area; (b) a processor coupled to said wireless communication circuit within a station configured for operating on the WLAN; (c) a non-transitory memory storing instructions executable by the processor; and (d) wherein said instructions, when executed by the processor, perform steps comprising: (d)(i) operating said wireless communication circuit as a WLAN station configured to support communicating real-time application (RTA) packets that are sensitive to communication delays as well as non-real time packets over a network supporting carrier sense multiple access/collision avoidance (CSMA/CA) in which real time application (RTA) traffic and non-RTA traffic coexist; (d)(ii) distinguishing real-time application (RTA) packets from non-real-time application (non-RTA) packets; (d)(iv) scheduling channel time for transmitting real-time application (RTA) traffic based on expected RTA packet arrival time; (d)(v) sharing scheduled channel time information with neighboring wireless stations; and (d)(vi) adjusting scheduled channel time based on the scheduled channel time of at least one of its neighboring wireless stations to prevent channel contention collisions when multiple RTA traffics are contending for the channel.

2. An apparatus for wireless communication in a network, the apparatus comprising: (a) a wireless communication circuit configured for wirelessly communicating over at least one channel with at least one other wireless station on a local area network (WLAN) in its reception area; (b) a processor coupled to said wireless communication circuit within a station configured for operating on the WLAN; (c) a non-transitory memory storing instructions executable by the processor; and (d) wherein said instructions, when executed by the processor, perform steps comprising: (d)(i) operating said wireless communication circuit as a WLAN station configured to support communicating real-time application (RTA) packets that are sensitive to communication delays as well as non-real time packets over a network supporting carrier sense multiple access/collision avoidance (CSMA/CA) in which real time application (RTA) traffic and non-RTA traffic coexist; (d)(ii) distinguishing real-time application (RTA) packets from non-real-time application (non-RTA) packets in response to using prior negotiation information or packet header information; (d)(iv) scheduling channel time for transmitting real-time application (RTA) traffic based on expected RTA packet arrival time; (d)(v) sharing scheduled channel time information with neighboring wireless stations; (d)(vi) adjusting scheduled channel time based on the scheduled channel time of at least one of its neighboring wireless stations to prevent channel contention collisions when multiple RTA traffics are contending for the channel; and (d)(vii) refraining from transmitting non-RTA packets during the scheduled channel time for RTA packet transmission during the process of scheduling channel time for transmitting RTA traffic.

3. A method of performing wireless communication in a network, the apparatus comprising: (a) operating a wireless communication circuit as a WLAN station configured to support communicating real-time application (RTA) packets that are sensitive to communication delays as well as non-real time packets over a network supporting carrier sense multiple access/collision avoidance (CSMA/CA) in which real time application (RTA) traffic and non-RTA traffic coexist; (b) distinguishing real-time application (RTA) packets from non-real-time application (non-RTA) packets; (c) scheduling channel time for transmitting real-time application (RTA) traffic based on expected RTA packet arrival time; (d) sharing scheduled channel time information with neighboring wireless stations; and (e) adjusting scheduled channel time based on the scheduled channel time of at least one of its neighboring wireless stations to prevent channel contention collisions when multiple RTA traffics are contending for the channel.

4. A Wireless communication system/apparatus performing transmission of packets, where CSMA/CA is applied, and the real time application (RTA) traffic and non-RTA traffic coexist in the system/apparatus, comprising: (a) distinguishing RTA traffic and non-RTA traffic; (b) scheduling channel time for transmitting RTA traffic based on the expected RTA packet arrival; (c) sharing scheduled channel time with neighboring STAs; (d) adjusting scheduled channel time based on the scheduled channel time of its neighboring STAs; (e) avoiding channel contention collision when multiple RTA traffics are contending the channel.

5. The apparatus or method of any preceding embodiment, wherein said instructions when executed by the processor for distinguishing real-time application (RTA) packets from non-real-time application (non-RTA) packets further perform steps comprising distinguishing RTA traffic and non-RTA traffic in response to using prior negotiation information or packet header information.

6. The apparatus or method of any preceding embodiment, wherein said instructions when executed by the processor further perform steps comprising the wireless station operating as an access point (AP) and publishing scheduled channel time information in its beacon to advertise the scheduled channel time to its neighboring wireless stations.

7. The apparatus or method of any preceding embodiment, wherein said instructions when executed by the processor further perform steps comprising receiving scheduled channel time of neighboring wireless stations and parsing the information into a timing synchronization function (TSF) of the wireless station BSS.

8. The apparatus or method of any preceding embodiment, wherein said instructions when executed by the processor further perform steps comprising refraining from transmitting non-RTA packets during the scheduled channel time for RTA packet transmission during the process of scheduling channel time for transmitting RTA traffic.

9. The apparatus or method of any preceding embodiment, wherein said instructions when executed by the processor further perform steps comprising utilizing an RTA internal timer to determine when to start contending for the channel while avoiding channel contention collisions.

10. The apparatus or method of any preceding embodiment, wherein said instructions when executed by the processor utilizing an RTA internal timer further comprising randomizing said RTA internal time based on the target latency time of the RTA packet.

11. The apparatus or method of any preceding embodiment, wherein said instructions when executed by the processor further perform steps comprising utilizing a ready-to-send (RTS) form of signaling on short transmitter operating periods (TXOP) to reserve future channel time for RTA packet transmission.

12. The apparatus or method of any preceding embodiment, further comprises distinguishing RTA traffic and non-RTA traffic in response to using prior negotiation information or packet header information.

13. The apparatus or method of any preceding embodiment, wherein comprises the wireless station is operating as an access point (AP) and is publishing scheduled channel time information in its beacon to advertise the scheduled channel time to its neighboring wireless stations.

14. The apparatus or method of any preceding embodiment, further comprising receiving scheduled channel time of neighboring wireless stations and parsing the information into a timing synchronization function (TSF) of the wireless station BSS.

15. The apparatus or method of any preceding embodiment, further comprising refraining from transmitting non-RTA packets during the scheduled channel time for RTA packet transmission during the process of scheduling channel time for transmitting RTA traffic.

16. The apparatus or method of any preceding embodiment, further comprising utilizing an RTA internal timer to determine when to start contending for the channel while avoiding channel contention collisions.

17. The apparatus or method of any preceding embodiment, further comprising randomizing said RTA internal time based on the target latency time of the RTA packet.

18. The apparatus or method of any preceding embodiment, further comprising utilizing a ready-to-send (RTS) form of signaling on short transmitter operating periods (TXOP) to reserve future channel time for RTA packet transmission.

19. The apparatus or method of any preceding embodiment, further comprising distinguishing RTA traffic and non-RTA traffic based on information about prior negotiation or packet header information.

20. The apparatus or method of any preceding embodiment, further comprising an AP advertising its scheduled channel time to its neighboring STAs could publish the information in its beacon.

21. The apparatus or method of any preceding embodiment, wherein a STA receiving the scheduled channel time of its neighbors parses the information in its BSS's Timing Synchronization Function (TSF).

22. The apparatus or method of any preceding embodiment, wherein a STA transmitting the RTA packets uses the channel time in a different manner than the scheduled channel time.

23. The apparatus or method of any preceding embodiment, where STA scheduling channel time for transmitting RTA traffic refrains from transmitting non-RTA packets during the scheduled channel time for RTA packet transmission.

24. The apparatus or method of any preceding embodiment, wherein a STA avoiding the channel contention collision uses an RTA internal timer, whose value could be randomized based on the target latency time of the RTA packet, to start contending the channel.

25. The apparatus or method of any preceding embodiment, wherein a STA avoiding the channel contention collision uses an RTS like signal with short TXOP to reserve the future channel time for RTA packet transmission.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Header Information for Identifying
RTA Traffic at the Transmitter Side

| Layers | Header information |
|---|---|
| APP | RTA session ID, RTA session name, signature |
| Transport | TCP/UDP port numbers |
| Network | IP address of source & destination, type of service |

TABLE 2

List of RTA Session Status

| RTA Session Status | Action in Status |
|---|---|
| Active | Session is active to generate traffic |
| Inactive | Session is disabled to not generate traffic |
| Error | Session has error(s) |

TABLE 3

List of Allocation Options for Channel Resource

| RTA Session Status | Action in Status |
|---|---|
| Flexible | AP has full flexibility to allocate channel resources for Tx |
| Fixed | AP must allocate constant channel resource for Tx |
| Random | Allocated channel resource chosen randomly for each period |
| Algorithm | Allocated channel resource determined by customized process |

TABLE 4

RTA Session Status at STA 0

| # | Tx | Rx | Start Time (mS) | End Time (mS) | Time Alloc. Option | RU Alloc. Option | SS Alloc. Option | Per. Time (mS) | Pri. | Sess Stat. |
|---|---|---|---|---|---|---|---|---|---|---|
| 1 | STA2 | STA0 | 1 | 900 | Flex | Flex | Flex | 10 | 5 | Act |
| 2 | STA0 | STA3 | 3 | 800 | Flex | Flex | Fixed | 20 | 5 | Act |
| 3 | STA0 | STA4 | 3 | 800 | Flex | Flex | Flex | 20 | 4 | Act |

Allocations:
Flex = flexible,
Fixed = fixed,
Ran = Random
Session Status:
Act = Active

TABLE 5

Adding STA-to-STA RTA Session at STA 0

| # | Tx | Rx | Start Time (mS) | End Time (mS) | Time Alloc. Option | RU Alloc. Option | SS Alloc. Option | Per. Time (mS) | Pri. | Sess Stat. |
|---|---|---|---|---|---|---|---|---|---|---|
| 1 | STA2 | STA0 | 1 | 900 | Flex | Flex | Ran | 10 | 5 | Act |
| 2 | STA0 | STA3 | 3 | 800 | Flex | Fixed | Ran | 20 | 5 | Act |
| 3 | STA0 | STA4 | 3 | 800 | Flex | Flex | Ran | 20 | 4 | Act |
| 4 | STA3 | STA4 | 3 | 800 | Algo | Flex | Flex | 20 | 3 | Act |

Allocations:
Flex = flexible,
Fixed = fixed,
Algo = algorithm,
Ran = Random
Session Status:
Act = Active

TABLE 6

RTA channel scheduling table at STA0 at time 0 ms

| SP# | Sess. ID | Period St. Time (mS) | Period End Time (mS) | Per. Time (mS) | Time Alloc. (mS) | RU Alloc. Option | SS Alloc. Option | Pri. | Activity |
|---|---|---|---|---|---|---|---|---|---|
| 1 | 1 | 1 | 900 | 10 | 1 | Ran | Ran | 5 | Rx |
| 2 | 2 | 3 | 800 | 20 | 3 | Ran | SS1 | 5 | Tx |
| 3 | 3 | 6 | 800 | 20 | 3 | Ran | Ran | 4 | Tx |
| 4 | 4 | 12 | 800 | 20 | 3 | Ran | Ran | 3 | Arr |

Allocations:
Ran = Random,
RUn = Resource Unit "n",
SSn - Spatial Stream "n"
Activity:
Rx = Receiving,
Tx = Transmitting,
Arr = Arrange.

TABLE 7

RTA channel scheduling table at STA0 after beacon Rx from STA5

| SP# | Sess. ID | Period St. Time (mS) | Period End Time (mS) | Per. Time (mS) | Time Alloc. (mS) | RU Alloc. Option | SS Alloc. Option | Pri. | Activity |
|---|---|---|---|---|---|---|---|---|---|
| 1 | 1 | 1 | 900 | 10 | 1 | Ran | Ran | 5 | Rx |
| 2 | 2 | 3 | 800 | 20 | 3 | Ran | SS1 | 5 | Tx |
| 3 | 3 | 6 | 800 | 20 | 3 | Ran | Ran | 4 | Tx |
| 4 | 4 | 12 | 800 | 20 | 3 | Ran | Ran | 3 | Arr |
| 5 | 5 | 11 | 800 | 20 | 1 | Ran | Ran | 3 | Lis |
| 6 | 6 | 12 | 800 | 20 | 3 | RU1 | Ran | 3 | Lis |

Allocations:
Ran = Random,
RUn = Resource Unit "n",
SSn - Spatial Stream "n"
Activity:
Rx = Receiving,
Tx = Transmitting,
Lis = Listening,
Arr = Arrange.

TABLE 8

RTA channel scheduling table at STA0 after Adjust RTA-SPs

| SP# | Sess. ID | Period St. Time (mS) | Period End Time (mS) | Per. Time (mS) | Time Alloc. (mS) | RU Alloc. Option | SS Alloc. Option | Pri. | Activity |
|---|---|---|---|---|---|---|---|---|---|
| 1 | 1 | 9 | 900 | 10 | 1 | Ran | Ran | 5 | Rx |
| 2 | 2 | 3 | 800 | 20 | 3 | Ran | SS1 | 5 | Tx |
| 3 | 3 | 6 | 800 | 20 | 3 | Ran | Ran | 4 | Tx |
| 4 | 4 | 12 | 800 | 20 | 4 | RU2 | Ran | 3 | Arr |
| 5 | 5 | 11 | 800 | 20 | 1 | Ran | Ran | 3 | Lis |
| 6 | 6 | 12 | 800 | 20 | 3 | RU1 | Ran | 3 | Lis |

Allocations:
Ran = Random,
RUn = Resource Unit "n",
SSn - Spatial Stream "n"
Activity:
Rx = Receiving,
Tx = Transmitting,
Lis = Listening,
Arr = Arrange.

What is claimed is:

1. An apparatus for wireless communication in a network, the apparatus comprising:
   (a) a wireless communication circuit configured, as a station under an IEEE 802.11 communications protocol supporting carrier sense multiple access/collision avoidance (CSMA/CA) and providing a lower latency capability for real-time application (RTA) traffic, for wirelessly communicating over at least one channel with at least one other wireless station on a wireless local area network (WLAN) in its reception area;
   (b) a processor coupled to the station configured for operating on the WLAN;
   (c) a non-transitory memory storing instructions executable by the processor; and
   (d) wherein said instructions, when executed by the processor, perform steps of the communications protocol comprising:
      (i) operating said wireless communication circuit as a WLAN station under CSMA/CA for communicating non-real time (non-RTA) packets between stations which contend for channel access;
      (ii) distinguishing RTA packets from non-RTA packets at the station's media access control (MAC) layer, which extracts information when receiving traffic from an upper layer and compares it with RTA session records created during RTA stream negotiations to determine if the packets are RTA packets;
      (iii) scheduling channel time for transmitting RTA traffic based on expected RTA packet arrival time as determined at the MAC layer;
      (iv) sharing scheduled channel time information with neighboring wireless stations, and wherein the WLAN station operating as an access point (AP) publishes scheduled channel time information in its beacon to advertise the scheduled channel time to its neighboring wireless stations;
      (v) adjusting scheduled channel time based on the scheduled channel time of at least one of its neighboring wireless stations toward preventing channel contention collisions when multiple RTA traffics are contending for the channel;
      (vi) occupying the channel before the RTA packet arrives; and
      (vii) transmitting the RTA packet.

2. The apparatus as recited in claim 1, wherein said instructions when executed by the processor for distinguishing RTA packets from non-RTA packets further perform steps comprising distinguishing RTA traffic and non-RTA traffic in response to using prior negotiation information or packet header information.

3. The apparatus as recited in claim 1,
   wherein each station under the IEEE 802.11 communications protocol supporting CSMA/CA has at least an application (APP) layer, the MAC layer, and a physical (PHY) layer;
   wherein said APP layer and said MAC layer each have a management entity;
   wherein during a communication, each station acts as either a transmitter station or a receiver station;
   wherein said instructions when executed by the processor further perform steps comprising:
   performing said scheduling channel time by the station for transmitting RTA traffic in response to said MAC layer of the station determining that a resource is available and sending a negotiation request to the MAC layer of a receiver station which informs its APP layer to prepare for receiving RTA packets by sending a negotiation request from its MAC layer to its management entity in the APP layer and communicating results to the MAC layer of the station, that is transmitting RTA traffic, which forwards these results to the APP layer of the station for it to start transmitting RTA traffic if the resource was granted by both the transmitting and receiving stations.

4. The apparatus as recited in claim 1, wherein said instructions when executed by the processor further perform steps comprising refraining from transmitting non-RTA packets during the scheduled channel time for RTA packet transmission during the process of scheduling channel time for transmitting RTA traffic.

5. The apparatus as recited in claim 1, wherein said instructions when executed by the processor further perform steps comprising utilizing an RTA internal timer to determine when to start contending for the channel while avoiding channel contention collisions.

6. The apparatus as recited in claim 5, wherein said instructions when executed by the processor utilizing an RTA internal timer further comprise randomizing said RTA internal time based on a target latency time of the RTA packet.

7. The apparatus as recited in claim 1, wherein said instructions when executed by the processor further perform steps comprising utilizing a ready-to-send (RTS) form of signaling on short transmitter operating periods (TXOP) to reserve future channel time for RTA packet transmission.

8. The apparatus as recited in claim 1, wherein said expected RTA packet arrival time is the packet arrival time at the MAC layer of the WLAN station, allowing the WLAN station to occupy the channel before the RTA packet arrives at the MAC layer, thus upon RTA packet arrival the WLAN station transmits the packet without contending for the channel.

9. The apparatus as recited in claim 1, further comprising instructions, that when executed by the processor, perform steps comprising:
   transmitting non-RTA packets using CSMA/CA in which the WLAN station contends with other stations for accessing the channel when it is not scheduled for RTA traffic; and
   wherein said apparatus is backward compatible with CSMA/CA WLAN stations which do not provide for prioritizing RTA packets over non-RTA packets.

10. An apparatus for wireless communication in a network, the apparatus comprising:
   (a) a wireless communication circuit configured, as a station under an IEEE 802.11 communications protocol supporting carrier sense multiple access/collision avoidance (CSMA/CA) and providing a lower latency capability for real-time application (RTA) traffic, for wirelessly communicating over at least one channel with at least one other wireless station on a wireless local area network (WLAN) in its reception area;
   (b) a processor coupled to said station configured for operating on the WLAN;
   (c) a non-transitory memory storing instructions executable by the processor; and
   (d) wherein said instructions, when executed by the processor, perform steps of the communications protocol comprising:
      (i) operating said wireless communication circuit as a WLAN station under CSMA/CA for communicating non-real time (non-RTA) packets between stations which contend for channel access;

(ii) distinguishing RTA packets from non-RTA packets in response to using prior negotiation information or packet header information, wherein said packets are distinguished at the station's media access control (MAC) layer, which extracts information when receiving traffic from an upper layer and compares it with RTA session records created during RTA stream negotiations to determine if the packets are RTA packets;

(iii) scheduling channel time for transmitting RTA traffic based on expected RTA packet arrival time as determined at the MAC layer;

(iv) sharing scheduled channel time information with neighboring wireless stations;

(v) adjusting scheduled channel time based on the scheduled channel time of at least one of its neighboring wireless stations toward preventing channel contention collisions when multiple RTA traffics are contending for the channel;

(vi) refraining from transmitting non-RTA packets during the scheduled channel time for RTA packet transmission during the process of scheduling channel time for transmitting RTA traffic;

(vii) occupying the channel before the RTA packet arrives; and (viii) transmitting the RTA packet.

11. The apparatus as recited in claim 10, wherein said instructions when executed by the processor further perform steps comprising the WLAN station operating as an access point (AP) and publishing scheduled channel time information in its beacon to advertise the scheduled channel time to its neighboring wireless stations.

12. The apparatus as recited in claim 10,
wherein each station under the IEEE 802.11 communications protocol supporting CSMA/CA has at least an application (APP) layer, the MAC layer, and a physical (PHY) layer;
wherein said APP layer and said MAC layer each have a management entity;
wherein during a communication, each station acts as either a transmitter station or a receiver station;
wherein said instructions when executed by the processor further perform steps comprising;
performing said scheduling channel time by the station for transmitting RTA traffic in response to said MAC layer of the station determining that a resource is available and sending a negotiation request to the MAC layer of a receiving station which informs its APP layer to prepare for receiving RTA packets by sending a negotiation request from its MAC layer to the management entity in its APP layer and communicating results to the MAC layer of the station, that is transmitting RTA traffic, which forwards these results to the APP layer of the station for it to start transmitting RTA traffic if the resource was granted by both the transmitting and receiving stations.

13. The apparatus as recited in claim 10, wherein said instructions when executed by the processor further perform steps comprising utilizing an RTA internal timer to determine when to start contending for the channel while avoiding channel contention collisions.

14. The apparatus as recited in claim 13, wherein said instructions when executed by the processor utilizing an RTA internal timer further comprise randomizing said RTA internal time based on the target latency time of the RTA packet.

15. The apparatus as recited in claim 10, wherein said instructions when executed by the processor further perform steps comprising utilizing a ready-to-send (RTS) form of signaling on short transmitter operating periods (TXOP) to reserve future channel time for RTA packet transmission.

16. A method of performing wireless communication in a network, the method comprising:
(a) operating a wireless communication circuit as a station, under an IEEE 802.11 communications protocol supporting carrier sense multiple access/collision avoidance (CSMA/CA) and providing a lower latency capability for real-time application (RTA) traffic, configured to support communicating RTA packets that are sensitive to communication delays as well as non-real time application (non-RTA) packets over a network supporting carrier sense multiple access/collision avoidance (CSMA/CA) in which RTA traffic and non-RTA traffic coexist;

(b) communicating non RTA packets under CSMA/CA between stations which contend for channel access;

(c) distinguishing RTA packets from non-RTA packets at the station's media access control (MAC) layer, which extracts information when receiving traffic from an upper layer and compares it with RTA session records created during RTA stream negotiations to determine if the packets are RTA packets;

(d) scheduling channel time for transmitting RTA traffic based on expected RTA packet arrival time as determined at the MAC layer;

(e) sharing scheduled channel time information with neighboring wireless stations;

(f) operating as an access point (AP) and publishing scheduled channel time information in its beacon to advertise the scheduled channel time to its neighboring wireless stations;

(g) adjusting scheduled channel time based on the scheduled channel time of at least one of its neighboring wireless stations toward preventing channel contention collisions when multiple RTA traffics are contending for the channel;

(h) occupying the channel before the RTA packet arrives; and (i) transmitting the RTA packet.

17. The method as recited in claim 16, further comprising distinguishing RTA traffic and non-RTA traffic in response to using prior negotiation information or packet header information.

18. The method as recited in claim 16, further comprising:
wherein each station under the IEEE 802.11 communications protocol supporting CSMA/CA has at least an application (APP) layer, the MAC layer, and a physical (PHY) layer;
wherein said APP layer and said MAC layer each have a management entity;
wherein during a communication, each station acts as either a transmitter station or a receiver station;
performing said scheduling channel time by the station for transmitting RTA traffic in response to said MAC layer of the station determining that a resource is available and sending a negotiation request to the MAC layer of a receiving station which informs its APP layer to prepare for receiving RTA packets by sending a negotiation request from its MAC layer to a management entity in its APP layer and communicating results to the MAC layer of the station, that is transmitting RTA traffic, which forwards these results to the APP layer of the station for it to start transmitting RTA traffic if the resource was granted by both the transmitting and receiving stations.

19. The method as recited in claim 16, further comprising refraining from transmitting non-RTA packets during the scheduled channel time for RTA packet transmission during the process of scheduling channel time for transmitting RTA traffic.

20. The method as recited in claim 16, further comprising utilizing an RTA internal timer to determine when to start contending for the channel while avoiding channel contention collisions.

21. The method as recited in claim 20, further comprising randomizing said RTA internal time based on a target latency time of the RTA packet.

22. The method as recited in claim 16, further comprising utilizing a ready-to-send (RTS) form of signaling on short transmitter operating periods (TXOP) to reserve future channel time for RTA packet transmission.

23. An apparatus for wireless communication in a network, the apparatus comprising:
 (a) a wireless communication circuit configured, as a station under an IEEE 802.11 communications protocol supporting carrier sense multiple access/collision avoidance (CSMA/CA) and providing a lower latency capability for real-time application (RTA) traffic, for wirelessly communicating over at least one channel with at least one other wireless station on a wireless local area network (WLAN) in its reception area;
 (b) a processor coupled to the station configured for operating on the WLAN;
 (c) a non-transitory memory storing instructions executable by the processor; and
 (d) wherein said instructions, when executed by the processor, perform steps of the communications protocol comprising:
  (i) operating said wireless communication circuit as a WLAN station under CSMA/CA for communicating non-real time (non-RTA) packets between stations which contend for channel access; wherein each station under the IEEE 802.11 communications protocol supporting CSMA/CA has at least an application (APP) layer, a MAC layer, and a physical (PHY) layer; wherein said APP layer and said MAC layer each have a management entity; and wherein during a communication, each station acts as either a transmitter station or a receiver station;
  (ii) distinguishing RTA packets from non-RTA packets at the station's MAC layer, which extracts information when receiving traffic from an upper layer and compares it with RTA session records created during RTA stream negotiations to determine if the packets are RTA packets;
  (iii) scheduling channel time for transmitting RTA traffic based on expected RTA packet arrival time as determined at the MAC layer;
  (iv) sharing scheduled channel time information with neighboring wireless stations;
  (v) adjusting scheduled channel time based on the scheduled channel time of at least one of its neighboring wireless stations toward preventing channel contention collisions when multiple RTA traffics are contending for the channel;
  (vi) performing said scheduling channel time by the station for transmitting RTA traffic in response to said MAC layer of the station determining that a resource is available and sending a negotiation request to the MAC layer of a receiver station which informs its APP layer to prepare for receiving RTA packets by sending a negotiation request from its MAC layer to its management entity in the APP layer and communicating results to the MAC layer of the station, that is transmitting RTA traffic, which forwards these results to the APP layer of the station for it to start transmitting RTA traffic if the resource was granted by both the transmitting and receiving stations;
  (vii) occupying the channel before the RTA packet arrives; and
  (viii) transmitting the RTA packet.

24. An apparatus for wireless communication in a network, the apparatus comprising:
 (a) a wireless communication circuit configured, as a station under an IEEE 802.11 communications protocol supporting carrier sense multiple access/collision avoidance (CSMA/CA) and providing a lower latency capability for real-time application (RTA) traffic, for wirelessly communicating over at least one channel with at least one other wireless station on a wireless local area network (WLAN) in its reception area;
 (b) a processor coupled to the station configured for operating on the WLAN;
 (c) a non-transitory memory storing instructions executable by the processor; and
 (d) wherein said instructions, when executed by the processor, perform steps of the communications protocol comprising:
  (i) operating said wireless communication circuit as a WLAN station under CSMA/CA for communicating non-real time (non-RTA) packets between stations which contend for channel access;
  (ii) distinguishing RTA packets from non-RTA packets at the station's media access control (MAC) layer, which extracts information when receiving traffic from an upper layer and compares it with RTA session records created during RTA stream negotiations to determine if the packets are RTA packets;
  (iii) scheduling channel time for transmitting RTA traffic based on expected RTA packet arrival time as determined at the MAC layer;
  (iv) sharing scheduled channel time information with neighboring wireless stations;
  (v) adjusting scheduled channel time based on the scheduled channel time of at least one of its neighboring wireless stations toward preventing channel contention collisions when multiple RTA traffics are contending for the channel;
  (vi) utilizing an RTA internal timer to determine when to start contending for the channel while avoiding channel contention collisions;
  (vii) occupying the channel before the RTA packet arrives; and
  (viii) transmitting the RTA packet.

25. An apparatus for wireless communication in a network, the apparatus comprising:
 (a) a wireless communication circuit configured, as a station under an IEEE 802.11 communications protocol supporting carrier sense multiple access/collision avoidance (CSMA/CA) and providing a lower latency capability for real-time application (RTA) traffic, for wirelessly communicating over at least one channel with at least one other wireless station on a wireless local area network (WLAN) in its reception area;

(b) a processor coupled to the station configured for operating on the WLAN;

(c) a non-transitory memory storing instructions executable by the processor; and (d) wherein said instructions, when executed by the processor, perform steps of the communications protocol comprising:

(i) operating said wireless communication circuit as a WLAN station under CSMA/CA for communicating non-real time (non-RTA) packets between stations which contend for channel access;

(ii) distinguishing RTA packets from non-RTA packets at the station's media access control (MAC) layer, which extracts information when receiving traffic from an upper layer and compares it with RTA session records created during RTA stream negotiations to determine if the packets are RTA packets;

(iii) scheduling channel time for transmitting RTA traffic based on expected RTA packet arrival time as determined at the MAC layer;

(iv) sharing scheduled channel time information with neighboring wireless stations;

(v) adjusting scheduled channel time based on the scheduled channel time of at least one of its neighboring wireless stations toward preventing channel contention collisions when multiple RTA traffics are contending for the channel;

(vi) utilizing a ready-to-send (RTS) form of signaling on short transmitter operating periods (TXOP) to reserve future channel time for RTA packet transmission;

(vii) occupying the channel before the RTA packet arrives; and (viii) transmitting the RTA packet.

26. An apparatus for wireless communication in a network, the apparatus comprising:

(a) a wireless communication circuit configured, as a station under an IEEE 802.11 communications protocol supporting carrier sense multiple access/collision avoidance (CSMA/CA) and providing a lower latency capability for real-time application (RTA) traffic, for wirelessly communicating over at least one channel with at least one other wireless station on a wireless local area network (WLAN) in its reception area;

(b) a processor coupled to the station configured for operating on the WLAN;

(c) a non-transitory memory storing instructions executable by the processor; and (d) wherein said instructions, when executed by the processor, perform steps of the communications protocol comprising:

(i) operating said wireless communication circuit as a WLAN station under CSMA/CA for communicating non-real time (non-RTA) packets between stations which contend for channel access;

(ii) distinguishing RTA packets from non-RTA packets at the station's media access control (MAC) layer, which extracts information when receiving traffic from an upper layer and compares it with RTA session records created during RTA stream negotiations to determine if the packets are RTA packets;

(iii) scheduling channel time for transmitting RTA traffic based on expected RTA packet arrival time as determined at the MAC layer;

(iv) wherein said expected RTA packet arrival time is the packet arrival time at the MAC layer of the WLAN station, allowing the WLAN station to occupy the channel before the RTA packet arrives at the MAC layer, thus upon RTA packet arrives the WLAN station transmits the packet without contending for the channel;

(v) sharing scheduled channel time information with neighboring wireless stations;

(vi) adjusting scheduled channel time based on the scheduled channel time of at least one of its neighboring wireless stations toward preventing channel contention collisions when multiple RTA traffics are contending for the channel;

(vii) occupying the channel before the RTA packet arrives; and (viii) transmitting the RTA packet.

27. An apparatus for wireless communication in a network, the apparatus comprising:

(a) a wireless communication circuit configured, as a station under an IEEE 802.11 communications protocol supporting carrier sense multiple access/collision avoidance (CSMA/CA) and providing a lower latency capability for real-time application (RTA) traffic, for wirelessly communicating over at least one channel with at least one other wireless station on a wireless local area network (WLAN) in its reception area;

(b) a processor coupled to the station configured for operating on the WLAN;

(c) a non-transitory memory storing instructions executable by the processor; and (d) wherein said instructions, when executed by the processor, perform steps of the communications protocol comprising:

(i) operating said wireless communication circuit as a WLAN station under CSMA/CA for communicating non-real time (non-RTA) packets between stations which contend for channel access, whereby said apparatus is backward compatible with CSMA/CA WLAN stations which do not provide for prioritizing RTA packets over non-RTA packets; transmitting non-RTA packets using CSMA/CA in which the WLAN station contends with other stations for accessing the channel when it is not scheduled for RTA traffic;

(ii) distinguishing RTA packets from non-RTA packets at the station's media access control (MAC) layer, which extracts information when receiving traffic from an upper layer and compares it with RTA session records created during RTA stream negotiations to determine if the packets are RTA packets;

(iii) scheduling channel time for transmitting RTA traffic based on expected RTA packet arrival time as determined at the MAC layer;

(iv) sharing scheduled channel time information with neighboring wireless stations;

(v) adjusting scheduled channel time based on the scheduled channel time of at least one of its neighboring wireless stations toward preventing channel contention collisions when multiple RTA traffics are contending for the channel;

(vi) occupying the channel before the RTA packet arrives; and (vii) transmitting the RTA packet.

* * * * *